US012704889B2

(12) United States Patent
Kim et al.

(10) Patent No.: US 12,704,889 B2
(45) Date of Patent: Aug. 11, 2026

(54) METHOD FOR HEAT DISSIPATION OF ELECTRONIC DEVICE AND ELECTRONIC DEVICE OF SAME

(71) Applicant: SAMSUNG ELECTRONICS CO., LTD., Suwon-si (KR)

(72) Inventors: Sangheon Kim, Suwon-si (KR); Kwangtaek Woo, Suwon-si (KR); Jiwoo Lee, Suwon-si (KR); Yonggil Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 18/670,135

(22) Filed: May 21, 2024

(65) Prior Publication Data

US 2024/0393846 A1 Nov. 28, 2024

Related U.S. Application Data

(63) Continuation of application No. PCT/KR2024/005373, filed on Apr. 22, 2024.

(30) Foreign Application Priority Data

May 24, 2023 (KR) ........................ 10-2023-0066819
Jul. 4, 2023 (KR) ........................ 10-2023-0086677

(51) Int. Cl.
*G06F 1/20* (2006.01)
*H04M 1/02* (2006.01)

(52) U.S. Cl.
CPC .............. *G06F 1/206* (2013.01); *G06F 1/203* (2013.01); *H04M 1/0235* (2013.01); *H04M 1/0268* (2013.01); *H04M 2201/38* (2013.01)

(58) Field of Classification Search
None
See application file for complete search history.

(56) References Cited

U.S. PATENT DOCUMENTS

2014/0218375 A1* 8/2014 Kim ...................... G06F 1/1643
345/501
2020/0194712 A1 6/2020 Choi
(Continued)

FOREIGN PATENT DOCUMENTS

CN 109683690 A 4/2019
EP 4198685 6/2023
(Continued)

OTHER PUBLICATIONS

Motorola Rollable Phone 2022—Live Demo | Flexible OLED Screen Concept Smartphone, https://youtu.be/A3DEfUSNmQw , Published Oct. 19, 2022.

(Continued)

*Primary Examiner* — Frank S Chen
(74) *Attorney, Agent, or Firm* — Nixon & Vanderhye P.C.

(57) ABSTRACT

An electronic device according to an embodiment of the disclosure may include: two or more housings, a flexible display mounted to one or more housings among the two or more housings and configured to be expanded or reduced according to a sliding operation of one or more housings among the two or more housings, one or more sensors configured to acquire one or more pieces of temperature information from the electronic device, and at least one processor, comprising processing circuitry, operatively connected to the one or more sensors and the flexible display, wherein at least one processor, individually and/or collectively, is configured to: identify at least one of operation state information or one or more pieces of temperature information acquired from the electronic device, identify expanding state information of the flexible display, and (Continued)

control the electronic device to change a size of the flexible display by sliding the one or more housings based on at least one of the operation state information or the one or more pieces of temperature information.

18 Claims, 37 Drawing Sheets

(56) References Cited

U.S. PATENT DOCUMENTS

| | | | | |
|---|---|---|---|---|
| 2020/0366331 | A1* | 11/2020 | Chen | H04M 1/0268 |
| 2022/0113766 | A1 | 4/2022 | Cho | |
| 2022/0148478 | A1 | 5/2022 | Lee et al. | |
| 2022/0302727 | A1* | 9/2022 | Reade | H02J 3/0012 |
| 2023/0040057 | A1 | 2/2023 | Seo et al. | |
| 2023/0097360 | A1 | 3/2023 | Su | |
| 2024/0030738 | A1 | 1/2024 | Park | |
| 2024/0314231 | A1* | 9/2024 | Zhu | H04M 1/0208 |

FOREIGN PATENT DOCUMENTS

| | | | |
|---|---|---|---|
| KR | 10-2020-0064573 | | 6/2020 |
| KR | 20210151675 | A | 12/2021 |
| KR | 10-2022-0008742 | | 1/2022 |
| KR | 10-2022-0048412 | | 4/2022 |
| KR | 20220048412 | A | 4/2022 |
| KR | 10-2022-0060861 | | 5/2022 |
| KR | 10-2022-0061816 | | 5/2022 |
| KR | 20220076145 | A | 6/2022 |
| KR | 20220141506 | A | 10/2022 |
| WO | 2022114647 | A1 | 6/2022 |

OTHER PUBLICATIONS

LG Rollable—A Perfect Piece of TECH!, https://youtu.be/JEEmGZbM6-8 , published Sep. 23, 2022.

Causes of smartphone overheating and how to prevent it, https://youtu.be/ulE3vhwEICc , published Nov. 5, 2019.

Galaxy Z Flip4 & Z Fold4 Performance Spotlight! Throttling, heating, and even GOS (compare S22U, Z Flip3, Z Fold3), https://youtu.be/EYN035q4wlk , published Aug. 27, 2022.

How to choose a wireless charger, does wireless charging shorten battery life?, https://youtu.be/mTklZeds0h8 , published May 4, 2020.

Do not use your smartphone while charging! For both Galaxy & iPhone, 12 types tested in 3 days (put it down for a while and charge it quickly), https://youtu.be/5BS5ZiqFd_s , published Jun. 14, 2022.

Why does the charger get hot? Don't chase it, let's recharge!, https://youtu.be/jcfjR6xndA8 , published Mar. 13, 2018.

Search Report and Written Opinion dated Aug. 5, 2023 issued in International Patent Application No. PCT/KR2024/005373.

* cited by examiner

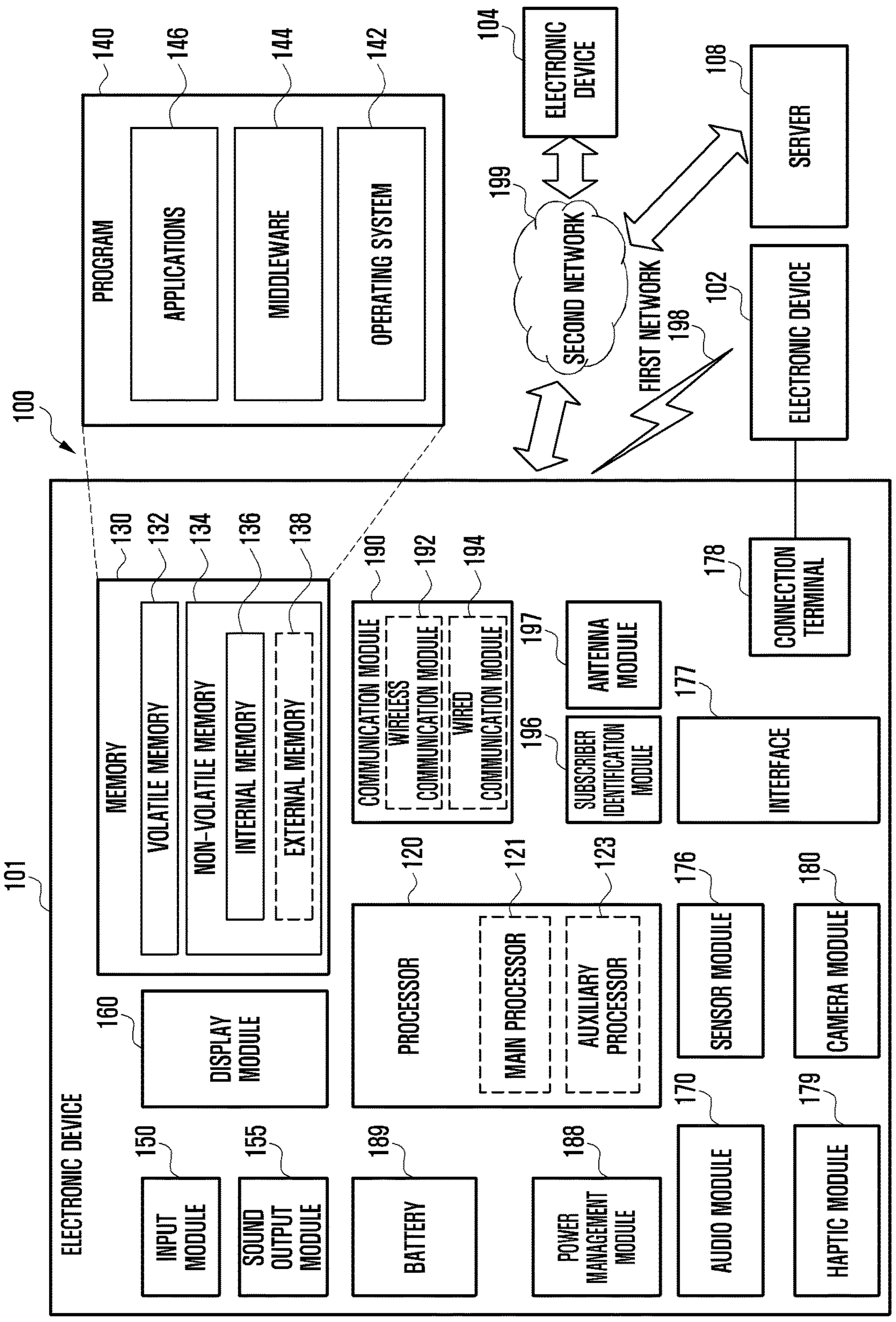

FIG. 1

100
101 ELECTRONIC DEVICE
150 INPUT MODULE
155 SOUND OUTPUT MODULE
160 DISPLAY MODULE
130 MEMORY
132 VOLATILE MEMORY
134 NON-VOLATILE MEMORY
136 INTERNAL MEMORY
138 EXTERNAL MEMORY
189 BATTERY
120 PROCESSOR
121 MAIN PROCESSOR
123 AUXILIARY PROCESSOR
190 COMMUNICATION MODULE
192 WIRELESS COMMUNICATION MODULE
194 WIRED COMMUNICATION MODULE
188 POWER MANAGEMENT MODULE
196 SUBSCRIBER IDENTIFICATION MODULE
197 ANTENNA MODULE
170 AUDIO MODULE
176 SENSOR MODULE
177 INTERFACE
178 CONNECTION TERMINAL
179 HAPTIC MODULE
180 CAMERA MODULE
140 PROGRAM
146 APPLICATIONS
144 MIDDLEWARE
142 OPERATING SYSTEM
199 SECOND NETWORK
198 FIRST NETWORK
104 ELECTRONIC DEVICE
108 SERVER
102 ELECTRONIC DEVICE 300
310
311
3112
308
307
318
316
314
314a
313
351
3101
3113
312
361
340
330
360
B
315
322
3213
322a
3211
353
323
325a
3251
326
3253
325
3252
3212
326
3212a
321
320
303
352
y
-x
-z
z
x
-y

730 Application
719 Window Manager
705 Input Dispatcher
707 Input Manager
Orientation State Manager
713 Display Expanding State Manager
717 Display Manager
725 Hardware Renderer
703 Event Hub
711 Sensor Manager
715 Power Manager
723 Buffer Queue
701 Input device Driver
709 Sensor Driver
721 Motor device Driver
Power Controller
727 Graphic Compositor
729 Framebuffer driver

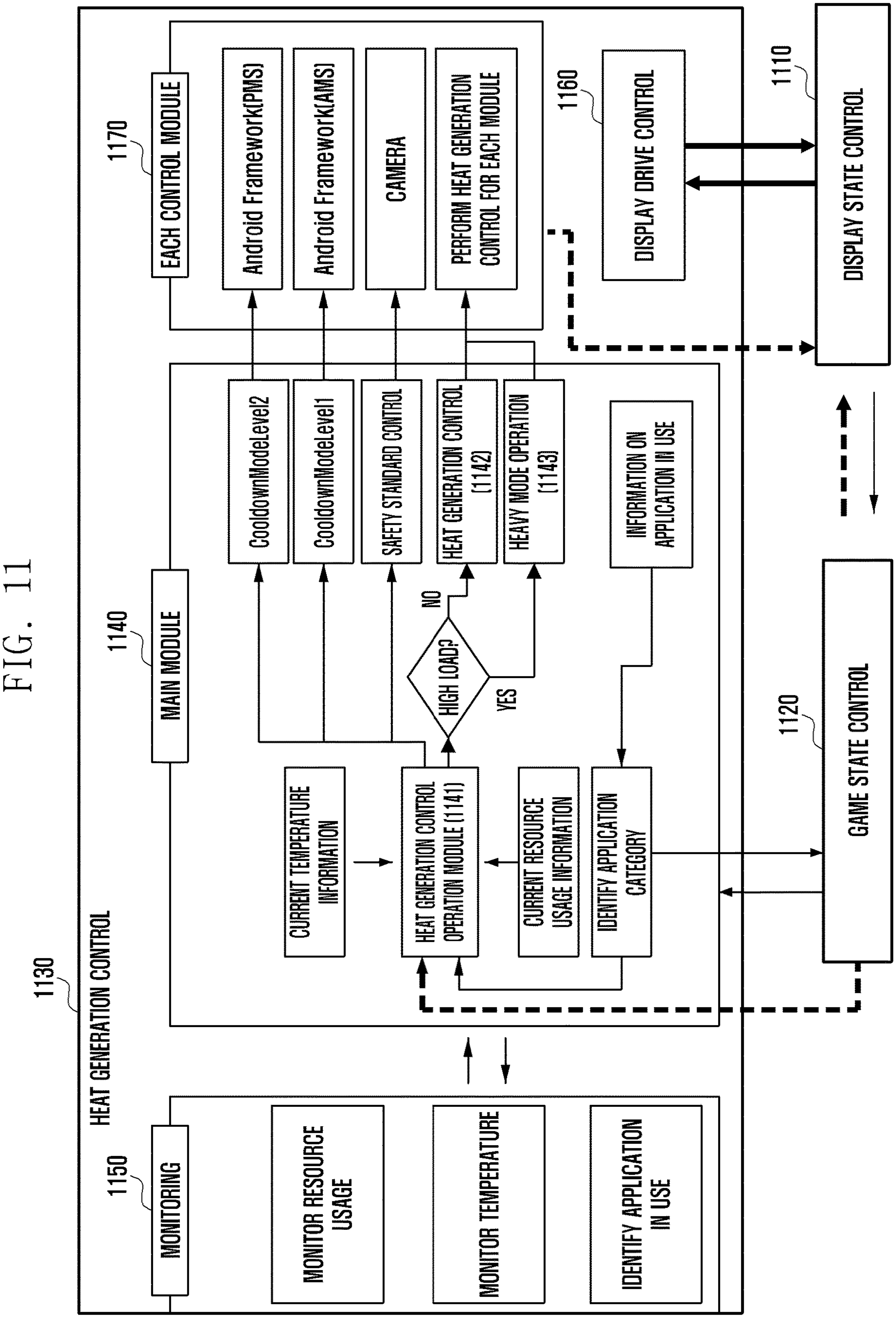

FIG. 11

1130
HEAT GENERATION CONTROL

1150
MONITORING
MONITOR RESOURCE USAGE
MONITOR TEMPERATURE
IDENTIFY APPLICATION IN USE

1140
MAIN MODULE
CURRENT TEMPERATURE INFORMATION
HEAT GENERATION CONTROL OPERATION MODULE (1141)
CURRENT RESOURCE USAGE INFORMATION
IDENTIFY APPLICATION CATEGORY
INFORMATION ON APPLICATION IN USE
HIGH LOAD?
YES
NO
CooldownModeLevel2
CooldownModeLevel1
SAFETY STANDARD CONTROL
HEAT GENERATION CONTROL (1142)
HEAVY MODE OPERATION (1143)

1170
EACH CONTROL MODULE
Android Framework(PMS)
Android Framework(AMS)
CAMERA
PERFORM HEAT GENERATION CONTROL FOR EACH MODULE

1160
DISPLAY DRIVE CONTROL

1110
DISPLAY STATE CONTROL

1120
GAME STATE CONTROL

FIG. 15

| | 0s | 10s | 20s | 30s | 40s | 50s |
|---|---|---|---|---|---|---|
| Maxlock | 1056000 | 1056000 | 1171200 | 1171200 | 1171200 | 1286400 |
| | | | | | | |
| Setpoint | 420 | 420 | 420 | 420 | 420 | 420 |
| - | | | | | | |
| Temperature | 420 | 415 | 415 | 415 | 415 | 415 |
| = | | | | | | |
| Error | 0 | 5 | 5 | 5 | 5 | 5 |
| | | | | | | |
| Error (t-0) | 0 | 5 | 5 | 5 | 5 | 5 |
| Error (t-1) | | 0 | 5 | 5 | 0 | 5 |
| Error (t-2) | | | 0 | 5 | -5 | 0 |
| | | | | | | |
| P | | 250 | 0 | 0 | 250 | 0 |
| + | | | | | | |
| I | 0 | 50 | 50 | 50 | 50 | 50 |
| + | | | | | | |
| D | | | -15 | 0 | 0 | -15 |
| = | | | | | | |
| MV | 0 | 300 | 35 | 50 | 300 | 35 |
| * Unit = | | | | | | |
| Contorl (Khz) | 0 | 120000 | 14000 | 20000 | 120000 | 14000 |
| + Maxlock = | | | | | | |
| Next (Khz) | 1056000 | 1176000 | 1190000 | 1210000 | 1330000 | 1344000 |
| MAP NEXT VALUE TO CLOSEST ACTUAL CLOCK | | | | | | |
| Maxlock (Khz) | 1056000 | 1171200 | 1171200 | 1171200 | 1286400 | 1401600 |

1501

1503

1505

1507

METHOD FOR HEAT DISSIPATION OF ELECTRONIC DEVICE AND ELECTRONIC DEVICE OF SAME

CROSS-REFERENCE TO RELATED APPLICATIONS

This application is a continuation of International Application No. PCT/KR2024/005373 designating the United States, filed on Apr. 22, 2024, in the Korean Intellectual Property Receiving Office and claiming priority to Korean Patent Application Nos. 10-2023-0066819, filed on May 24, 2023, and 10-2023-0086677, filed on Jul. 4, 2023, in the Korean Intellectual Property Office, the disclosures of each of which are incorporated by reference herein in their entireties.

BACKGROUND

Field

The disclosure relates to a method for controlling heat dissipation of an electronic device and the electronic device.

Description of Related Art

An electronic device may have a limited size for portability and thus have limitation in the size of a display. Accordingly, in recent years, various types of electronic devices providing an expanded screen have been developed. For example, electronic devices are designed such that the size of a screen gradually increase on the display having a limited size, and such that various services (or functions) are provided to users through larger screens.

A rollable device and/or a slidable device has been suggested for a new form factor of an electronic device. For example, an electronic device may include a flexible display (or a slidable display) mounted thereon, and at least a portion of the display may be used in rolled or unrolled states. For example, the electronic device may be realized to expand or reduce a screen in a sliding manner. For example, a portion of the flexible display may be slidably drawn out from the internal space of the electronic device or retracted into the internal space of the electronic device, and thus a screen may be expanded or reduced.

Various operations may generate heat inside the electronic device and the electronic device may radiate the generated heat by transferring the heat to the atmosphere through an external surface including the front surface or the rear surface of the electronic device using a heat dissipation material adopted by the electronic device. In the case of the electronic device having a new form factor, heat may be concentrated in an area where main internal heat-generating components are installed and heat may not be dissipated from the entire device, thereby raising the issue of heat dissipation control.

The above-described information may be provided as a related art to help understanding of the disclosure. No claim or determination is made as to the applicability of any of the foregoing as prior art to the disclosure.

SUMMARY

Embodiments of the disclosure provide an electronic device for performing dissipation control in an electronic device (e.g., a rollable device) including an expandable display (e.g., a rollable display).

Embodiments of the disclosure provide the electronic device including an expandable display for performing dissipation control including expansion and/or reduction of the display based on a state change (e.g., a heat generation state and/or an operating state) of the electronic device.

The electronic device according to an example embodiment of the disclosure may include: two or more housings, a flexible display mounted to one or more housings among the two or more housings and configured to be expanded or reduced according to a sliding operation of one or more housings among the two or more housings, one or more sensors configured to acquire one or more pieces of temperature information from the electronic device, and at least one processor, comprising processing circuitry, operatively connected to the one or more sensors and the flexible display, wherein at least one processor, individually and/or collectively, is configured to: identify at least one of an operation state information or one or more pieces of temperature information acquired from the electronic device, identify expanding state information of the flexible display, and change a size of the flexible display by control the electronic device to slide the one or more housings based on at least one of the operation state information or the one or more pieces of temperature information.

According to an example embodiment of the disclosure, a method of operating an electronic device including two or more housings and a flexible display mounted to one or more housings among the two or more housings and configured to be expanded or reduced according to a sliding operation of one or more housings among the two or more housings may include: identifying at least one of an operation state information or one or more pieces of temperature information acquired from the electronic device, identifying an expanding state information of the flexible display, and changing a size of the flexible display by sliding the one or more housings based on at least one of the operation state information or the one or more pieces of temperature information.

An additional range of applicability of the disclosure will become apparent from the following detailed description. However, since various modifications and alternatives within the spirit and scope of the disclosure may be clearly understood by those skilled in the art, it is to be understood that a detailed description and example embodiments, such as a detailed description and various example embodiments of the disclosure, are provided only by way of example.

In addition, various effects directly or indirectly identified through the disclosure may be provided. It will be appreciated by a person skilled in the art that effects which may be achieved from the disclosure are not limited to the effects described above and other effects that are not described above will be clearly understood from the following detailed description.

BRIEF DESCRIPTION OF THE DRAWINGS

In connection with the description of the drawings, like or similar reference numerals may be used for like or similar elements. Further, the above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 11 is a diagram illustrating an example of a configuration for performing heat dissipation control in an electronic device according to various embodiments;

FIG. 15 is a table illustrating an example of a heat dissipation control operation according to temperature change in an electronic device according to various embodiments;

DETAILED DESCRIPTION

Figure 2A:
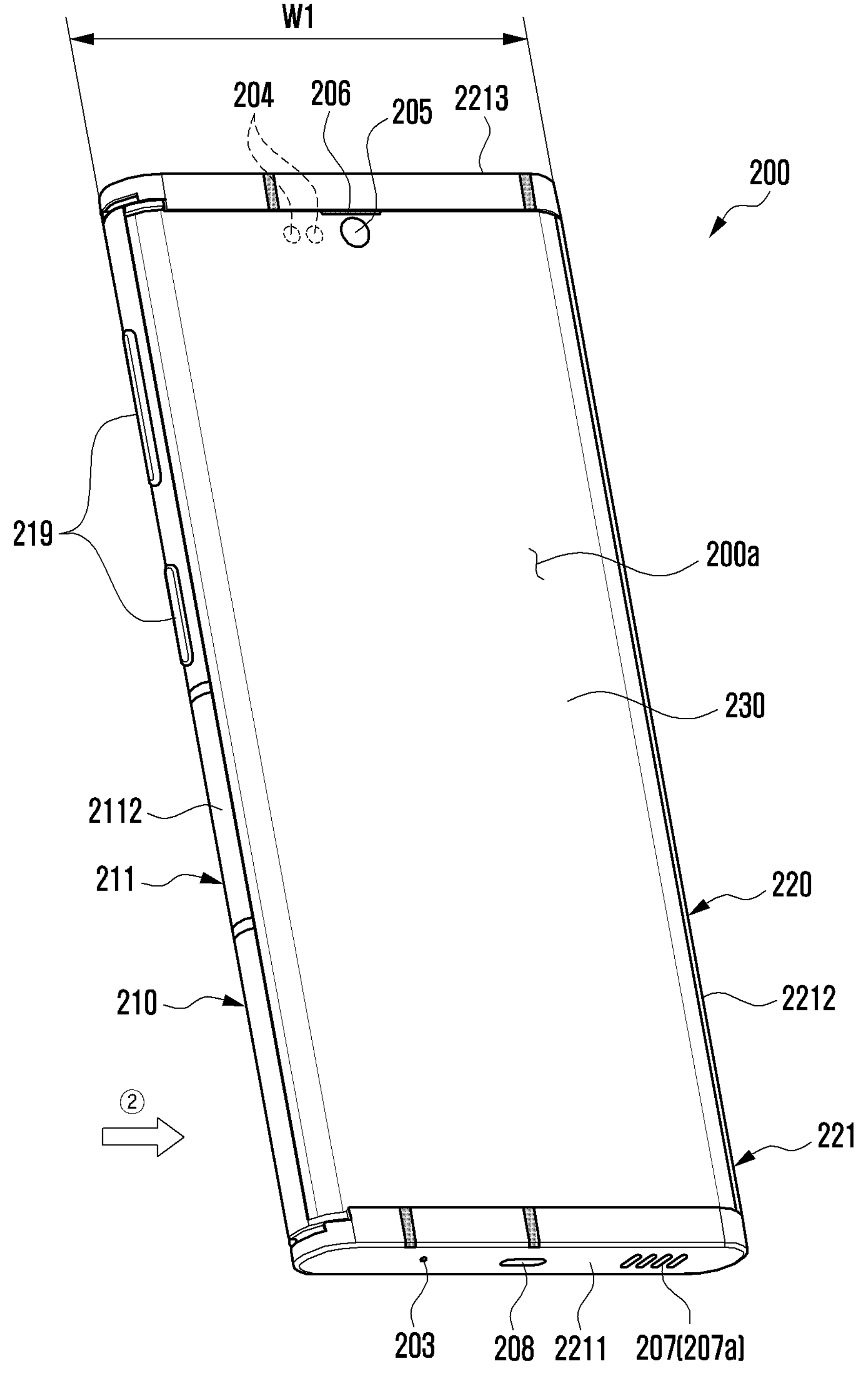
FIGS. 2A and 2B are diagrams illustrating a front surface and a rear surface of an electronic device in a closed state of the electronic device having a form factor according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor

121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
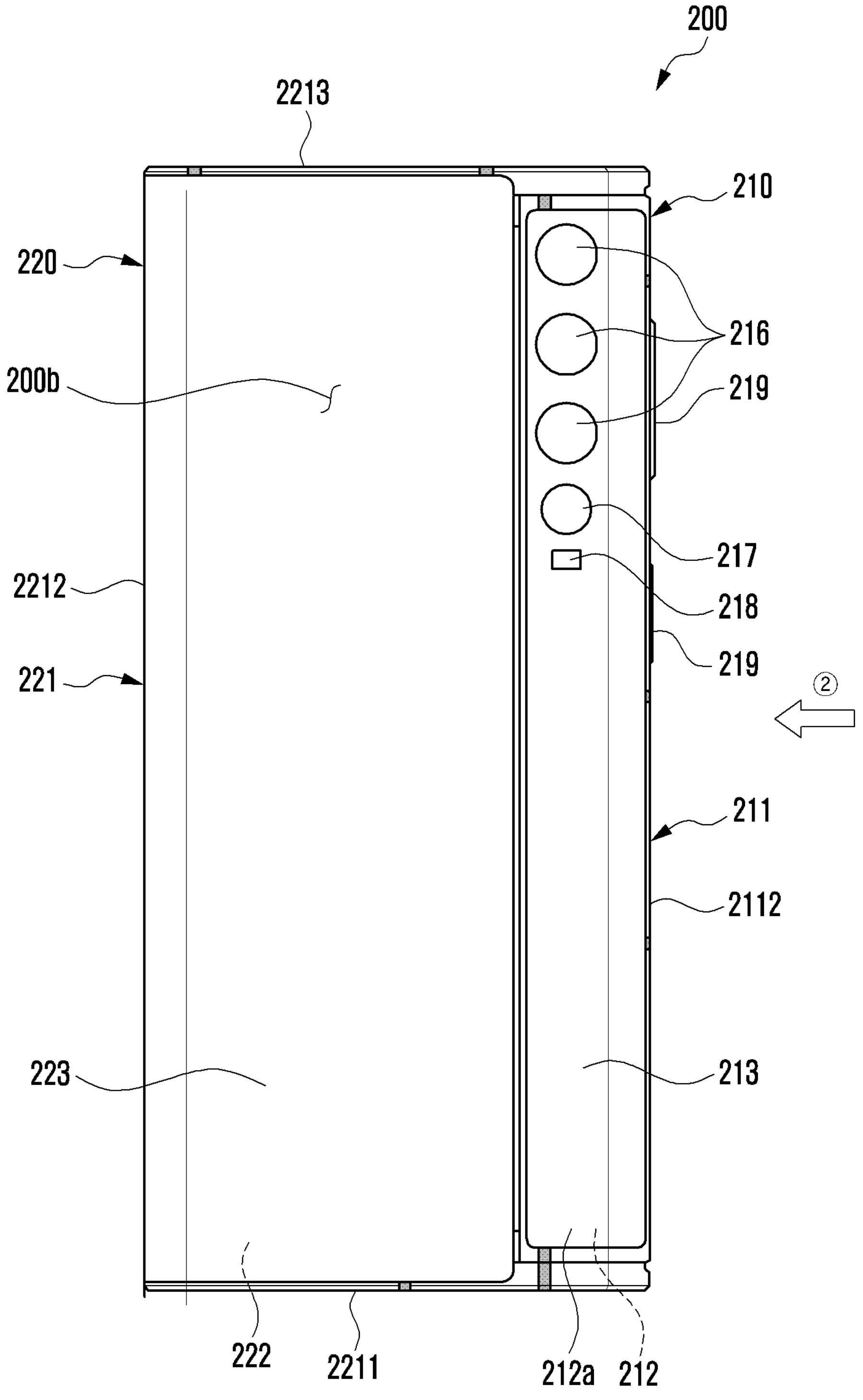
Figure 2C:
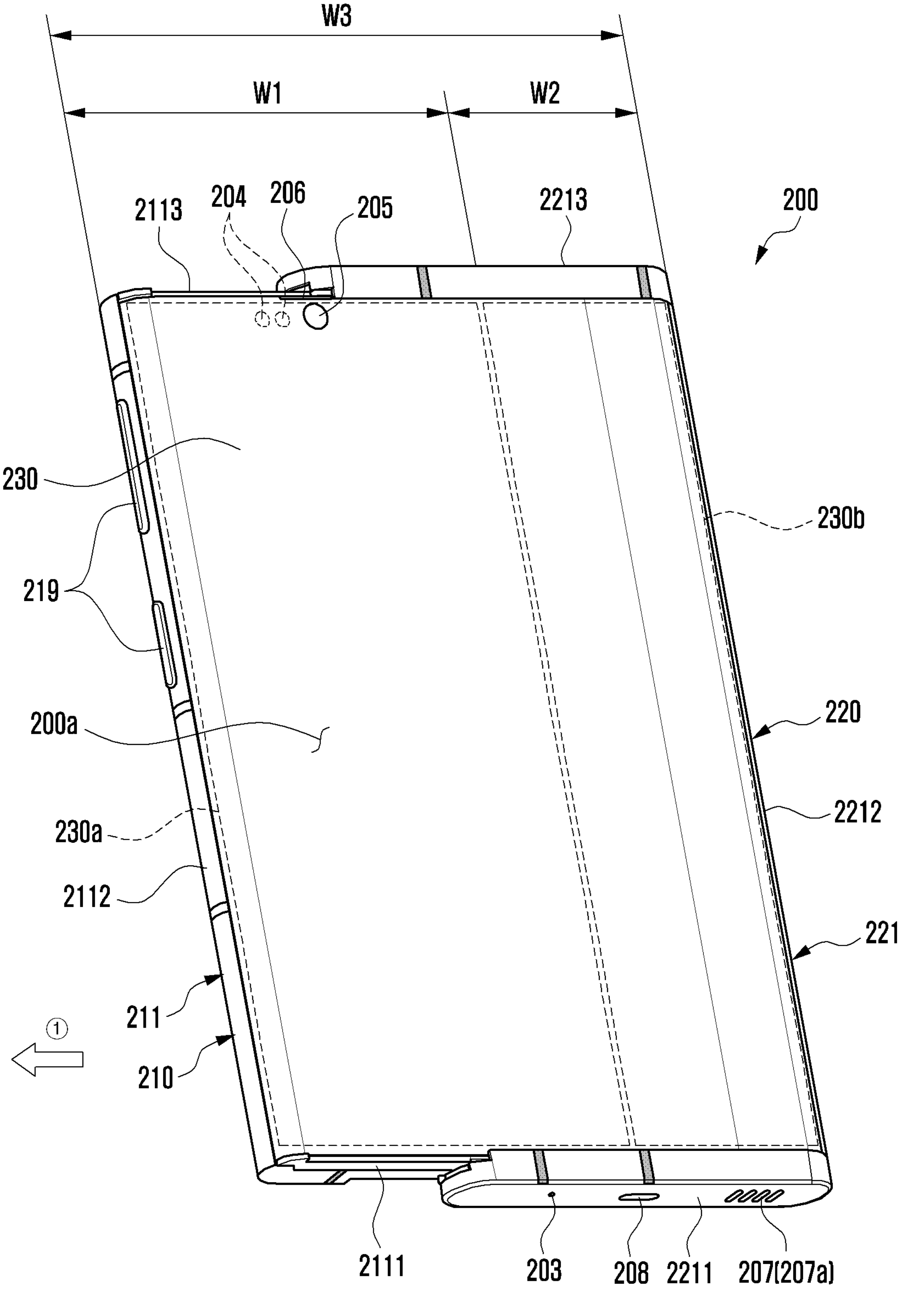
FIGS. 2C and 2D are perspective views illustrating a front surface and a rear surface of an electronic device in an open state of the electronic device having a form factor according to various embodiments
Figure 2D:
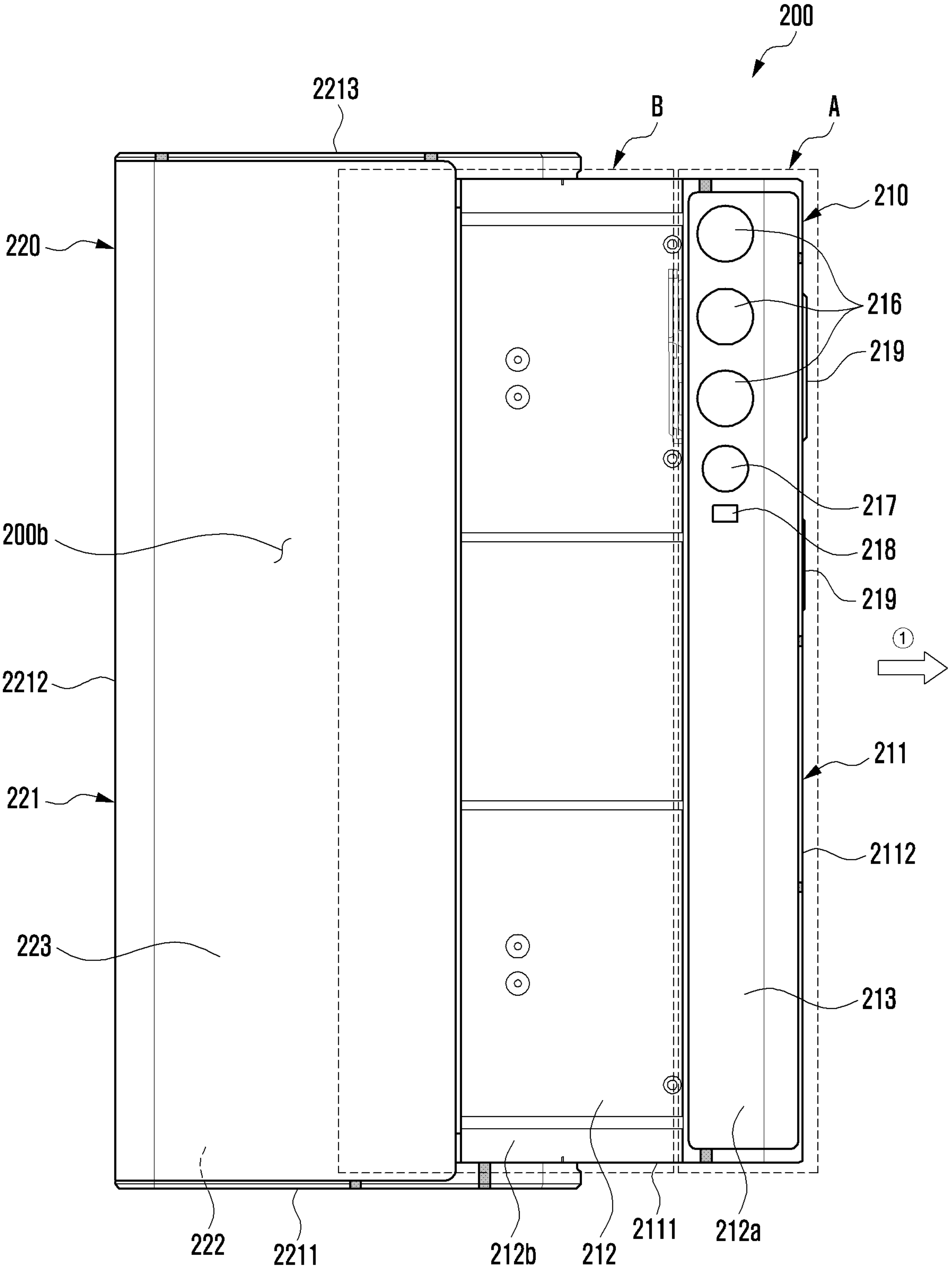

FIGS. 2A and 2B are diagrams illustrating a front surface and a rear surface of an electronic device in a closed state of the electronic device having a form factor according to various embodiments. FIGS. 2C and 2D are perspective views illustrating a front surface and a rear surface of an electronic device in an open state of the electronic device having a form factor according to various embodiments.

The electronic device 200 in FIGS. 2A, 2B, 2C and 2D (which may be referred to herein as FIGS. 2A to 2D) may be at least partially similar to the electronic device 101 in FIG. 1, may include the electronic device 101 in FIG. 1, or may further include an embodiment of the electronic device 101 in FIG. 1.

Referring to FIGS. 2A to 2D, the electronic device 200 may include a first housing 210 (e.g., a first housing structure or a base housing), a second housing 220 (e.g., a second housing structure or a sliding housing), and a flexible display 230 (e.g., an expandable display) disposed to be supported by at least a portion of the first housing 210 and the second housing 220. According to an embodiment, the first housing 210 may be coupled to be movable in a designated direction (e.g., the x-axis direction) and a designated reciprocating distance from the second housing 220. In this case, a slidable device in which the electronic device 200 is implemented to allow the flexible display 230 may slide is used as an example, but the disclosure is not limited thereto, and the flexible display 230 may be implemented to be foldable, multi-foldable, or rollable.

According to an embodiment, the electronic device 200 may include a bendable member (or a bendable support member) (e.g., a multi-joint hinge module or a multi-bar assembly) which may at least partially configure the same plane with at least a portion of the first housing 210 in the open state (or slide-out state or roll-out state) and may be at least partially received in an internal space of the second housing 220 in the closed state (or slide-in state or roll-in state). According to an embodiment, at least a portion of the flexible display 230 may be received in the internal space of the second housing 220 while being supported by the bendable member so as to be disposed to be invisible from the outside in the closed state. According to an embodiment, at least a portion of the flexible display 230 may be disposed to be visible from the outside while being supported by the bendable member for at least partially configuring the same plane with the first housing 210 in the open state.

According to various embodiments, the electronic device 200 may include a front surface 200*a* (e.g., a first surface), a rear surface 200*b* (e.g., a second surface) facing opposite to the front surface 200*a*, and a lateral surface (not shown) surrounding a space between the front surface 200*a* and the rear surface 200*b*. According to an embodiment, the electronic device 200 may include the first housing 210 including a first lateral member 211 and the second housing 220 including a second lateral member 221. According to an embodiment, the first lateral member 211 may include a first lateral surface 2111 having a first length along a first direction (direction ①), a second lateral surface 2112 extending to have a second length longer than the first length along a direction substantially perpendicular to the first lateral surface 2111, and a third lateral surface 2113 extending from the second lateral surface 2112 to be substantially perpendicular to the first lateral surface 2111 and having the first length. According to an embodiment, the first lateral member 211 may be at least partially formed of a conductive material (e.g., a metal). According to an embodiment, at least a portion of the first lateral member 211 may include a first support member 212 extending to at least a portion of an internal space of the first housing 210.

According to various embodiments, the second lateral member 221 may be at least partially correspond to the first lateral surface 2111, and include a fourth lateral surface 2211 having a third length, a fifth lateral surface 2212 extending from the fourth lateral surface 2211 in a direction substantially parallel to the second lateral surface 2112 and having a fourth length longer than the third length, and a sixth lateral surface 2213 extending from the fifth lateral surface 2212 to correspond to the third lateral surface 2113 and having the third length. According to an embodiment, the second lateral member 221 may be at least partially formed of a conductive material (e.g., a metal). According to an embodiment, at least a portion of the second lateral member 221 may include a second support member 222 extending to at least a portion of an internal space of the second housing 220. According to an embodiment, the first lateral surface 2111 and the fourth lateral surface 2211, and the third lateral surface 2113 and the sixth lateral surface 2213 may be slidably coupled to each other. According to an embodiment, in the closed state, the first lateral surface 2111 may be disposed to be invisible from the outside by overlapping at least a portion of the fourth lateral surface 2211. According to an embodiment, in the closed state, the third lateral surface 2113 may be disposed to be visible from the outside by overlapping at least a portion of the sixth lateral surface 2213. According to an embodiment, in the closed state, at least a portion of the first support member 212 may overlap the second support member 222 and a remaining portion of the first support member 212 may be disposed to be visible from the outside. Therefore, in the closed state, the first support member 212 may include a non-overlapping part 212*a* which does not overlap the second support member 222 and an overlapping part 212*b* which overlaps the second support member 222. In various embodiments, the non-overlapping part 212*a* and the overlapping part 212*b* may be integrally formed. In various embodiments, the non-overlapping part 212*a* and the overlapping part 212*b* may be separately provided and structurally coupled to each other.

According to various embodiments, the first housing 210 may include a first sub-space A corresponding to the non-overlapping part 212*a* and a second sub-space B correspond to the overlapping part 212*b* in a first space. According to an embodiment, the first sub-space A and the second sub-space B may be disposed in a manner of being at least partially connected to each other or separated. According to an embodiment the first sub-space A may be formed to have a larger spatial volume than the second sub-space B. This may be due to an overlapping structure in which the second support member 222 and the first support member 212 overlap in an area corresponding to the second sub-space B. According to an embodiment, the electronic device 200 may include multiple electronic components (e.g., a camera module 216, a sensor module 217, a flash 218, and a main substrate (or PCB)) or a battery arranged in the first space of the first housing 210. According to an embodiment, the first sub-space A may be used as an area in which electronic components (e.g., the camera module 216, the sensor module 217, or the flash 218) requiring, for example, a relatively large mounting space (or requiring a relatively large mounting thickness) or required to be operated by avoiding an overlapping structure are arranged. According to an embodiment, the second sub-space B may be used as an area in which electronic components (e.g., the main substrate (or PCB)) or a battery, which require, for example, a relatively small mounting space (or requiring a relatively small mounting thickness) or may be operated regardless of an overlapping structure) is arranged.

According to various embodiments, the front surface 200*a* and the rear surface 200*b* of the electronic device 200 may have variable areas depending of the closed state and the open state. In various embodiments, the electronic device 200 may include a first rear cover 213 disposed on at least a portion of the first housing 210 and a second rear cover 223 disposed on at least a portion of the second housing 220 in the rear surface 200*b*. According to an embodiment, the first rear cover 213 and/or the second rear cover 223 may be disposed in a manner of being coupled to at least a portion of the first support member 212 and the second support member 213. In various embodiments, the first rear cover 213 and/or the second rear cover 223 may be integrally formed with each lateral member 211 or 221. According to an embodiment, the first rear cover 213 and/or the rear cover 223 may be formed by coated or colored glass, ceramic, or a metal (e.g., aluminum (Al), stainless steel (STS), or magnesium), or a combination of at least two of the aforementioned materials. In various embodiments, the first rear cover 213 and/or the second rear cover 223 may extend to at least a portion of each lateral member 211 or 221. In various embodiments, at least an extended portion of each lateral member 211 or 221 of the first rear cover 213 and the second rear cover 223 may be formed to have a curved surface. In various embodiments, at least a portion of the first support member 212 may be replaced by the first rear cover 213 and at least a portion of the second support member 222 may be replaced by the second rear cover 223.

According to various embodiments, the electronic device 200 may include the flexible display 230 disposed to be supported by at least a portion of the first housing 210 and the second housing 220. According to an embodiment, the flexible display 230 may include a first part 230*a* (e.g., a flat part) always visible from the outside and a second part 230*b* (e.g., a bendable part) extending from the first part 230*a* and at least partially received in the internal space of the second housing 220 to be invisible from the outside in the closed state. According to an embodiment, the first part 230*a* may be disposed to be supported by the first housing 210 and the second part 230*b* may be disposed to be at least partially supported by a bendable member. According to an embodiment, in a state in which the first housing 210 is slid-out in a designated first direction (direction ①), the flexible display 230 may be disposed to extend from the first part 230*a* while being supported by the bendable member, may form substantially the same plane with the first part 230*a*, and may be visible from the outside. According to an embodiment, in a state in which the first housing 210 is slid-in along a designated second direction (direction ②), the second part 230*b* of the flexible display 230 may disposed to be received in the internal space of the second housing 220 and invisible from the outside. Accordingly, the electronic device 200 may include a display area of the flexible display 230 to be variable according to the first housing 210 moving from the second housing 220 along a designated direction in a sliding manner.

According to various embodiments, the first housing 210 and the second housing 220 may operate in a sliding manner to allow a whole width thereof to be variable with respect to each other. According to an embodiment, the electronic device 200 may be configured to have a first width W1 from the second lateral surface 2112 to the fourth lateral surface 2212 in a closed state. According to an embodiment, in the open state, the electronic device 200 may be configured to have a third width W3 larger than the first width W1 as at least a portion of the bendable member received in the internal space of the second housing 220 is moved to have an additional second width W2. For example, the flexible display 230 may have a display area substantially corresponding to the first width W1 in the closed state, and may have an extended display area substantially corresponding to the third width W3 in the open state.

According to various embodiments, a slide-out operation of the electronic device 200 may be performed by a user operation. For example, the electronic device 200 may converted from the closed state into the open state through an operation of the flexible display 230 slid in a designated first direction (direction ①) through a user operation. According to an embodiment, the electronic device 200 may converted from the open state into the closed state through an operation of the flexible display 230 slid in a designated second direction (direction ②) through a user operation. According to an embodiment, the electronic device 200 may maintain the open state and/or the closed state by means of the first housing 210 pressurized in a direction to be slid-in or slid-out relative to a specified inflection point from the second housing 220, through a sliding hinge module (not shown) disposed between the first housing 210 and the second housing 220. In various embodiments, the electronic device 200 may be configured to allow the first housing 210 to be drawn out in the designated first direction (e.g., direction ①) through an operation of a locker exposed through the rear surface 200*b* of the electronic device 200. In various embodiments, the electronic device 200 may be automatically operated through a driving mechanism (e.g., a driving motor, a reduction module, and/or a gear assembly) disposed in the internal space of the first housing 210 and/or the internal space of the second housing 220. According to an embodiment, the electronic device 200 may be configured to control an operation of the second housing 220 through the driving mechanism via a processor (e.g., the processor 120 in FIG. 1) in case that an event for conversion of the closed/open state of the electronic device 200 is detected. In various embodiments, the processor (e.g., the processor 120 in FIG. 1) of the electronic device 200 may control the flexible display 230 to display visual information (e.g., an object and/or an application execution screen) in various manners in response to a changed display area of the flexible display 230 according to the closed state, the open state, or an intermediate state (e.g., free stop (including a free stop state)).

According to various embodiments, the electronic device 200 may include at least one of an input module 203 (e.g., the input module 150 in FIG. 1), an audio output module 206 or 207 (e.g., the audio output module 155 in FIG. 1), a sensor module 204 or 217, a camera module 205 or 216, a connector port 208, a key input device 219, or an indicator (not shown). For an embodiment, the electronic device 200 may be configured to omit at least one of the above-described components or additionally include other components.

According to various embodiments, the input module 203 may include a microphone. In various embodiments, the input module 203 may include multiple microphones arranged to detect a direction of a sound. The audio output module 206 or 207 may include a speaker. The audio output module 206 or 207 may include a call receiver 206 and an external speaker 207. According to an embodiment, the external speaker 207 may be disposed in the second housing 220 and may be configured to transfer a sound to the outside through a first speaker hole 207*a*. According to an embodiment, the external speaker 207 may be disposed in the internal space of the second housing 220 and may provide an excellent quality sound to the user regardless of the sliding operation of the first housing 210. According to an embodiment, the connector port 208 may be disposed in the internal space of the second housing 220 together with the external speaker 207. In various embodiments, the connector port 208 may be disposed in the internal space of the first housing 210 and may face the outside through a connector port hole (not shown) configured in the second housing 220 in the closed state. In this case, the connector port 208 may be configured to be covered to be invisible from the outside through the second housing 220 in the closed state. According to an embodiment, the receiver 206 may be configured to respond to an external environment in the internal space of the first housing 210. In various embodiments, the audio output module 206 or 207 may include a speaker (e.g., a piezo speaker) operating without a separate speaker hole.

According to various embodiments, the sensor module 204 or 217 may generate an electrical signal or a data value corresponding to an internal operation state or external environment state of the electronic device 200. The sensor module 204 or 217 may include, for example, a first sensor module 204 (e.g., a proximity sensor or illuminance sensor) disposed on the front surface 200*a* and/or a second sensor module 217 disposed on the rear surface 200*b* of the electronic device 200. According to an embodiment, the first sensor module 204 may be disposed under the flexible display 230 on the front surface 200*a* of the electronic device 200. According to an embodiment, the first sensor module 204 and/or the second sensor module 217 may include at least one of a proximity sensor, an illumination sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a biometric sensor, a temperature sensor, and/or a humidity sensor.

According to various embodiments, the camera module 205, or 216 may include a first camera module 205 disposed at the front surface 200*a* and a second camera module 216 disposed on the rear surface 200*b* of the electronic device 200. According to an embodiment, the electronic device 200 may include a flash 218 located adjacent to the second camera module 216. According to an embodiment, the camera modules 205 or 216 may include one or more of lenses, an image sensor, and/or an image signal processor. According to an embodiment, the first camera module 205 may be disposed under the flexible display 230 and configured to photograph a subject through a portion of an activation area of the flexible display 230. According to an embodiment, the flash 218 may include, for example, a light-emitting diode or a xenon lamp.

According to various embodiments, the first camera module 205 among camera modules 205 and 216 and/or a certain sensor module 204 among sensor modules 204 and 217 may disposed to be in contact with the external environment through an opening passing through the flexible display 230 or a transmission area in the internal space of the electronic device 200. According to an embodiment, an area facing the first camera module 205 of the flexible display 230 may correspond to a portion of an area configured to display contents, and may be formed to be a transmission area having predetermined transmittance. According to an embodiment, the transmission area may be configured to have transmittance in a range of about 5% to about 20%. Such a transmission area may include an area overlapping an effective area (e.g., a view-angle region) of the first camera module 205 through which light for imaging to an image sensor to generate an image passes. For example, the transmission area of the flexible display 230 may include an area having a lower pixel density and/or wire density than a peripheral area. For example, the transmission area may be substituted with the aforementioned opening. For example, a certain camera module 205 may include an under-display camera (UDC). In various embodiments, a certain sensor module 204 may be disposed in the internal space of the electronic device 200 to perform functions thereof without being visually exposed (the terms "visually exposed" and "visible" may be used interchangeably herein and may refer to the same thing) through the flexible display 230. According to an embodiment, the second camera module 216 among camera modules 205 and 216 and/or a certain sensor module 217 among sensor modules 204 and 217 may disposed to correspond to the external environment through at least a portion (e.g., the first rear cover 213) of the first housing 210 in the internal space of the electronic device 200. In this case, the second camera module 216 and/or the certain sensor module 217 may be disposed on a designated location of the first housing 210 to be always visible from the outside regardless of the closed state and/or the open state.

According to various embodiments, an electronic device 101 or 200 may include a display having the structure of FIGS. 2A to 2D. According to various embodiments, the electronic device 101 may include various form factors expandable for various types of displays in addition to the form factor described with reference to FIGS. 2A to 2D. For example, the electronic device 101 may be realized in various form factors based on the sliding (or rolling) method according to the form factor structure of the electronic device 101 or 200 in FIGS. 2A to 2D. Examples thereof will be described in greater detail below with reference to various drawings (e.g., FIGS. 5A, 5B, 5C, 5D, 5E, 5F and 5G).

Figure 3A:
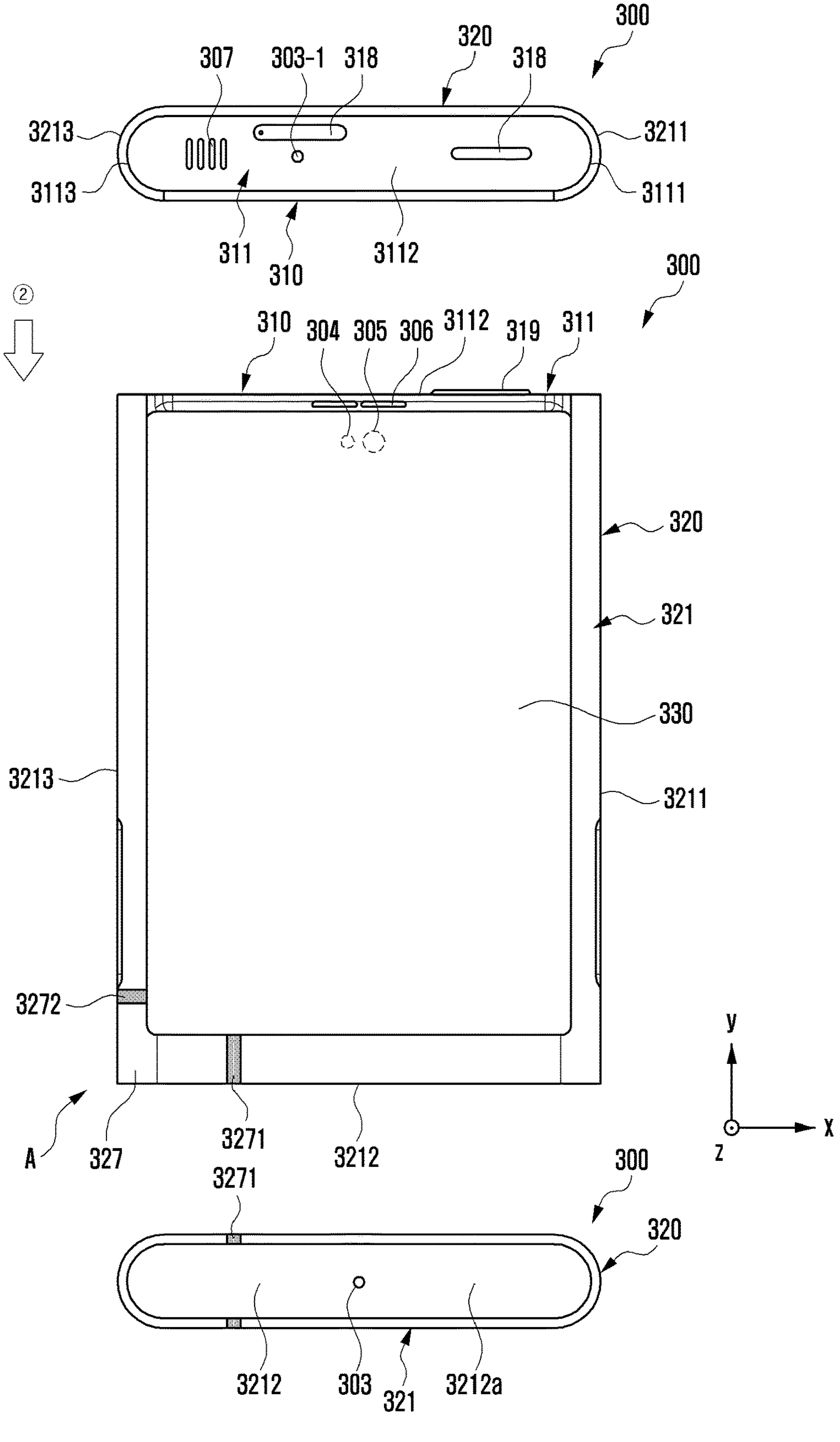
FIGS. 3A and 3B are diagrams illustrating a front surface and a rear surface of an electronic device in a closed state of the electronic device having a form factor according to various embodiments.
Figure 3B:
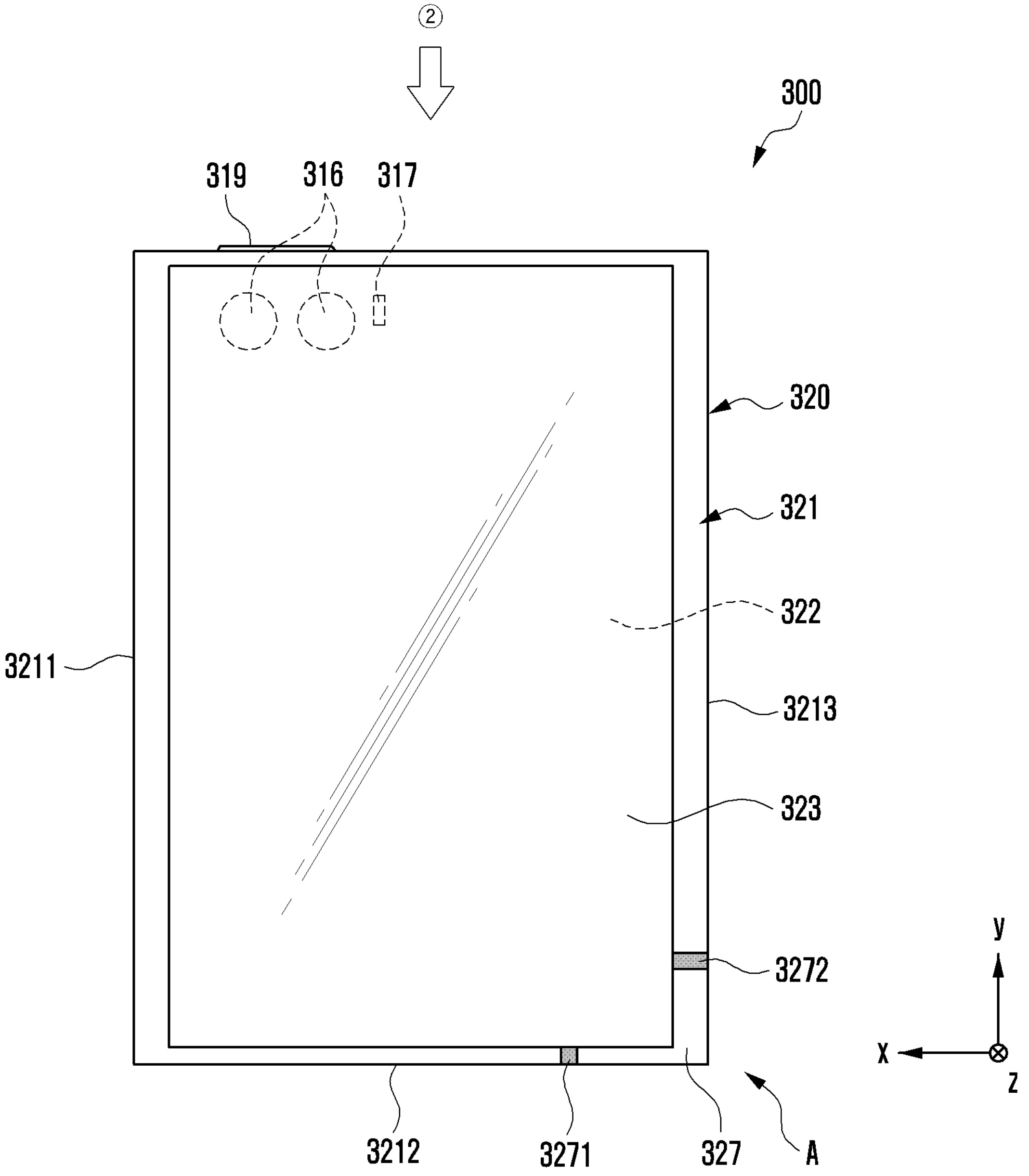
Figure 3C:
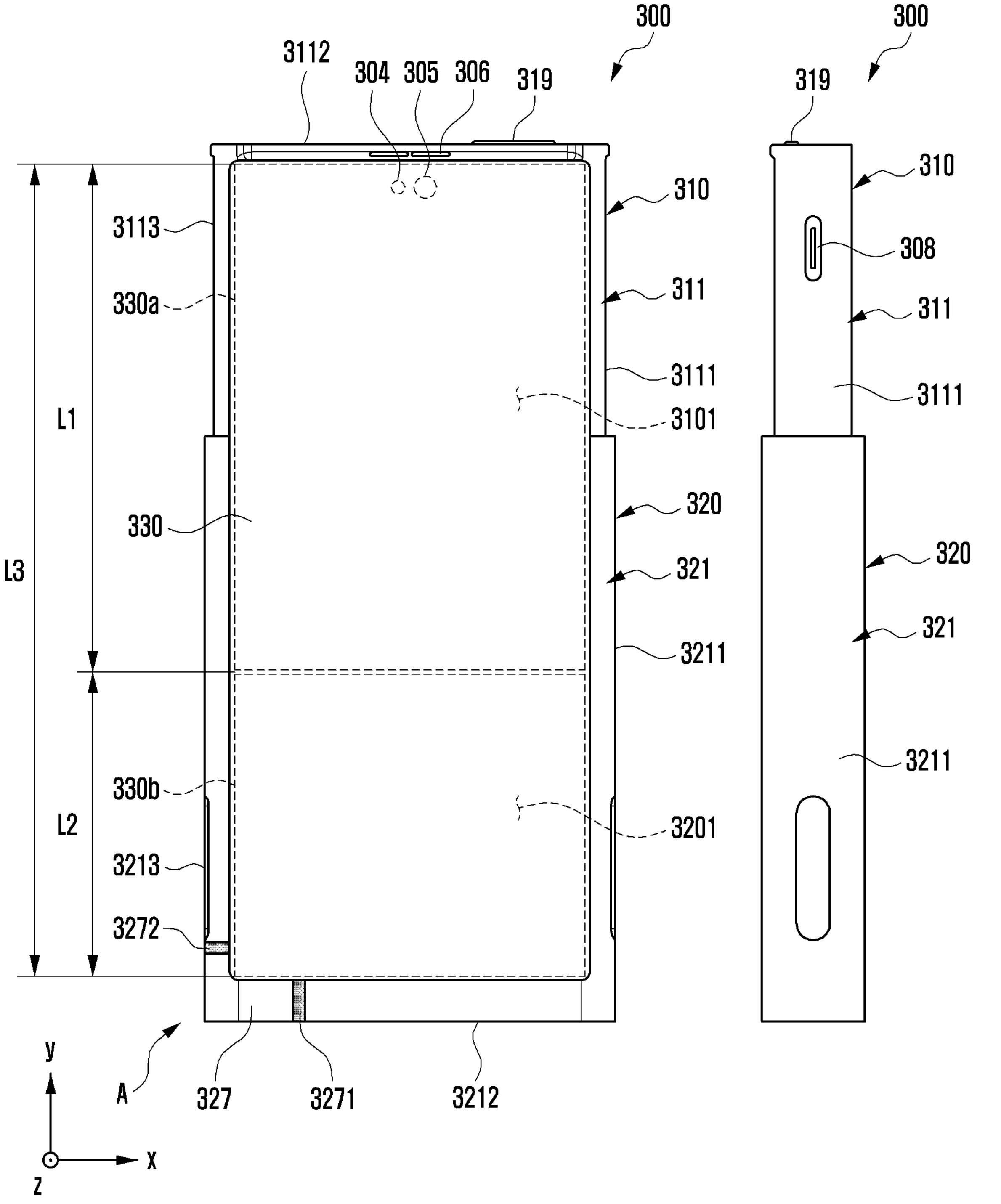
FIGS. 3C and 3D are diagrams illustrating a front surface and a rear surface of an electronic device in an open state of the electronic device having a form factor according to various embodiments.
Figure 3D:
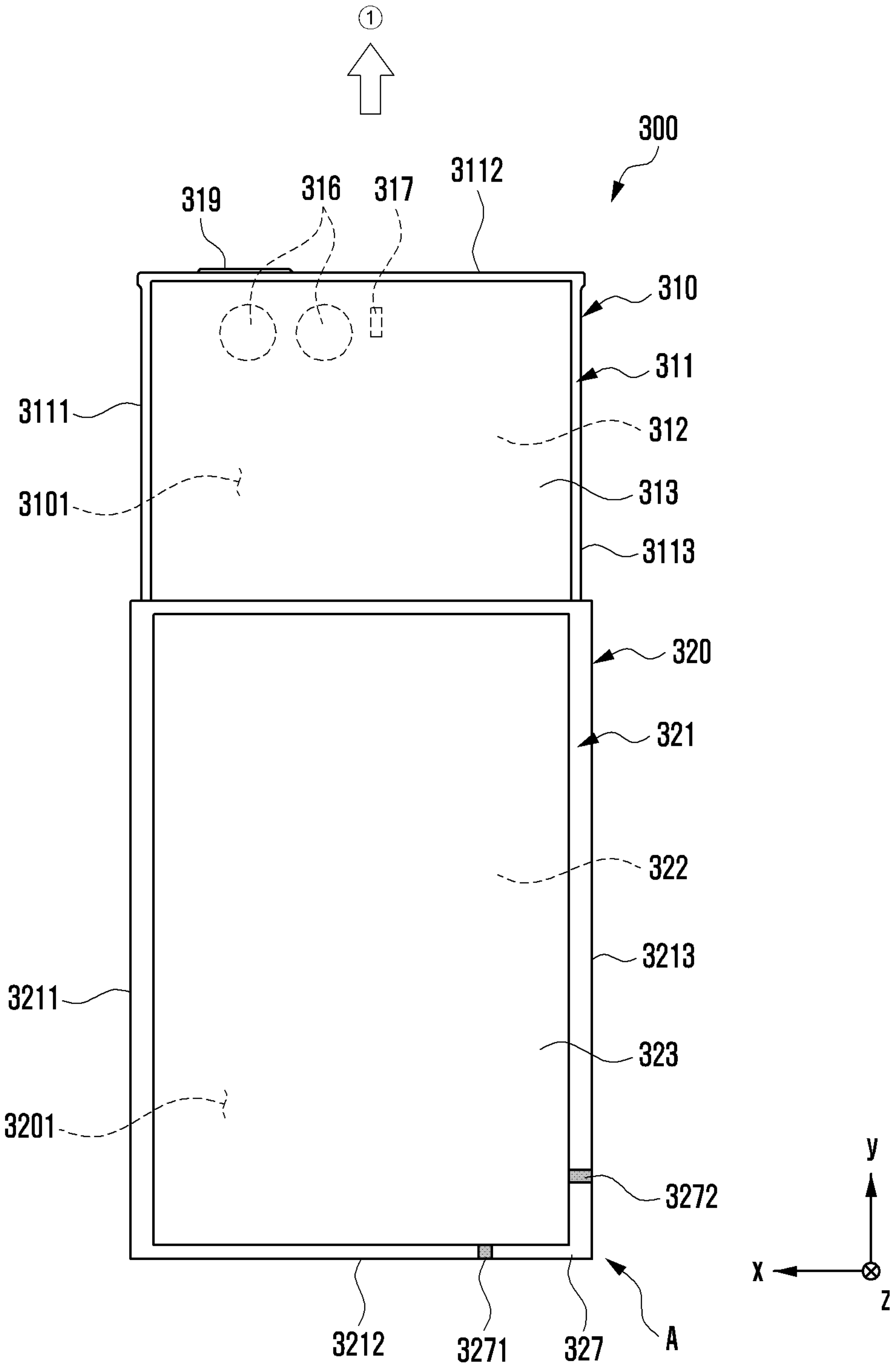

FIGS. 3A and 3B are diagrams illustrating a front surface and a rear surface of an electronic device in a closed state of the electronic device having a form factor according to various embodiments. FIGS. 3C and 3D are diagrams illustrating a front surface and a rear surface of an electronic device in an open state of the electronic device having a form factor according to various embodiments.

The electronic device 300 In FIGS. 3A, 3B, 3C and 3D (which may be referred to as FIGS. 3A to 3D) may be at least partially similar to the electronic device 101 in FIG. 1, may include the electronic device 101 in FIG. 1, or may further include an embodiment of the electronic device 101 in FIG. 1.

Referring to FIGS. 3A to 3D, the electronic device 300 may include a first housing 310 (e.g., a first housing structure, a moving part, or a sliding housing), a second housing 320 (e.g., a second housing structure, a fixed part, or a base housing) coupled to the first housing 310 to be movable in a designated direction (e.g., direction ① or direction ②) (e.g., the y-axis direction), and a flexible display 330 (e.g., an expandable display or a stretchable display) disposed to be supported by at least a portion of the first housing 310 and the second housing 320. According to an embodiment, the electronic device 300 may have the first housing 310 disposed to be drawn out (slide-out) in a first direction (direction ①) or to be inserted (slide-in) in a second direction (direction ②) opposite to the first direction (direction ①) based on the second housing 320 held by the user. According to an embodiment, at least a portion of the first housing 310 including a first space 3101 is received in a second space 3201 of the second housing 320 so as to be converted into the closed state (or slide-in state). According to an embodiment, the electronic device 300 may include a bendable member (or bendable support member) (e.g., the bendable member 340 in FIG. 4) (e.g., a multi-joint hinge module or a multi-bar assembly) which may at least partially form the same plane with at least a portion of the first housing 310 in the open state (or slide-out state) and may be at least partially received in the second space 3201 of the second housing 320 in the closed state. According to an embodiment, at least a portion of the flexible display 330 may be received in an internal space 3201 of the second housing 320 while being supported by the bendable member (e.g., the bendable member 340 in FIG. 4) in the closed state to be disposed to be invisible from the outside. According to various embodiments, at least a portion of the flexible display 330 may be disposed to be visible from the outside while being supported by the bendable member (e.g., the bendable member 340 in FIG. 4) for at least partially forming the same plane with the first housing 310 in the open state.

According to various embodiments, the electronic device 300 may include the first housing 310 including a first lateral member 311 and the second housing 320 including a second lateral member 321. According to an embodiment, the first lateral member 311 may include a first lateral surface 3111 having a first length along a first direction (e.g., the y-axis direction), a second lateral surface 3112 extending to have a second length longer than the first length along a direction (e.g., the x-axis direction) substantially perpendicular to the first lateral surface 3111, and a third lateral surface 3113 extending from the second lateral surface 3112 to be substantially perpendicular to the first lateral surface 3111 and having the first length. According to an embodiment, the first lateral member 311 may be at least partially formed of a conductive material (e.g., a metal). In various embodiments, the first lateral member 311 may be configured with a combination of a conductive material and a non-conductive material (e.g., polymer). According to an embodiment, the first housing 310 may include a first support member 312 extending from at least a portion of the first lateral member 311 to at least a portion of the first space 3101. According to an embodiment, the first support member 312 may be integrally formed with the first lateral member 311. In various embodiments, the first support member 312 may be configured separately from the first lateral member 311 and structurally coupled to the first lateral member 311.

According to various embodiments, the second lateral member 321 may be at least partially correspond to the first lateral surface 3111, and include a fourth lateral surface 3211 having a third length, a fifth lateral surface 3212 extending from the fourth lateral surface 3211 in a direction substantially parallel to the second lateral surface 3112 and having a fourth length shorter than the third length, and a sixth lateral surface 3213 extending from the fifth lateral surface 3212 to correspond to the third lateral surface 3113 and having the third length. According to an embodiment, the second lateral member 321 may be at least partially formed of a conductive material (e.g., a metal). In various embodiments, the second lateral member 321 may be configured with a combination of a conductive material and a non-conductive material (e.g., polymer). According to an embodiment, at least a portion of the second lateral member 321 may include a second support member 322 extending to at least a portion of the second space 3201 of the second housing 320. According to an embodiment, the second support member 322 may be integrally formed with the second lateral member 321. In various embodiments, the second support member 322 may be configured separately from the second lateral member 321 and structurally coupled to the second lateral member 321.

According to various embodiments, the first lateral surface 3111 and the fourth lateral surface 3211 may be slidably coupled to each other. According to various embodiments, the third lateral surface 3113 and the sixth lateral surface 3213 may be slidably coupled to each other. According to an embodiment, in the closed state, the first lateral surface 3111 may overlap the fourth lateral surface 3211 to be disposed to be substantially invisible from the outside. According to an embodiment, in the closed state, the third lateral surface 3113 may overlap the sixth lateral surface 3213 to be disposed to be substantially invisible from the outside. In various embodiments, at least a portion of the first lateral surface 3111 and the third lateral surface 3113 may be disposed to be at least partially visible from the outside in the closed state. According to an embodiment, in the closed state, the first support member 312 may overlap the second support member 322 to be disposed to be substantially invisible from the outside. In various embodiments, in the closed state, a portion of the first support member 312 may overlap the second support member 322 to be disposed to be invisible from the outside and a remaining portion of the first support member 312 may be disposed to be visible from the outside.

According to various embodiments, the electronic device 300 may include a first rear cover 313 coupled to the first housing 310 on the rear surface. According to an embodiment, the first rear cover 313 may be disposed through at least a portion of the first support member 312. In various embodiments, the first rear cover 313 may be integrally formed with the first lateral member 311. According to an embodiment, the first rear cover 313 may be formed by coated or colored glass, ceramic, or a metal (e.g., aluminum, stainless steel (STS), or magnesium), or a combination of at least two thereof. In various embodiments, the first rear cover 313 may extend to at least a portion of the first lateral member 311. In various embodiments, at least a portion of the first support member 312 may be replaced by the first rear cover 313.

According to various embodiments, the electronic device 300 may include a second rear cover 323 coupled to the second housing 320 on the rear surface. According to an embodiment, the second rear cover 323 may be disposed through at least a portion of the second support member 322. In various embodiments, the second rear cover 323 may be integrally formed with the second lateral member 321. According to an embodiment, the second rear cover 323 may be formed by coated or colored glass, ceramic, or a metal (e.g., aluminum, stainless steel (STS), or magnesium), or a combination of at least two thereof. In various embodiments, the second rear cover 323 may extend to at least a portion of the second lateral member 321. In various embodiments, at least a portion of the second support member 322 may be replaced by the second rear cover 323.

According to various embodiments, the electronic device 300 may include the flexible display 330 disposed to be supported by at least a portion of the first housing 310 and the second housing 320. According to an embodiment, the flexible display 330 may include a first part 330*a* (e.g., a flat part) always visible from the outside and a second part 330*b* (e.g., a bendable part) extending from the first part 330*a* and at least partially received in the second space 3201 of the second housing 320 to allow at least a portion thereof to be invisible from the outside in the closed state. According to an embodiment, the first part 330*a* may be disposed to be supported by the first housing 310 and the second part 330*b* may be disposed to be at least partially supported by a bendable member (e.g., the bendable member 340 in FIG. 4). According to an embodiment, in a state in which the first housing 310 is slid-out along the first direction (direction ①), the second part 330*b* of the flexible display 330 may be disposed to extend from the first part 330*a*, configure substantially the same plane with the first part 330*a*, and visible from the outside while being supported by the bendable member (e.g., the bendable member 340 in FIG. 4). According to an embodiment, in a state in which the second housing 320 is slid-in along the second direction (direction ②), the second part 330*b* of the flexible display 330 may be received in the second space 3201 of the second housing 320 and disposed to be invisible from the outside. Accordingly, the electronic device 300 may induce a display area of the flexible display 330 to be variable according to the first housing 310 moving from the second housing 320 along a designated direction (e.g., the y-axis direction) in a sliding manner.

According to various embodiments, the flexible display 330 may have a length variable in the first direction (direction ①) according to a sliding movement of the first housing 310 moved based on the second housing 320. For example, the flexible display 330 may have a first display area (e.g., an area corresponding to the first part 330*a*) corresponding to a first length L1 in the closed state. According to an embodiment, the flexible display 330 may be extended to have a third display area (e.g., an area including the first part 330*a* and the second part 230*b*) larger than the first display area and corresponding to a third length L3 longer than the first length L1, according to a sliding movement of the first housing 310 which has additionally moved by a second length L2 based on the second housing 320 in the open state.

According to various embodiments, the electronic device 300 may include at least one of an input device (e.g., a microphone 303-1), an audio output device (e.g., a call receiver 306 or a speaker 307), a sensor module 304 or 317, a camera module (e.g., a first camera module 305 or a second camera module 316), a connector port 308, a key input device 319, or an indicator (not shown) each of which is disposed in the first space 3101 of the first housing 310. According to an embodiment, the electronic device 300 may include another input device (e.g., a microphone 303) disposed in the second housing 320. In an embodiment, the electronic device 300 may be configured to omit at least one of the above-described components or additionally include other components. In an embodiment, at least one of the aforementioned components may be disposed in the second space 3201 of the second housing 320.

According to various embodiments, the input device may include the microphone 303-1. In an embodiment, the input device (e.g., the microphone 303-1) may include multiple microphones arranged so as to detect a direction of a sound. The sound output device may include, for example, the call receiver 306 and the speaker 307. According to an embodiment, the speaker 307 may correspond to the outside through at least one speaker hole formed through the first housing 310 at a position (e.g., the second lateral surface 3112) always exposed the outside regardless of the closed/open (or slide-in/slide-out) state. According to an embodiment, the connector port 308 may correspond to the outside through at least one connector hole port formed through the first housing 310 in the open state. In various embodiments, the connector port 308 may correspond to the outside through an opening formed through the second housing 320 and corresponding to the connector port hole in the closed state. In various embodiments, the call receiver 306 may include a speaker (e.g., a piezo speaker) operating without a separate speaker hole.

According to various embodiments, the sensor module 304 or 317 may generate an electrical signal or a data value corresponding to an internal operation state or external environment state of the electronic device 300. The sensor module 304 or 317 may include a first sensor module 304 (e.g., a proximity sensor or an illuminance sensor) disposed on the front surface of the electronic device 300 and/or a second sensor module 317 (e.g., a hear rate monitoring (HRM) sensor) disposed on the rear surface of the electronic device 300. According to an embodiment, the first sensor module 304 may be disposed under the flexible display 330 on the front surface of the electronic device 300. According to an embodiment, the first sensor module 304 and/or the second sensor module 317 may include at least one of a proximity sensor, an illumination sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 305 disposed on the front surface of the electronic device 300 and a second camera module 316 disposed on the rear surface of the electronic device 300. According to an embodiment, the electronic device 300 may include a flash (not shown) located adjacent to the second camera module 316. According to an embodiment, the camera modules 305 or 316 may include one or more of lenses, an image sensor, and/or an image signal processor. According to an embodiment, the first camera module 305 may be disposed under the flexible display 330 and configured to photograph a subject through a portion of an activation area (e.g., a display area) of the flexible display 330.

According to various embodiments, the first camera module 305 of the camera modules and a certain sensor module 304 of the sensor modules 304 and 317 may be disposed to detect an external environment through the flexible display 330. For example, the first camera module 305 or the certain sensor module 304 may be disposed in the first space 3201 of the first housing 310 to be contact with the external environment through a transmission area or a perforated opening formed on the flexible display 330. According to an embodiment, an area facing the first camera module 305 of the flexible display 330 may correspond to a portion of a display area configured to display contents, and may be formed to be a transmission area having predetermined transmittance. According to an embodiment, the transmission area may be configured to have transmittance in a range of about 5% to about 20%. Such transmission area may include an area overlapping an effective area (e.g., a view-angle region) of the first camera module 305 through which light for imaging to an image sensor to generate an image passes. For example, the transmission area of the flexible display 330 may include an area having a lower pixel arrangement density and/or wire density than a peripheral area. For example, the transmission area may be substituted with the aforementioned opening. For example, a certain camera module 305 may include an under-display camera (UDC). In various embodiments, a certain sensor module 304 may be disposed in the internal space of the electronic device 300 to perform functions thereof without being visually exposed through the flexible display 330.

According to various embodiments, the electronic device 300 may include at least one antenna (e.g., the antenna 197 in FIG. 1) electrically connected to a wireless communication circuit (e.g., the wireless communication circuit 192 in FIG. 1) disposed in the second housing 310. According to an embodiment, the electronic device 300 may include a bezel antenna A disposed through the conductive second lateral member 321 of the second housing 310. For example, the bezel antenna A may be disposed on at least a portion of the fifth lateral surface 3212 and the sixth lateral surface 3213 of the second lateral member 321 and may include a conductive part 327 that is electrically segmented through at least one segment part 3271 or 3272 formed of a non-conductive material (e.g., polymer). According to an embodiment, a wireless communication circuit (e.g., the wireless communication module 192 in FIG. 1) may be configured to transmit or receive a wireless signal in at least one frequency band (e.g., about 800 MHZ to 6000 MHZ) (e.g., a legacy band) designated through the conductive part 327. According to an embodiment, the electronic device 300 may include a lateral cover 3212*a* disposed in the fifth lateral surface 3212 to cover at least a portion of the at least one segment part 3271. In various embodiments, the bezel antenna A may be disposed on at least one of the second lateral surface 3112, the fourth lateral surface 3211, the fifth lateral surface 3212, and the sixth lateral surface 3213. In various embodiments, the electronic device 300 may further include at least one antenna module (e.g., a 5G antenna module or antenna assembly) disposed in the internal space (e.g., the first space 3101 or the second space 3201) and disposed to transmit or receive a wireless signal in a frequency band ranging from about 3 GHz to 100 GHz through another wireless communication circuit (e.g., the wireless communication module 192 in FIG. 1).

According to various embodiments, a slide-in/slide-out operation of the electronic device 300 may be automatically preformed. For example, the slide-in/slide-out operation of the electronic device 300 may be performed through a gearing operation of a rack gear (e.g., the rack gear 3251 in FIG. 4) disposed in the second space 3201 of the second housing 320 and meshed with a pinion gear 361 and a driving motor (e.g., the driving motor 360 in FIG. 4) including the pinion gear 361 disposed in the first space 3101 of the first housing 310. For example, in case of detecting a triggering operation for switching from the closed state to the open state or from the open state to the closed state, the processor (e.g., the processor (120 in FIG. 1) of the electronic device 300 may operate the driving motor (e.g., the driving motor 360 in FIG. 4) disposed inside the electronic device 300. According to an embodiment, the triggering operation may include selecting (e.g., touching) an object displayed on the flexible display 330 or operating a physical button (e.g., a key button) included in the electronic device 300.

Figure 4:
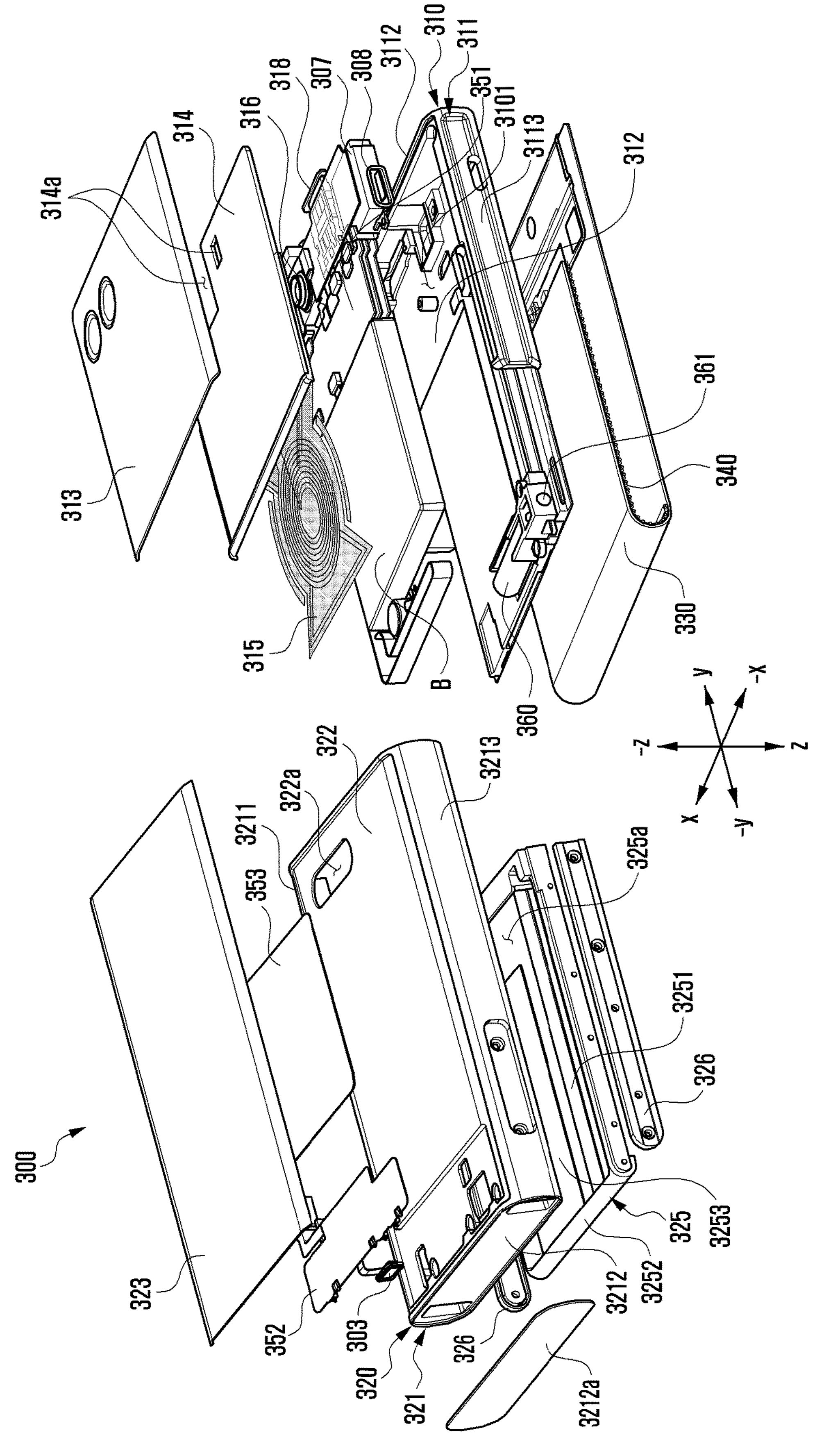
FIG. 4 is an exploded perspective view illustrating an electronic device having a form factor according to various embodiments.

FIG. 4 is an exploded perspective view illustrating an electronic device having a form factor according to various embodiments.

In describing the electronic device 300 of FIG. 4, components that are substantially the same as those of the electronic device 300 of FIGS. 3A to 3D are given the same reference numerals, and detailed descriptions thereof may be omitted.

Referring to FIG. 4, the electronic device 300 may include a first housing 310 including a first space 3101, a second housing 320 movably (e.g., slidably) coupled to the first housing 310 and including a second space (e.g., the second space 3201 in FIG. 3C), a bendable member 340 disposed in the second space 3201 to be at least partially rotatable, a flexible display 330 disposed to be supported by at least a portion of the bendable member 340 and the first housing 310, and a driving module configured to drive the first housing 310 in a direction (e.g., the −y-axis direction) in which the first housing is slid into the second housing 320 and/or a direction (e.g., the y-axis direction) in which the first housing is slid out from the second housing 320. According to an embodiment, the driving module may include a driving motor 360 disposed in the first space 3101 and including a pinion gear 361 and a rack gear 3251 disposed to be meshed with the pinion gear 361 in the second space 3201. According to an embodiment, the driving module may further include a reduction module disposed to be coupled to the driving motor 360 to reduce a rotation speed and increase driving force. According to an embodiment, the driving motor 360 may be disposed to be supported by at least a portion of the first support member 312 in the first space 3101 of the first housing 310. According to an embodiment, the driving motor 360 may be fixed to an end part (e.g., an edge) of the first support member 312 in the slide-in direction (e.g., the −y-axis direction) in the first space 3101.

According to various embodiments, the electronic device 300 may include multiple electronic components disposed in the first space 3101. According to an embodiment, the multiple electronic components may include a first substrate 351 (e.g., a main substrate), a camera module 316 disposed around the first substrate 351, a socket module 318 (e.g., a SIM tray), a speaker 307, a connector port 308, and a battery B. According to an embodiment, the multiple electronic components are disposed together with the driving motor 360 around the first substrate 351 in the first space 3101 of the first housing 310 and thus may allow effective electrical connection.

According to various embodiments, the electronic device 300 may include a rear bracket 314 disposed to cover at least a portion of the multiple electronic components between the first support member 312 of the first housing 310 and the first rear cover 313. According to an embodiment, the rear bracket 314 may be structurally coupled to at least a portion of the first support member 312. In various embodiments, the rear bracket 314 may be omitted. According to an embodiment, the rear bracket 314 may be disposed to cover multiple electronic components and support the first rear cover 313. According to an embodiment, the rear bracket 314 may include a notch area 314*a* or an opening 314*a* (e.g., a through-hole) configured on an area corresponding to the camera module 316 and/or a second module (e.g., the sensor module 317 in FIG. 3D).

According to various embodiments, the electronic device 300 may include a wireless charging coil 315 for wireless charging. The wireless charging coil 315 may correspond to a coil utilizing, for example, magnetic induction and may include near field communication (NFC), magnetic secure transmission (MST), and/or wireless power consortium (WPC), which may be used for communication or utilized for wireless charging.

According to an embodiment, the camera module 316 and/or the sensor module 317 may be disposed to detect the external environment through the notch area 314*a* or the opening 314*a*. According to an embodiment, the first rear cover 313 may include a transparent area corresponding at least to the camera module 316 and/or the sensor module 317. In various embodiments, the camera module 316 and/or the sensor module 317 may be configured to operate only when the electronic device 300 is in the open state.

According to various embodiments, the electronic device 300 may include a plate type support bracket 325 (e.g., a display support bar (DSB)) disposed in the second space 3201 of the second housing 320 and slidably coupled to at least a portion of the first support member 312. According to an embodiment, the support bracket 325 may include an opening 325*a* having a designated size. According to an embodiment, the support bracket 325 may include a support part 3252 disposed at one end thereof and including an external surface formed to be curved so as to support the rear surface of the bendable member 340 which is bent during a sliding operation. According to an embodiment, the support bracket 325 may include a support plate 3253 configured to extend from at least a portion of the support part 3252 to at least a portion of the opening 325*a* so as to support the rear surface of the bendable member 340 in the open state. According to an embodiment, the support bracket 325 may include a rack gear 3251 passing through the opening 325*a* and fixed to have a length along a direction parallel with the sliding direction. In various embodiments, the rack gear 3251 may be integrally formed with the support bracket 325. According to an embodiment, the electronic device 300 may include a pair of guide rails 326 disposed at both lateral surfaces of the support bracket 325 to guide both end portions of the bendable member 340 in the sliding direction.

According to various embodiments, the second housing 320 may include an opening 322*a* (e.g., a through-hole) through the second support member 322 at an area corresponding to the camera module 316 and/or the sensor module 317 disposed in the first housing 310 when the electronic device 300 is in the closed state. According to an embodiment, the camera module 316 and/or the sensor module 317 may detect the external environment through the opening 322*a* formed on the second housing 320 when the electronic device 300 is in the closed state. In this case, an area of the second rear cover 323 corresponding at least to the camera module 316 and/or the sensor module 317 may be processed to be transparent.

According to various embodiments, the electronic device 300 may include a second substrate 352 and an antenna member 353 disposed in a space between the second support member 322 of the second housing 320 and the second rear cover 323. According to an embodiment, the second substrate 352 and the antenna member 353 may be electrically connected to the first substrate 351 through at least one electrical connection member (e.g., a flexible printed circuit board (FPCB) or a flexible RF cable (FRC)). In various embodiments, the antenna member 353 may be electrically connected to the second substrate 352, and, through the second substrate 352, electrically connected to the first substrate 351. According to various embodiments, an electronic device 101 or 300 may include a display having the structure of FIGS. 3A to 3D. According to various embodiments, the electronic device 101 may include various form factors expandable for various types of displays in addition to the form factor described with reference to FIGS. 3A to 3D. For example, the electronic device 101 may be realized in various form factors based on the sliding (or rolling) method according to the form factor structure of the electronic device 101 or 300 in FIGS. 3A to 3D. Examples thereof will be described in greater detail below with reference to drawings (e.g., FIGS. 5A, 5B, 5C, 5D, 5E, 5F and 5G).

FIGS. 5A, 5B, 5C, 5D, 5E, 5F, and 5G are various views illustrating various examples of an expandable display structure of an electronic device according to various embodiments.

Referring to FIGS. 5A, 5B, 5C, 5D, 5E, 5F and 5G (which may be referred to as FIGS. 5A to 5G), the electronic device (e.g., the electronic device 101 in FIG. 1) according to various embodiments may include a housing structure which allows the display to expand in at least one of upward, downward, leftward, and rightward directions. For example, FIGS. 5A to 5G may show examples of various form factors of an electronic device including a display of which a display area is variable according to an embodiment.

Figure 5A:
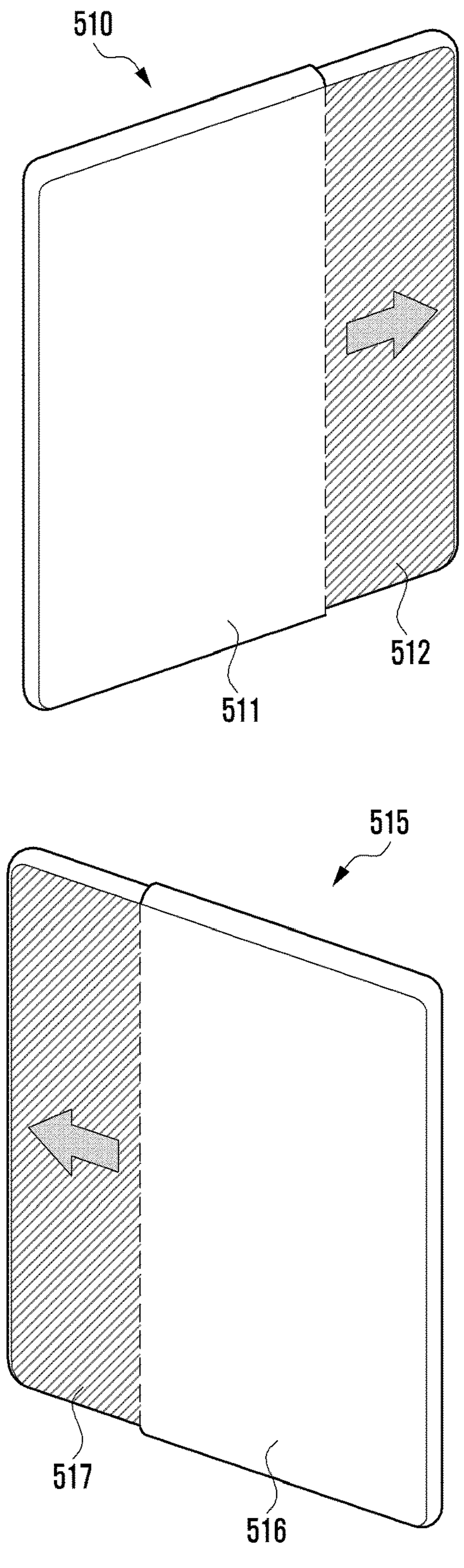
FIGS. 5A, 5B, 5C, 5D, 5E, 5F, and 5G are diagrams illustrating various examples of an expandable display structure of an electronic device according to various embodiments.

As shown in FIG. 5A, the electronic device may be realized to enable sliding movement in one direction. For example, the electronic device may include a display 510 expandable in a first direction (e.g., a rightward direction). For example, in a first state (e.g., a closed state or reduction state) in which the display 510 is not expanded, a screen may be displayed through a first display area 511 and a second display area 512 may be received inside the housing and deactivated.

According to an embodiment, the electronic device may be converted from the first state into a second sate (e.g., an open state or expanding state) by a user manipulation or a preconfigured input.

According to an embodiment, when the electronic device is converted from the first state into the second state, the electronic device, the second display area 512 is drawn out in the first direction to be visually exposed to the outside. In the second state in which the display 510 is expanded, the electronic device may convert the second display area 512 into an activation state and display a screen through the first display area 511 and the second display area 512. According to an embodiment, when the electronic device is converted from the first state into the second state, in case that the second housing slides in one direction (e.g., the first direction) with respect to the first housing, at least a portion (e.g., corresponding to a left partial area of the first display area 511 shown in the drawing) of the display 510 received in the first housing is drawn out and the display area of the display 510 may be expanded. When the electronic device is converted from the second state into the first state, in case that the second housing slides in a second direction with respect to the first housing, a portion (e.g., corresponding to a left partial area of the first display area 511 shown in the drawing) of the display 510 is inserted into the first housing and the display area of the display 510 may be reduced. According to an embodiment, in the case of the electronic device, the display area (e.g., the first display area 511) of the display 510 may have, for example, a 4:3 ratio in the first state (e.g., the closed state) and the display area (e.g., the first display area 511 and the second display area 512) of the display 510 may expand to a 21:9 ratio in the second state (e.g., the open state).

According to an embodiment, the electronic device may include the first display area 516 displaying a screen in the first state (e.g., the closed state) in which the display 515 is not expanded and the second display area 517 expanding in the second direction (e.g., the leftward direction) and displaying a screen in the second state (e.g., the open state) in which the display 515 is expanded.

Figure 5B:
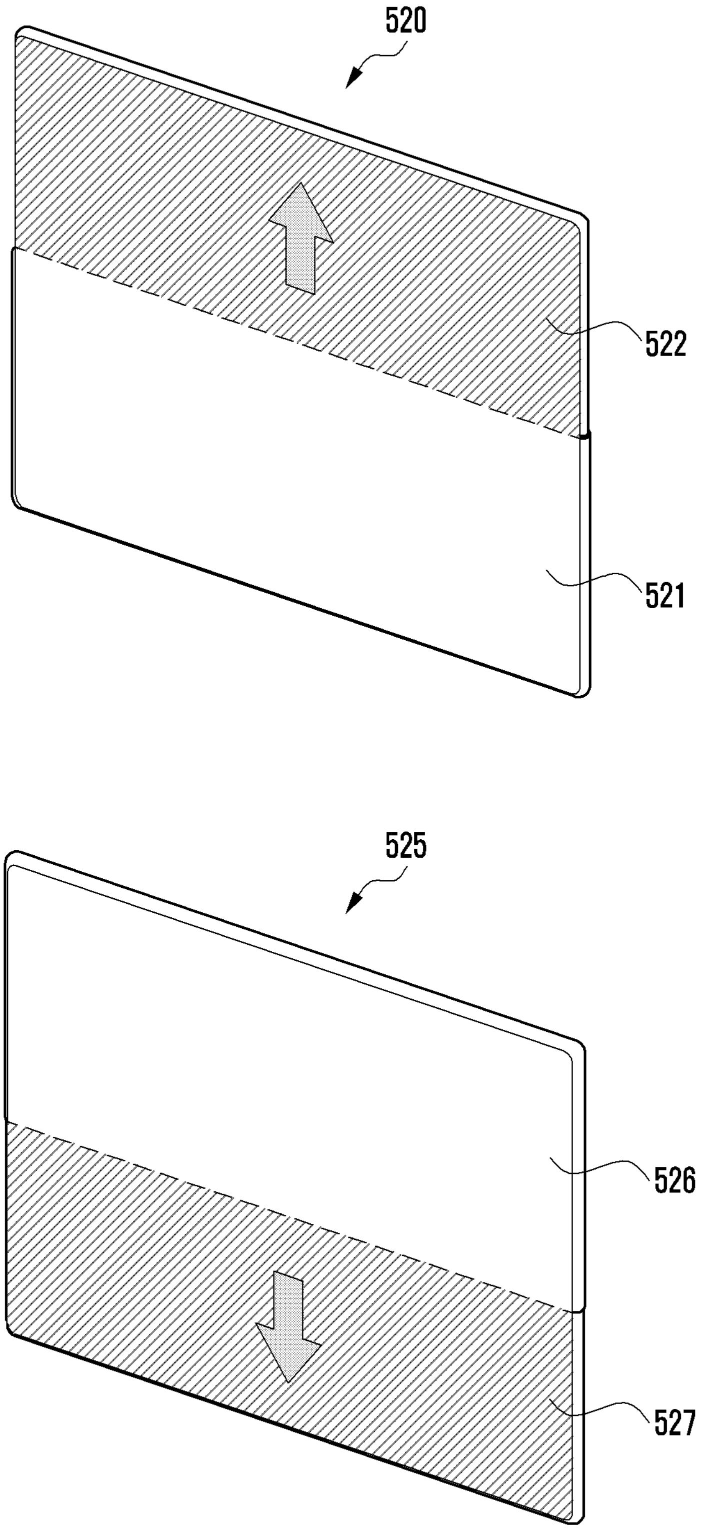

As shown in FIG. 5B, the electronic device may include a display expandable in a third direction (e.g., an upward direction) or a fourth direction (e.g., a downward direction).

According to an embodiment, the electronic device may include the first display area 521 displaying a screen in the first state in which the display 520 is not expanded and the second display area 522 expandable in the third direction and displaying a screen in a third state in which the display is expanded. According to an embodiment the electronic device may include the first display area 526 displaying a screen in the first state in which the display 525 is not expanded and the second display area 527 expandable in the fourth direction and displaying a screen in the second state in which the display is expanded.

Figure 5C:
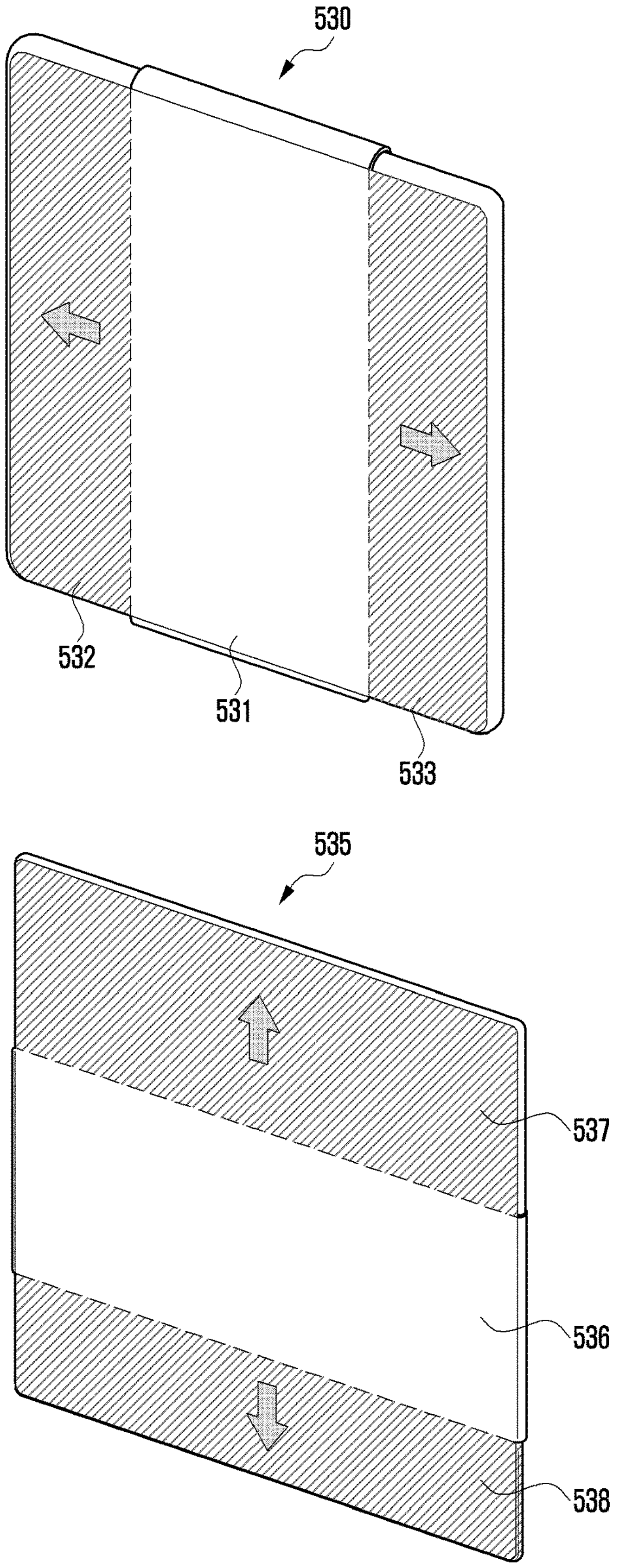

As shown in FIG. 5C, the electronic device may include a display expandable in both leftward and rightward directions or up and down directions.

According to an embodiment the electronic device may include the first display area 531 displaying a screen in the first state in which the display 530 is not expanded, the second display area 532 expandable in the first direction and displaying a screen in the second state in which the display is expanded, and a third display area 533 expandable in the second direction and displaying a screen in the second state in which the display is expanded. In this case, depending on a user manipulation, a preconfigured input, or a type of output content, at least one of the second display area 532 and the third display area 533 may be expanded.

According to an embodiment, the electronic device including the housing structure shown in FIG. 5C may be realized to enable sliding movement in both directions. For example, in the electronic device, the display area (e.g., the first display area 531) of the display 530 may have, for example, a 21:9 ratio in the first state (e.g., the closed state) and the display area (e.g., the first display area 531, the second display area 532, and the third display area 533) of the display 530 may expand to a 4:3 ratio in the second state (e.g., the open state). When the electronic device is converted from the first state into the second state, in case that the second housing and the third housing respectively slide in both directions, for example, the first direction (e.g., the leftward direction) and the second direction (e.g., the rightward direction) with respect to the first housing, a portion (e.g., the second display area 532) of the display 532 received in the first housing may be drawn out in the first direction and another portion (e.g., the third display area 533) may be drawn out in the second direction so that the display area of the display 530 may be expanded. Although not shown in the drawing, in the electronic device, only a portion (e.g., the first display area 531 and the second display area 532) of the display 530 may be expanded in the first direction or another portion (e.g., the first display area 531 and the third display area 533) of the display 530 may be expanded in the second direction.

According to an embodiment, the electronic device may include the first display area 536 displaying a screen in the first state in which the display 535 is not expanded, the second display area 537 expandable in the third direction and displaying a screen in the second state in which the display is expanded, and a third display area 538 expandable in the fourth direction and displaying a screen in the second state in which the display is expanded.

According to various embodiments, the electronic device may include a display expandable both upward (or downward direction) and rightward direction (or leftward direction).

Figure 5D:
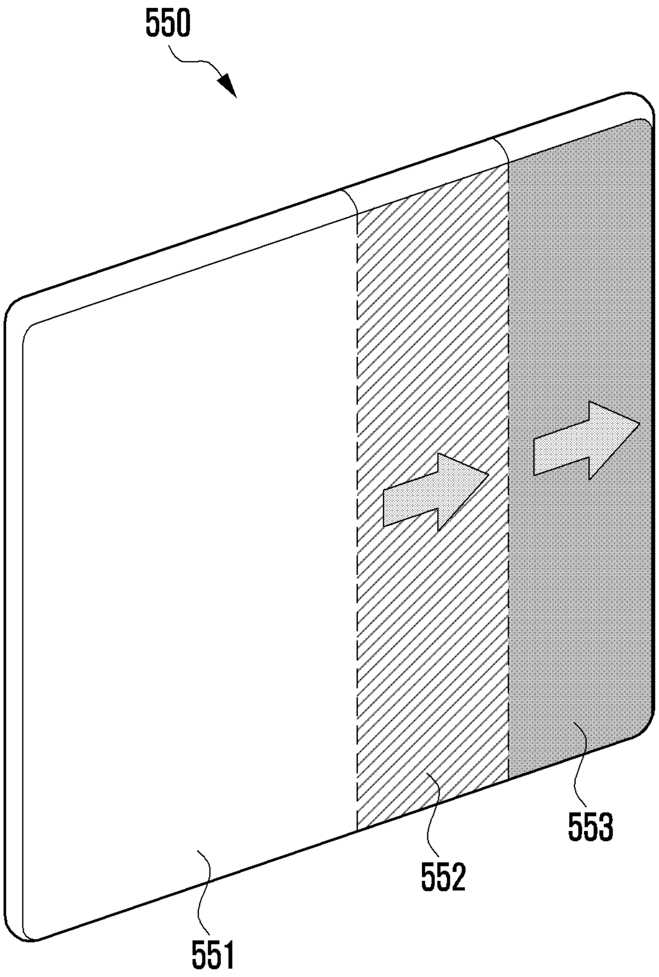

As shown in FIG. 5D, the electronic device may include a display step-wisely expandable and only a portion of the display may be expanded.

According to an embodiment, the electronic device may include the first display area 551 displaying a screen in the first state in which the display 550 is not expanded, the second display area 552 expandable in the first direction (e.g., the rightward direction) in the second state in which the display is expanded and displaying a screen, and the third display area 553 additionally expandable in the first direction (e.g., the rightward direction) and displaying a screen in a third state in which the display is additionally expanded.

According to an embodiment, the electronic device may activate only the second display area 552 of the display 550 to display a screen. According to an embodiment, the electronic device may activate both the second display area 552 and the third display area 553 of the display 550 to display a screen. For example, when expanded to the second display area 552, the display 550 may be fixed by a support structure and may be expanded from the second display area 552 to the third display area 553 according to additional force.

Figure 5E:
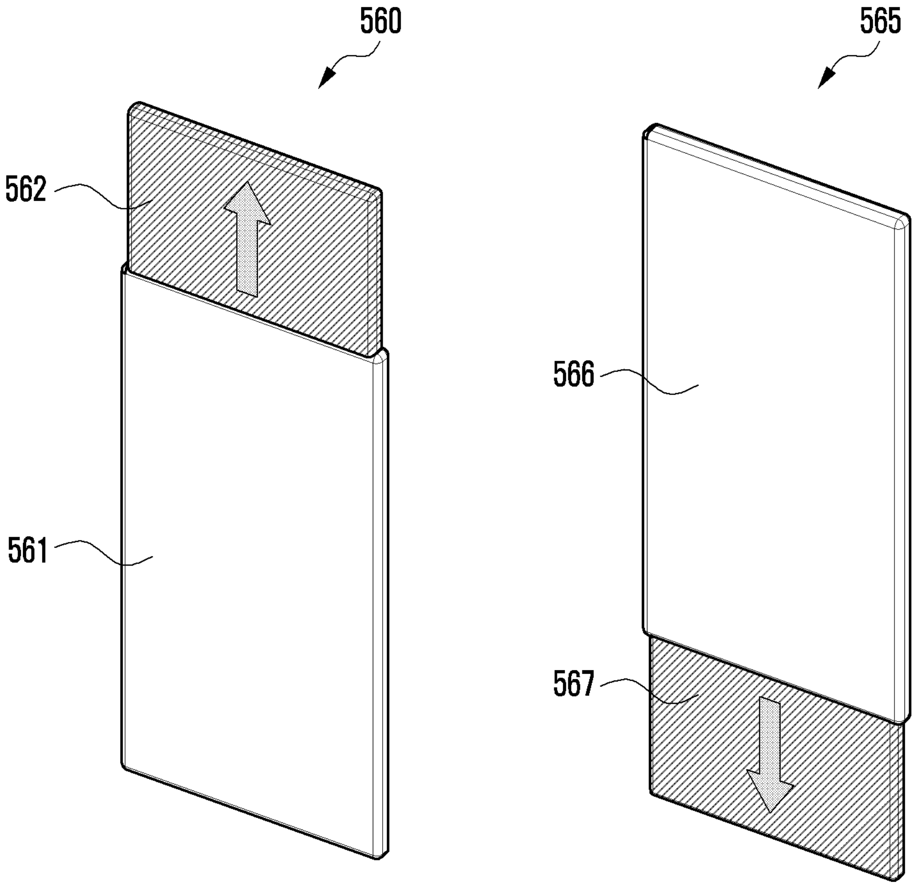
Figure 5F:
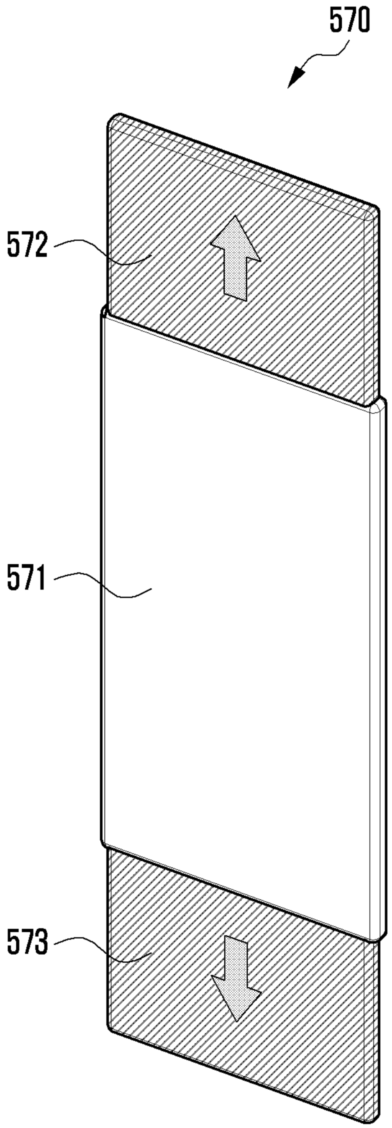

As shown in FIG. 5E, the electronic device may include a display expandable in the third direction (e.g., the upward direction) or the fourth direction (e.g., the downward direction). According to an embodiment, the electronic device shown in FIG. 5E may include a bar-type form factor in the closed state.

According to an embodiment, the electronic device may include the first display area 561 displaying a screen in the first state in which the display 560 is not expanded and the second display area 562 expandable in the second direction and displaying a screen in the second state in which the display is expanded. According to an embodiment, the electronic device may include the first display area 566 displaying a screen in the first state in which the display 565 is not expanded and the second display area 567 expandable in the fourth direction and displaying a screen in the second state in which the display is expanded.

As shown in FIG. 5C, the electronic device may include a display expandable in both upward and downward directions. According to an embodiment, the electronic device shown in FIG. 5F may include a bar-type form factor in the closed state.

According to an embodiment, the electronic device may include the first display area 571 displaying a screen in the first state in which the display 570 is not expanded, the second display area 572 expandable in the third direction and displaying a screen in the second state in which the display is expanded, and a third display area 573 expandable in the fourth direction and displaying a screen in the second state in which the display is expanded. In this case, depending on a user manipulation, a preconfigured input, or a type of output content, at least one of the second display area 572 and the third display area 573 may be expanded.

In various embodiments described below, the electronic device 101 may include a display having at least one of the structures in FIGS. 2A to 5F. According to various embodiments, in addition to the form factors described with reference to FIGS. 2A to 5F, various shaped expandable form factors of a display may be included.

According to various embodiments, in addition to the form factors of the electronic device described in FIGS. 5A to 5F, the electronic device 101 may be realized to have various form factor according to various sliding movements of the display. An example thereof is shown in FIG. 5G.

Figure 5G:
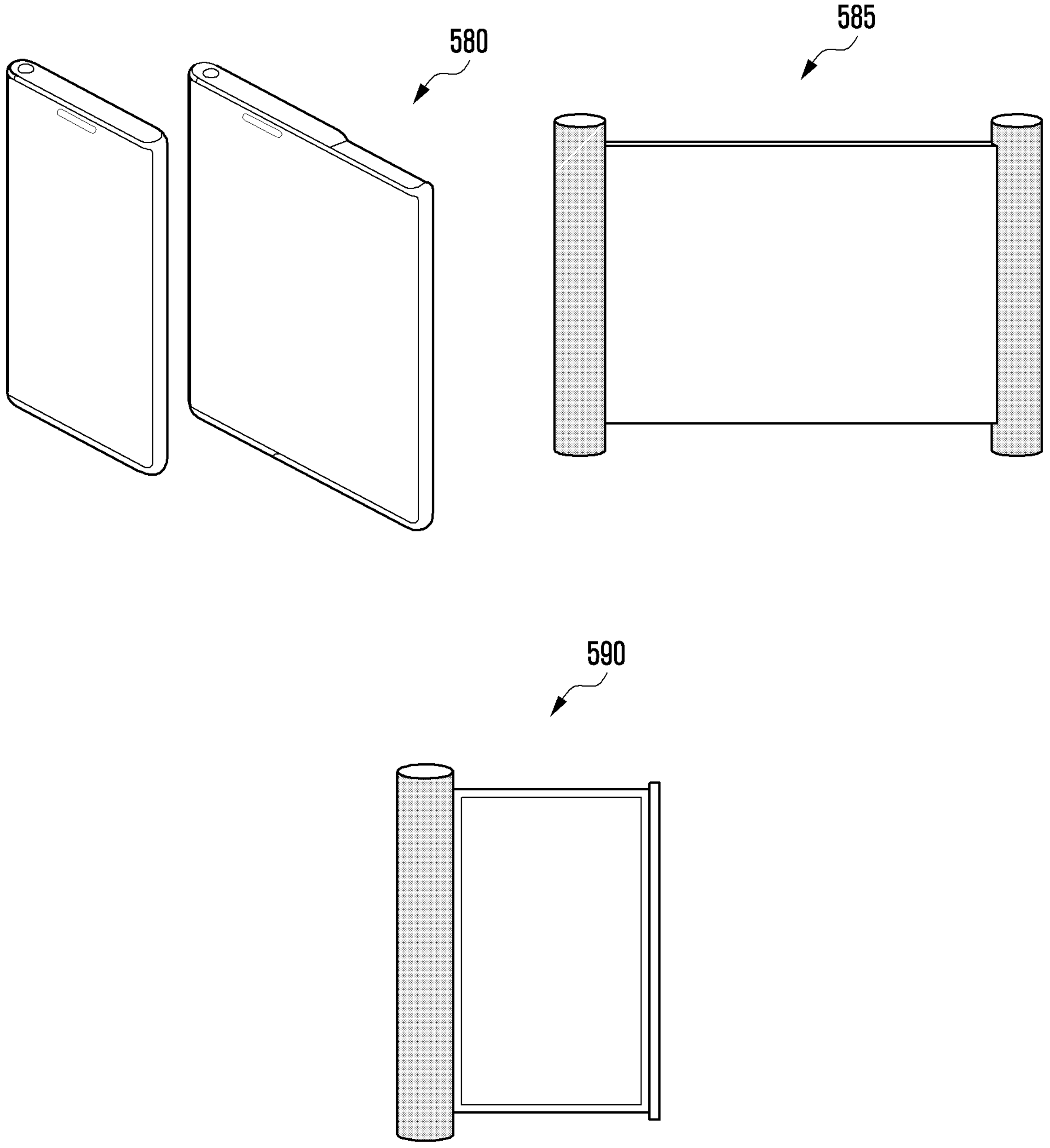

For example, as shown in FIG. 5G, the electronic device may include various form factor such as a rollable (or slidable) device 580, 585, or 590 which may expand an area of the display in a rolling manner and/or a sliding manner. According to an embodiment, as shown in FIG. 5G, the electronic device may be realized in various forms and the display may be provided in various manners depending on the realization form of the electronic device.

According to an embodiment, the electronic device (e.g., 580, 585, or 590) may include a roll-up display (e.g., a rollable display) in the housing. According to an embodiment, the electronic device may indicate an electronic device in which the display is bendable and transformable so that at least a portion thereof may be wound or rolled to be received in the housing (not shown). According to user needs, the electronic device may unfold the display or visually expose more area of the display to the outside to expand and use a screen display area. For example, in the electronic device 101, depending on an extent to which the user unfolds the display, the area exposed to the outside of the display may vary.

According to an embodiment, the electronic device 101 may include a housing structure to protect the display rolled up in a circle and may operate in a structure in which the display is open (e.g., expands) inside the housing. For example, as shown in FIG. 5G, at least a portion of the display may be received in a cylindrical housing or flat housing.

According to various embodiments, the state (e.g., an open state, an intermediated state, or a closed state) of the display in the electronic device 101 may be converted manually by the user, or automatically through a drive mechanism (e.g., a drive motor, a reduction gear module and/or a gear assembly) disposed inside the housing. According to an embodiment, the drive mechanism may be triggered based on a user input. According to an embodiment, the user input for triggering the drive mechanism may include a touch input through the display module 160, a force touch input, and/or a gesture input. For example, in case that a signal is produced from various sensors such as a pressure sensor, the electronic device 101 may be converted from the closed state into the open state or from the open state into the closed state. For example, in case of carrying or holding the electronic device 101 by a hand, a squeeze gesture pressurizing a designated section of the electronic device 101 by a portion (e.g., a palm or a finger) of the hand may be detected through a sensor and in response thereto, the electronic device 101 may be converted from the closed state into the open state or from the open state into the closed state. In an embodiment, the user input for triggering the drive mechanism may include a voice input or an input of a physical button visually exposed to the outside of the housing.

As shown above, the electronic device 101 according to an embodiment of the disclosure may be realized as a device capable of changing a display area of the display in various rolling (or sliding) manners.

Figure 6:
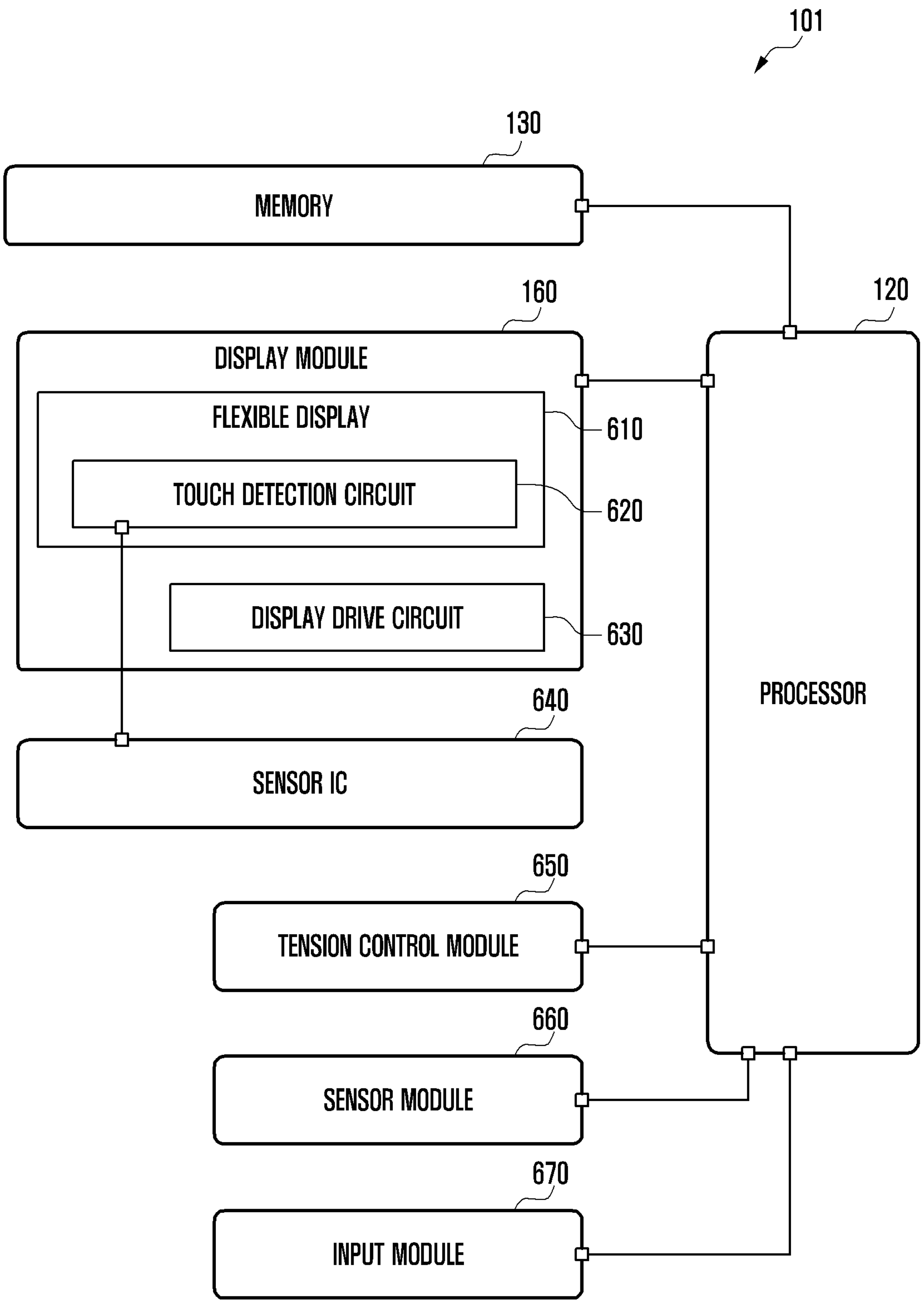
FIG. 6 is a block diagram illustrating an example configuration of an electronic device according to various embodiments.

FIG. 6 is a block diagram illustrating an example configuration of an electronic device according to various embodiments.

Referring to FIG. 6, in an embodiment, the electronic device 101 (e.g., the electronic device 200 or 300) may include a processor (e.g., including processing circuitry) 120 (e.g., the processor 120 in FIG. 1), a memory 130 (e.g., the memory 130 in FIG. 1), a display module (e.g., including a display) 160 (e.g., the display module 160 in FIG. 1), a sensor integrated circuit (IC) 640, a tension control module (e.g., including tension control circuitry) 650, a sensor module (e.g., including at least one sensor) 660 (e.g., the sensor module 176 in FIG. 1), and/or an input module (e.g., including input circuitry) 670 (e.g., the input module 150 in FIG. 1). According to an embodiment, the electronic device 101 may correspond to the electronic device in FIG. 1, may include at least a portion of the components of the electronic device in FIG. 1, or may be realized by additionally including another component.

According to an embodiment, the electronic device 101 may include a first housing 210 or 310 and a second housing 220 or 320 which is coupled to the first housing 210 or 310 in a first state (e.g., the closed state) of the electronic device 101, slides in a designated direction from the first housing 210 or 310 in the first state to support a second state (e.g., the open state) of at least partially expanding the display of the electronic device 101.

According to an embodiment, the display module 160 may include a flexible display 610 (e.g., the flexible display 230 or 430) of which display area is partially variable in conjunction with the sliding movement of the second housing 220 or 320 and a display drive circuit 630 for driving the display module 160.

According to an embodiment, the flexible display 610 may include a first display area (e.g., a fixed area) fixedly disposed in the first housing 210 or 310 and a second display area (e.g., an expansion area) disposed to be exposed by rolling of the second housing 220 or 320 or inserted into the first housing 210 or 310 and/or the second housing 220 or 320. In an embodiment, the first display area may be visually exposed in the first state (e.g., the closed state or a slide-in state) and/or the second state (e.g., the open state or a slide-out state) of the electronic device 101. In an embodiment, the second display area may be visually exposed in the second state of the electronic device 101 and may partially expand the area of the display 610 according to the sliding movement of the second housing 220 or 320.

According to an embodiment, the portion (e.g., a bendable section) of the flexible display 610 may be realized to be slid out from the inner space of the second housing 220 or 320 of the electronic device 101. For example, in case that the electronic device 101 is converted from the closed state into the open state or partially open state, the bendable section of the flexible display 610 may be slidably drawn out from the internal space of the electronic device 101 and as such, the screen may be fully or partially expanded. In case that the electronic device 101 is converted from the open state or partially open state into the closed state, the bendable section may be slidably inserted into the internal space of the electronic device 101 and as such, the screen may be fully or partially reduced.

According to an embodiment, the display drive circuit 630 may correspond to a circuit for controlling the flexible display 610 and include, for example, a display drive integrated circuit (IC) (DDI) or a DDI chip. According to an embodiment, the display drive circuit 630 may include a touch DDI (TDDI) disposed in a chip on panel (COP) or chip on film (COF) manner. The display drive circuit 630 may receive a command signal from the processor 120 and control at least one display of the flexible display 610 to display a screen corresponding thereto. The display drive circuit 630 may serve as a signal passage between the flexible display 610 and the processor 120 and control pixels through thin film transistors (TFT) within the flexible display 610. For example, the display drive circuit 630 may have a function to turn on or turn off pixels included in the flexible display 610 and may be electrically connected to a gate electrode of the TFT.

The display drive circuit 630 may have a function to make a color difference by controlling an amount of RGB (red, green, and blue) signals of a pixel and may be electrically connected to a source electrode of the TFT. The TFT may include a gate line (or scan line) for electrically connecting the display drive circuit 630 and the gate electrode of the TFT and a data line (or source line) for electrically connecting the display drive circuit 630 and the source electrode of the TFT. According to various embodiments, the display drive circuit 630 may operate in response to RGBW (red, green, blue, and white) method in which a white pixel is added to the RGB pixel.

According to an embodiment, the display drive circuit 630 may correspond to a DDI package. The DDI package may include a DDI (or DDI chip), a timing controller (T-CON), a graphic RAM (GRAM), or a power drive part (power generating circuit). According to an embodiment, the graphic RAM may be omitted or may use a memory provided separately from the display drive circuit 630. The timing controller may convert a data signal input from the processor 120 into a signal required by the DDI. The timing controller may serve to adjust input data information to a signal appropriate for a gate driver (or gate IC) and a source driver (or source IC) of the DDI. The graphic RAM may serve as a memory for temporarily storing data to be input to a driver (or IC) of the DDI. The graphic RAM may store an input signal and then output the signal to a driver of the DDI, and in this case, may interact with the timing controller to process the signal. The power drive part may generate a voltage for driving the flexible display 610 and supply a voltage required for the gate driver and the source driver of the DDI.

According to an embodiment, one or more DDIs may be realized to be included. According to an embodiment, the electronic device 101 may include one DDI operatively or electrically connected to the processor 120 and the flexible display 610 (e.g., the first display area and the second display area). For example, the first display area and the second display area may be connected to one DDI. According to an embodiment, the electronic device 101 may include two DDIs (e.g., a first DDI and a second DDI) operatively or electrically connected to the processor 120 and the flexible display 610. For example, the first display area may be connected to the first DDI and the second display area may be connected to the second DDI. According to an embodiment, the first DDI and the second DDI may be operatively or electrically connected to each other.

According to an embodiment, the flexible display 610 may include a touch detection circuit 620 (or touch sensor). The touch detection circuit 620 may include, for example, a transmitter (TX) including multiple first electrode lines (or multiple driving electrodes) and a receiver (RX) including multiple second electrode lines (or multiple reception electrodes).

According to an embodiment, the sensor integrated circuit (IC) 640 may provide a current (e.g., an alternating current) to the touch detection circuit 620 and an electric field may be generated between the transmitter and the receiver of the touch detection circuit 620. The sensor IC 640 may convert an analog signal acquired through the touch detection circuit 620 into a digital signal. For example, when a finger comes in contact with a screen or reaches within a threshold distance from the screen, a change in the electric field may occur, and accordingly, a change in capacitance (or voltage drop) may occur. In case that the change in capacitance is equal to or more than a threshold value, the sensor IC 640 may generate an electrical signal with respect to coordinates on the screen as a valid touch input or hovering input and output the electrical signal to the processor 120. The processor 120 may recognize the coordinates on the screen based on the electrical signal received from the sensor IC 640.

According to an embodiment, the sensor IC 640 may include a touch controller integrated circuit (IC). The touch controller IC may perform various functions such as noise filtering, noise removal, or sensing data extraction, in relation to the touch detection circuit 620. According to an embodiment, the touch controller IC may include various circuits such as an analog-digital converter (ADC), a digital signal processor (DSP), and/or a micro control unit (MCU).

According to an embodiment, the tension control module 650 may be included in, for example, a tension structure for providing tension applied to the flexible display 610 or connected to a tension structure. The tension control module 650 may control tension applied to the flexible display 610 according to a control signal from the processor 120.

According to an embodiment, the sensor module 660 (e.g., the sensor module 176 in FIG. 1) may measure a physical quantity or detect an operation state of the electronic device 101 and generate an electrical signal or a data value corresponding thereto. According to an embodiment, the sensor module 660 may include, for example, a gesture sensor, a gyro sensor, a barometric pressure sensor, a magnetic sensor, an acceleration sensor, a grip sensor, a proximity sensor, an expansion distance sensor, a color sensor, an infrared (IR) sensor, a biometric sensor, a temperature sensor, a humidity sensor, or an illuminance sensor. According to an embodiment, the sensor module 660 may further include at least one control circuit for controlling at least one sensor included in the sensor module.

According to an embodiment, the sensor module 660 may correspond to a device to detect a tilt angle of the electronic device 101 with respect to the ground surface and/or a direction that the electronic device (101) faces in a three-dimensional coordinate system, using sensing data acquired by at least one sensor among multiple sensors. However, without limitation thereto, various sensors that may acquire information about the tilt angle (e.g., azimuth) of the electronic device 101 may be used. For example, the acceleration sensor may sense information about a linear movement of the electronic device 101 and/or acceleration on the three axes of the electronic device 101. The gyro sensor may sense information related to rotation of the electronic device 101 and the geomagnetic sensor may sense information about a direction in which the electronic device 101 faces within the absolute coordinate system. According to an embodiment, the processor 120 may use 9-axis motion data acquired using the gyro sensor or the geomagnetic sensor. For example, the processor 120 may generate a virtual coordinate space based on an azimuth angle (e.g., a yaw, pitch, and/or roll value) measured from the 9-axis motion data, and divide an area of the virtual coordinate space into a landscape range and another area of the coordinate space into a portrait range.

According to an embodiment, in a state in which the display module 160 (e.g., a rollable display supporting a first display area and a second display area expanding from the first display area) is open or partially open, the sensor module 660 may detect a sliding-out amount (e.g., a size (e.g., area, length, and width) of the display expanded by sliding-out)) of the display module 160.

According to an embodiment, the processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may, for example, detect a state change (e.g., a partially open or fully open state due to sliding-out in one or more directions) of the display module 160 based on a sensing value of the sensor module 660, and identify a size of an exposed screen area according to the state change of the display module 160. According to an embodiment, the processor 120 may control the display module 160 to configure and display an execution screen based on the size of the exposed screen area. For example, the sensor module 660 may use a time of flight (ToF) sensor, an illumination sensor, a bending sensor, a Hall sensor, and/or a motion sensor to detect the size of the exposed screen according to the state change of the display module 160.

According to an embodiment, the input module 670 (e.g., the input module 150 in FIG. 1) may receive, for example, a user input. The input module 670 may include, for example, a key input device. According to an embodiment, the key input device may include various types of keys such as a physical key, capacitive key, or an optical key. The input module 670 may include various other types of user interfaces.

According to an embodiment, the memory 130 may store instructions and/or various configuration information related to operation of the display module 160 according to the closed state, the partially open state (e.g., the intermediate state), and the open state of the electronic device 101. By way of example, the memory 130 may include at least one configuration for causing a screen display to operate differently depending on the closed state, the partially open state, and the open state. By way of example, the memory 130 may include at least one instruction for identifying conversion of the closed state, the partially open state, and the open state and processing a corresponding screen display in the identified state. For example, the memory 130 may include an instruction to cause the processor 120 to control the tension of the flexible display 610 using the tension control module 650.

According to an embodiment, the memory 130 may store various data used by the electronic device 101. In an embodiment, the data may include an application (e.g., the program 140 in FIG. 1) and input data or output data with respect to a command related to the application. In an embodiment, the data may include various sensor data (e.g., acceleration sensor data, gyro sensor data, and/or Hall sensor data) acquired from the sensor module 660. In an embodiment, the data may include various reference data configured in the memory 130 to identify a designated state (e.g., the first state (e.g., the closed state) or the second state (e.g., the partially open state or the open state)) of the electronic device 101. In an embodiment, the data may include various configuration information configured in the memory 130 to collect data for heat dissipation control based on the designated state of the electronic device 101 and operation controlling related to performing a heat radiation operation based on the collected data. In an embodiment, the data may include various learning data acquired based on learning of the user by interacting with the user.

According to an embodiment, the memory 130 may store instructions causing the processor 120 to operate. For example, the application may be stored as software (e.g., the program 140 in FIG. 1) in the memory 130 and may be executable by the processor 120. According to an embodiment, the application may include various applications that may provide various functions (e.g., functions executable on the electronic device 101, such as AOD, a call, a game, a browser, mail, media playback, photographing, and/or a messenger) on the electronic device 101.

According to an embodiment, the processor 120 may perform an application layer processing function required by the user of the electronic device 101. According to an embodiment, the processor 120 may provide a command and control of functions for various blocks of the electronic device 101. According to an embodiment, the processor 120 may perform control of respective components of the electronic device 101 and/or calculation or data processing related to communication. For example, the processor 120 may include at least a portion of a configuration and/or function of the processor 120 in FIG. 1. The processor 120 may be operatively connected, for example, to components of the electronic device 101. The processor 120 may load a command or data received from other components of the electronic device 101 into the memory 130, process the command or data stored in the memory 130, and store result data.

According to an embodiment of the disclosure, the processor 120 may include a processing circuit (processing circuitry) and/or executable program elements. According to an embodiment, based on the processing circuit and/or the executable program elements, the processor 120 may control (or process) an operation related to supporting a function associated with the application based on the designated state and/or the state change from the designated state of the electronic device 101.

According to an embodiment, in a state in which the display module 160 (e.g., a rollable display supporting the first display area and the second display area expanding from the first display area) is open or partially open, the processor 120 may display an execution screen of the application in response to the slide-out amount of the display module 160. According to an embodiment, the processor 120 may detect a state change of the display module 160 and determine an exposed screen area based on the detection of the state change of the display module 160. According to an embodiment, the processor 120 may control the display module 160 to configure and display an execution screen based on the exposed screen area.

According to an embodiment, the processor 120 may control the display module 160 to display a screen through the first display area (e.g., the fixed area or a basic area) of the display 610 in the first state (e.g., the closed state). According to an embodiment, in case that the display module 160 is off and the electronic device 101 is in the first state, the processor 120 may control the display module 160 to display a display screen through at least a portion of the first display area. According to an embodiment, in case that the display module 160 is on and the electronic device 101 is in the first state, the processor 120 may control the display module 160 to display an application screen (e.g., an execution screen) through the first display area.

According to an embodiment, in case that the electronic device 101 configures the second state (e.g., the partially open state or the open state) by the second display area slid (or rolled) according to the sliding movement of the second housing 220 or 320, the processor 120 may control the display module 160 to link the first display area and the second display area (e.g., the expansion area) in the second state so as to display a screen (e.g., an execution screen or AOD screen) or display a screen (e.g., an AOD screen) through the second display area independently from the first display area.

According to an embodiment, the processor 120 may display a first execution screen based on the first display area and detect a state change of the display (detect sliding) while displaying the first execution screen. According to an embodiment, the processor 120 may maintain the first execution screen displayed through the first display area based on the detection of the state change and display a second execution screen through the second display area. According to an embodiment, the processor 120 may control the display module 160 to change (e.g., expand) the first execution screen to correspond to the linkage of the first display area and the second display area, based on the detection of the state change of the display and display the changed first execution screen.

According to an embodiment, the processor 120 may control the display module 160 to operate differently with respect to a screen display according to the closed state, the partially open state, and the open state, at least based on a type of the application to be executed and/or a configuration of the electronic device 101 by designation of the user.

According to an embodiment, the processor 120 may control an operation related to performing heat dissipation control in response to the state change of the electronic device 101. According to an embodiment, when it is identified that heat dissipation control is required according to a change in state, including a temperature or operation state of the electronic device 101, the processor 120 may perform a heat dissipation control operation.

According to an embodiment, the processor 120 may perform a heat dissipation control operation based on temperature information and/or operation state information identified from various components (e.g., the processor 120, the memory 130, and the camera module 180, the power management module 188, the battery 189, and the communication module 190 in FIG. 1) of the electronic device 101.

According to an embodiment, based on the temperature information and/or operation state information identified from various components of the electronic device 101, the processor 120 may identify a heat generation state of the electronic device 101 and perform a heat dissipation control operation corresponding thereto. For example, based on the temperature information identified from multiple components of the electronic device 101, the processor 120 may calculate a current temperature of the electronic device 101. For example, the multiple components may include various components such as the processor 120, a wireless charging coil (e.g., the wireless charging coil 315 in FIG. 4), a communication module (e.g., the communication module 190 in FIG. 1), a display module (e.g., the display module 160 in FIG. 1), and a camera (e.g., the camera module 180 in FIG. 1) of the electronic device 101. For example, the processor 120 may calculate temperature information (e.g., temperature prediction based on arithmetic and machine learning) of the electronic device 101 based on the temperature information identified from these components or a sensor (e.g., a temperature sensor) mounted adjacent thereto. For example, the processor 120 may calculate temperature information (e.g., temperature prediction based on machine learning) of the electronic device 101 based on the operation state of the components.

According to an embodiment, the processor 120 may monitor various components for heat dissipation. For example, the processor 120 may receive battery information. For example, the processor 120 may identify whether wireless charging is activated and identify a charging state (e.g., fast, regular, and slow charging). For example, the processor 120 may identify expanding state information (e.g., the sliding-in state or sliding-out state, and in case that the sliding-out state includes multiple levels, a current sliding-out state) of the flexible display 610 of the electronic device 101. In this case, although a realization example of an example embodiment has been described in relation to wireless charging, embodiments are not limited thereto and may also be applied to, for example, wired charging through various methods including a charging cable and/or charging terminal.

According to an embodiment, the heat generation state of the electronic device 101 may be divided into multiple levels and a heat radiation operation performed in response to each level of the heat generation state may be configured in advance. For example, depending on the temperature range, the multiple heat generation levels may include a light heat generation (LIGHT) range level (e.g., 32 degrees to less than 40 degrees) as a first level, and a moderate heat generation (MODERATE) range level (e.g., 40 degrees to less than 42 degrees) as a second level, a severe heat generation (SEVERE) range level (e.g., 42 degrees to less than 45 degrees) as a third level, and a critical heat generation (CRITICAL) range level (e.g., 45 degrees or more) as a fourth level. For example, based on that the current temperature of the electronic device 101 is included in one of multiple heat generation levels, a heat radiation operation designated in response to the corresponding level may be performed. Here, the number of heat generation levels and temperature division are examples, are not limited thereto, and may be changed according to a system of the electronic device 101 or depending on an operation state.

According to an embodiment, the multiple levels indicating the heat generation state of the electronic device 101 may be adjusted based on the operation state of the processor 120. For example, in case that the number of current clocks of the processor 120 is more than or equal to a designated level, a temperature condition corresponding to the multiple levels of the electronic device 101 may be reduced by a designated value. For example, based on a surface temperature of the electronic device 101, the processor 120 may determine a heat generation state of the electronic device 101. For example, the processor 120 may determine the heat generation state of the electronic device 101 based on various operation states in which a surface temperature rise of the electronic device is expected in addition to the surface temperature of the electronic device 101. For example, in case that the electronic device 101 is wirelessly charging and fast charging is performed, or a game application is performed in a fast charging state, or a game application is performed even in a normal charging or slow charging state, the heat generation state of the electronic device 101 may be determined to be one or more levels higher compared to the surface temperature, or the temperature condition corresponding to multiple levels indicating the heat generation state may be lowered by a designated value.

According to an embodiment, the processor 120 may perform a heat dissipation control operation with respect to various components based on the heat generation state of the electronic device 101.

According to an embodiment, in response to the heat generation state of the electronic device 101, the processor 120 may expand or reduce the display module 160 and/or control an operation of various components (e.g., the processor 120, the memory 130, the camera module 180, the power management module 188, the battery 189, and the communication module 190). For example, the heat radiation operation may include expanding and/or reducing the flexible display 610 of the electronic device 101. For this end, the processor 120 may control the expanding and/or the reducing of the flexible display 610 based on a current expanding state information (e.g., the sliding-in or sliding-out and the size of an expanded display) of the flexible display 610. For example, when the heat generation level enters an intermediate heat generation section or severe heat generation section, the processor 120 may cause the display 610 to be expanded. For example, the heat dissipation control operation may include a control operation of various components (e.g., the processor 120, the display module 160, the camera module 180, the power management module 188, and the communication module 190) of the electronic device 101. For example, the heat dissipation control operation may include an operation of raising or lowering a maximum clock of a central processing unit or graphics processor of the processor 120, and/or increasing or decreasing a frame per second (FPS). For example, the heat dissipation control operation may include an operation of changing a charging state such as a fast, regular, and slow charging through the power management module 188. For example, the heat dissipation control operation may include a forced power-off operation in an Android framework, and/or force-stopping and/or execution blocking operation for some or all applications. For example, the heat dissipation control operation may include a force-stopping and/or execution blocking operation of the camera module 180. For example, the heat dissipation control operation may include adjusting brightness, expanding or reducing a display indication area, a force-stopping, and/or execution blocking of the display module 160. For example, the heat dissipation control operation may include a force-stopping and/or execution blocking operation for heat generation control of various components and/or modules of the electronic device 101.

Figure 7:
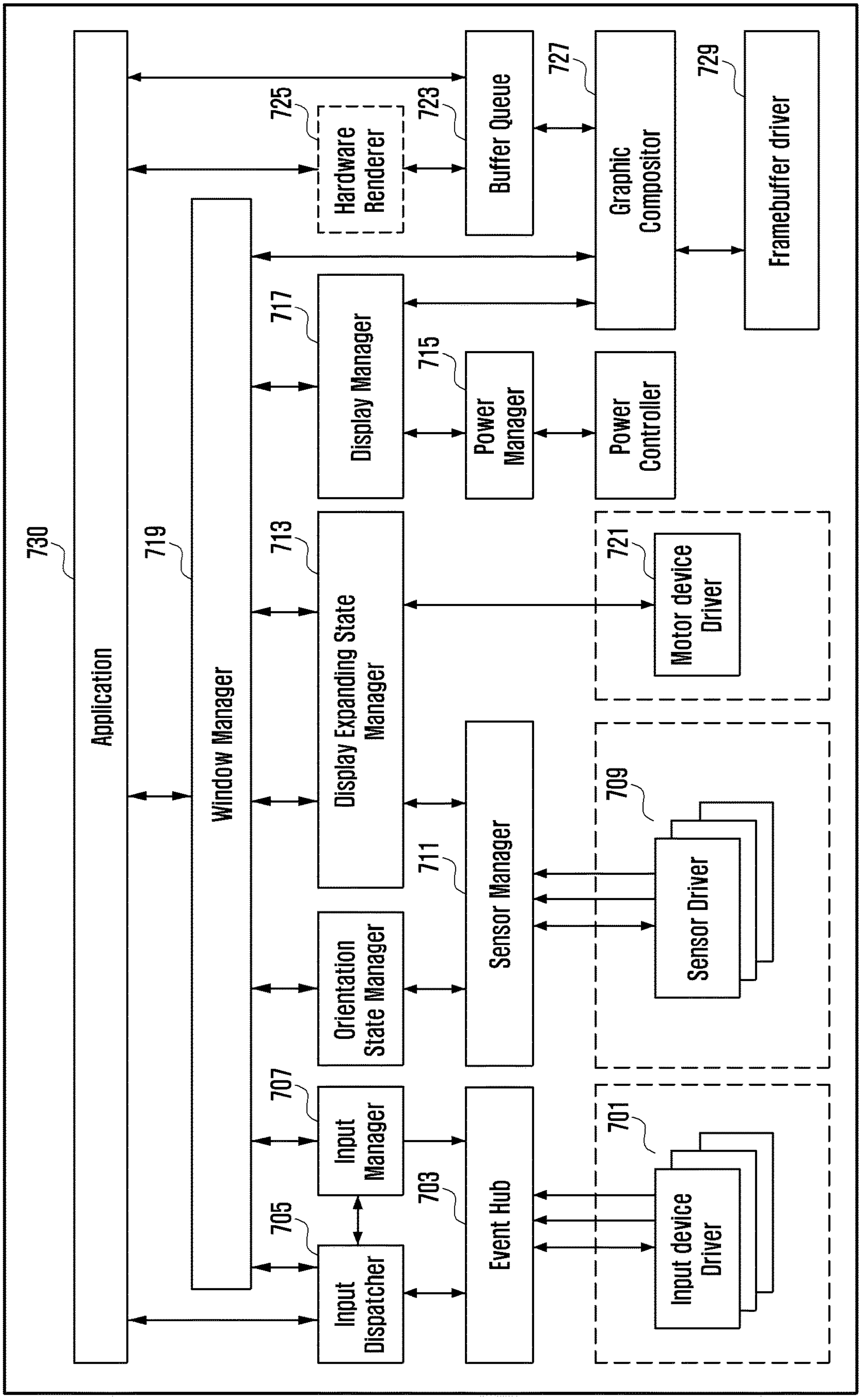
FIG. 7 is a block diagram illustrating an example configuration of an electronic device according to various embodiments.

FIG. 7 is a block diagram illustrating an example operation architecture of an electronic device (e.g., the electronic device 101 in FIG. 1) according to various embodiments. Various components shown in FIG. 7 may be executed by the processor 120 including various processing circuit (circuitry) and/or executable program elements of the electronic device 101. According to an embodiment, operations performed by the various components shown in FIG. 7 may be executed by instructions which are stored in the memory 130 and, when executed, cause the processor 120 to operate.

According to an embodiment, an input device driver 701 may control various input devices (e.g., the input module 150 in FIG. 1) to transfer various inputs such as received touch input, key input, and mouse input to an event hub 703.

According to an embodiment, the event hub 703 may receive events which occur in various components including a touch sensor and/or a sensor module (e.g., the sensor module 660 in FIG. 6) of a display module (e.g., the display module 160 in FIG. 1 or FIG. 6) and convert the events into reference input events of an OS.

According to an embodiment, an input dispatcher 705 may distribute and/or transfer an input event to an event reception target (e.g., a window or a specific process) module.

According to an embodiment, an input manager 707 may provide information about an input device provided from the electronic device 101 and may configure information such as a display view port for interpreting data (raw data) of the input device.

According to an embodiment, a sensor driver 709 may receive a sensor value by controlling a sensor (e.g., various sensors of the sensor module 660 in FIG. 6) for detecting an expanding state of the display module 160 and/or a sensor (e.g., various sensors of the sensor module 660 in FIG. 6) for measuring an orientation of the electronic device 101.

According to an embodiment, a sensor manager 711 may convert (e.g., fuse) various events occurring in various sensors of the sensor module 660 into a standardized sensor event of the OS and/or control an event flow.

According to an embodiment, a display expanding state manager 713 may analyze one or more sensor events received through the sensor manager 711 and determine a current expanding state of the display module 160 and provide expanding state information to each module requiring same. For example, depending on the heat generating state of the electronic device 101, the display expanding state manager 713 may provide the expanding state information to a motor device driver 721 so as to control a display driving circuit (e.g., the display driving circuit 630 in FIG. 6) and expand or reduce the display module 160.

According to an embodiment, a power manager 715 may manage a capacity, temperature, and/or power of the battery according to the system state of the electronic device 101 and using information thus acquired, determine and/or provide information required for an operation of the electronic device 101.

According to an embodiment, a display manager 717 may manage a life cycle (e.g., control/remove connections/properties) of the display module 160 and manage H/W display mapping for outputting a screen GUI element. For example, the display manager 717 may cause output display change based on a system event such as folding state change or expanding state change of the electronic device 101.

According to an embodiment, a window manager 719 may manage one or more GUI resources used in the display screen of the display module 160.

According to an embodiment, the motor device driver 721 may control the driving circuit 630 for expanding and/or reducing the display module 160 by a system signal received through the display expanding state manager 713.

According to an embodiment, a buffer queue 723 corresponds to a memory buffer control module and may transfer graphic bitmap information from an application 730 like an image stream producer to a graphic compositor 727.

According to an embodiment, a hardware renderer 725 may include an acceleration module to draw a buffer for transferring various graphic elements generated by the application 730 to the graphic compositor 727. However, the hardware renderer may be omitted in case that a function thereof is implemented using the CPU.

According to an embodiment, the graphic compositor 727 may combine graphic bitmap information of separated multiple sources to be output through the display screen of the display module 160.

According to an embodiment, a framebuffer driver 729 may correspond to a buffer (framebuffer) control module including graphic information output through the display screen of the display module 160.

An electronic device (e.g., the electronic device 101 in FIG. 1) according to an example embodiment may include: two or more housings (e.g., the first housing 310 and the second housing 320 in FIGS. 3A to 3D), a flexible display (e.g., the flexible display 610 in FIG. 6) mounted to one or more housings among the two or more housings and configured to be expanded or reduced according to a sliding operation of one or more housings among the two or more housings, one or more sensors (e.g., the sensor module 660 in FIG. 6) configured to acquire one or more pieces of temperature information from the electronic device, and at least one processor, comprising processing circuitry (e.g., the processor 120 in FIG. 6), operatively connected to the one or more sensors and the flexible display, wherein at least one processor, individually and/or collectively, is configured to: identify at least one of an operation state information or one or more pieces of temperature information acquired from the electronic device, identify an expansion state information of the flexible display, and control the electronic device to change a size of the flexible display by sliding the one or more housings based on at least one of the operation state information or the one or more pieces of temperature information.

According to an example embodiment, at least one processor, individually and/or collectively may be configured to determine one heat generation level among multiple heat generation levels based on at least one of the temperature information or the operation state information.

According to an example embodiment, at least one processor, individually and/or collectively, may be configured to perform a designated heat dissipation control operation with respect to the determined heat generation level.

According to an example embodiment, at least one processor, individually and/or collectively, may be configured to determine a next heat dissipation control operation by reflecting a result according to the designated heat dissipation control operation with respect to the determined heat generation level.

According to an example embodiment, at least one processor, individually and/or collectively, may be configured to: identify one or more pieces of information among temperature information or operation state information of the electronic device according to the designated heat dissipation control operation with respect to the determined heat generation level, and re-determine another heat generation level among the multiple heat generation level.

According to an example embodiment, at least one processor, individually and/or collectively, may change a size of the flexible display based on the another heat generation level.

According to an example embodiment, at least one processor, individually and/or collectively, may be configured to: acquire multiple pieces of temperature information from multiple components of the electronic device, and calculate the temperature information of the electronic device based on the multiple pieces of temperature information.

According to an example embodiment, at least one processor, individually and/or collectively, may be configured to control the electronic device to change a size of the flexible display in stages based on a change in the one or more pieces of temperature information and the operation state information.

According to an example embodiment, at least one processor, individually and/or collectively, may be configured to provide a notification including a size change of the flexible display through the flexible display.

According to an example embodiment, the operation state information acquired from the electronic device may include operation state information of at least one processor.

Figure 8:
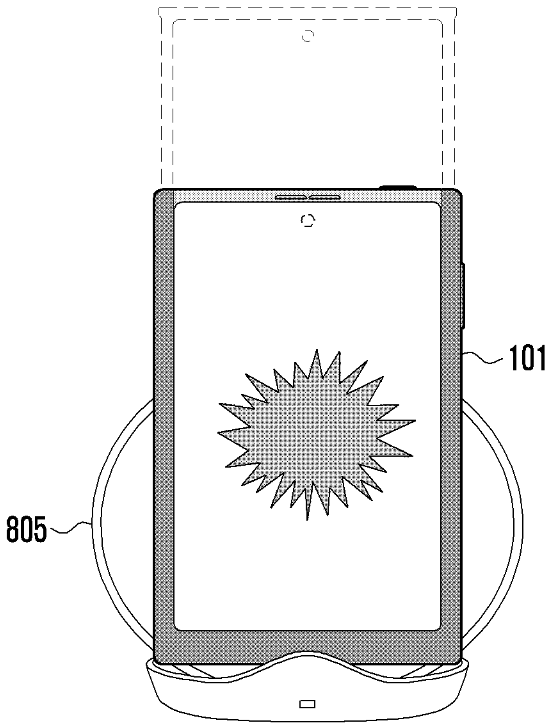
FIG. 8 is a diagram illustrating a heat generation state of an electronic device according to various embodiments.

FIG. 8 is a diagram illustrating an example heat generation state of an electronic device according to various embodiments.

Referring to FIG. 8, in case that an electronic device (e.g., the electronic device 101 in FIG. 1) is realized as an expandable rollable form factor as shown in FIGS. 5A, 5B, 5C, 5D, 5E, 5F, and 5G, heat management may be difficult in a sliding-in state.

According to an embodiment, the electronic device 101 may include a first housing (e.g., the first housing 310 in FIG. 3A to 3D) and a second housing (e.g., the second housing 320 in FIG. 3A to 3D) disposed to slide in a designated direction from the first housing, wherein as at least a portion of the second housing is inserted into the first housing, in a sliding-in state having a first display area (e.g., a display area in the closed state (or reduction state)), an instrument of the first housing and an instrument of the second housing overlap while having a gap for driving therebetween, and accordingly, heat generated from the electronic device 101 does not convert into the atmosphere, and the heat not released into the atmosphere may cause a decrease in heat dissipation performance as an increase in a front, back, or internal temperature of the electronic device 101 leads to an increase in surface temperature.

For example, in case that the electronic device 101 is performing wirelessly charging, heat generated from the wireless charger 805 is transferred to one surface of the electronic device 101 in which a wireless charging coil is disposed so that heat generation may increase and heat dissipation may become more difficult. In addition, heat generation by a motor of a display driving circuit (e.g., the display driving circuit 630 in FIG. 6) of a rollable display and heat generated due to an operation of various components according to an operation state of the electronic device 101, such as gaming or continuous camera photographing, and/or large amounts of data communication, may cause an increase in temperature of the electronic device 101.

Hereinafter, an operation method of an electronic device 101 according to various embodiments will be described in greater detail. Operations performed by the electronic device 101 according to various embodiments may be executed by the processor 120 including various processing circuit (circuitry) and/or executable program elements of the electronic device 101. According to an embodiment, the operations performed in the electronic device 101 may be stored in the memory 130 and performed, when executed, by instructions configured to operate the processor 120.

Figure 9:
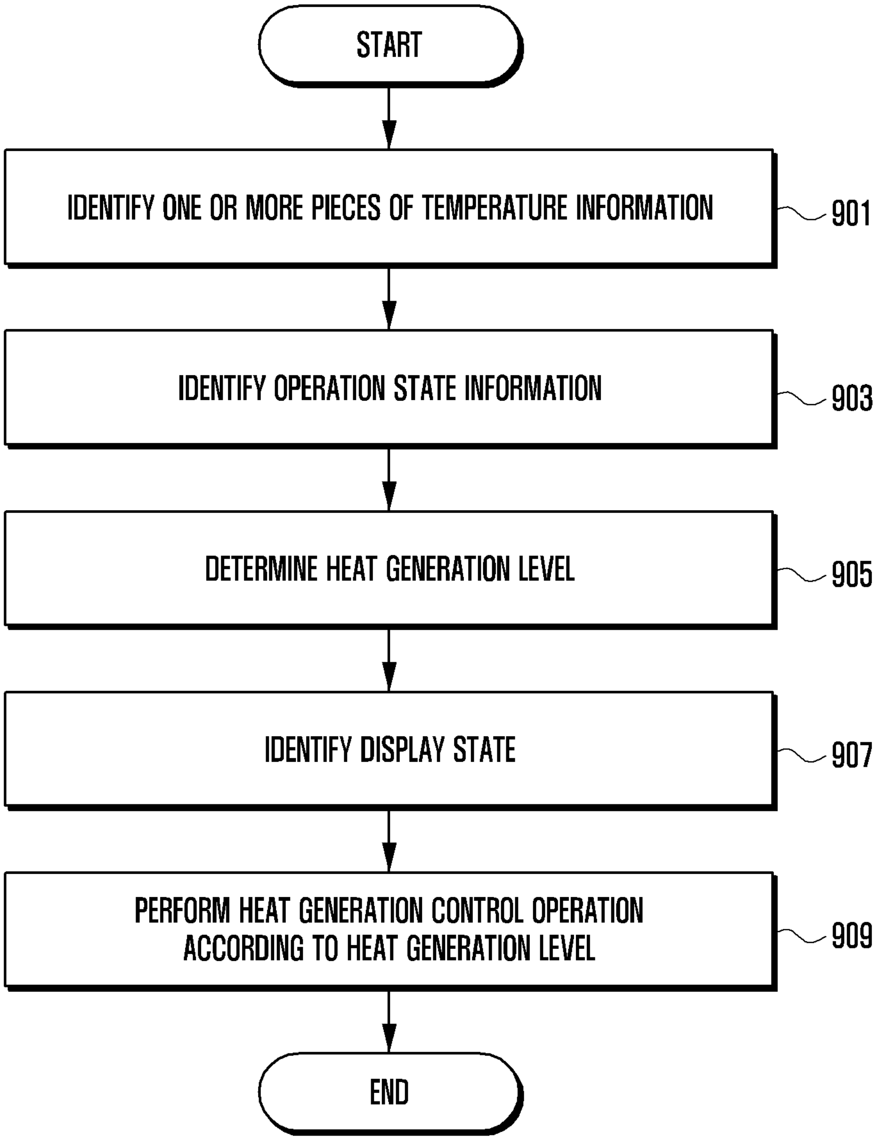
FIG. 9 is a flowchart illustrating an example heat dissipation control operation of an electronic device according to various embodiments.

FIG. 9 is a flowchart illustrating an example heat dissipation control operation of an electronic device (e.g., the electronic device 101 in FIG. 1 or FIG. 6) according to various embodiments.

According to an embodiment, the electronic device 101 may include two or more housings including a first housing (e.g., the first housing 310 FIGS. 3A to 3D) and a second housing (e.g., the second 320 FIGS. 3A to 3D) disposed to slide in a designated direction from the first housing, a flexible display (e.g., the flexible display 610 in FIG. 6) mounted to one or more housings among the two or more housings to be expanded or reduced according to movement (e.g., a sliding operation) of one or more housings among the two or more housings, and a processor (e.g., the processor 120 in FIG. 6) operatively connected to the flexible display 610.

According to an embodiment, the processor 120 may identify one or more pieces of temperature information to be acquired from the electronic device 101 in operation 901. For example, the processor 120 may receive one or more pieces of temperature information from various temperature sensors related to various components of the electronic device 101 and calculate a surface or internal temperature of the electronic device 101 based thereon.

According to an embodiment, the processor 120 may identify operation state information of the electronic device 101 in operation 903. For example, the operation state of the electronic device 101 may include various operation states, such as whether multi-window is executed, a type of an application currently in use, whether a background is operated, a charging state, a network throughput, and an operation state of various components including the processor 120, the display module 160, the camera module 180, the power management module 188, the battery 189, and the communication module 190, such as a central processing unit, a graphics processor, or a communication processor.

According to an embodiment, the processor 120 may determine a heat generation level based on the operation state information and one or more pieces of temperature information of the electronic device 101 in operation 905.

According to an embodiment, based on the temperature information and/or the operation state information identified from various components of the electronic device 101, the processor 120 may determine a heat generation state of the electronic device 101. For example, based on the temperature information identified from various components of the electronic device 101, the processor 120 may calculate a surface temperature of the electronic device 101.

According to an embodiment, the heat generation state of the electronic device 101 may be divided into multiple levels and a heat radiation operation performed in response to each level of the heat generation state may be configured in advance. For example, depending on the temperature range, the multiple heat generation levels may include a light heat generation (LIGHT) range level, a moderate heat generation (MODERATE) range level, a severe heat generation (SEVERE) range level, and a critical heat generation (CRITICAL) range level.

According to an embodiment, in the determination of the heat generation state of the electronic device 101, the processor 120 may consider the operation state information of the electronic device 101 in addition to the surface temperature. For example, the multiple heat generation level indicting a heat generation state of the electronic device 101 may be adjusted based on an operation state of various components, such as the processor 120, the display module 160, the camera module 180, and the communication module 190. For example, in case that the number of current clocks of the processor 120 is more than or equal to a designated level, a temperature condition corresponding to the multiple levels of the electronic device 101 may be reduced by a designated value. For example, in case that the number of current clocks of the processor 120 is more than or equal to a designated level, there may be a possibility that the heat generation become severe, so by relatively lowering a temperature condition reference for determining the heat generation state, even a relatively low temperature may be judged to be a heat generation state corresponding to a relatively high temperature. For example, the processor 120 may determine the heat generation state of the electronic device 101 based on various operation states in which a surface temperature rise of the electronic device 101 is expected. For example, in case that the electronic device 101 is wirelessly charging and fast charging is performed, or a game application is performed in a fast charging state, or a game application is performed even in a normal charging or slow charging state, the heat generation state of the electronic device 101 may be determined to be one or more levels higher compared to the surface temperature, or the temperature condition corresponding to multiple levels indicating the heat generation state may be lowered by a designated value.

According to an embodiment, the processor 120 may identify a state of the flexible display 610 of the electronic device 101 in operation 907. The state of the flexible display 610 may include a reduction state and an expansion state (including partial or full expansion), and may be identified, for example, based on a size (e.g., an area, length, or width) of the flexible display 610 or identified based on a sensor value allowing detection of a state (e.g., sliding movement) of the housing (e.g., the first housing 310 in FIGS. 3A to 3D) and the second housing (e.g., the second housing 320 in FIGS. 3A to 3D).

According to an embodiment, the processor 120 may perform a heat generation control operation according to a heat generation level of the electronic device 101 in operation 909. For example, the processor 120 may control a state of the flexible display 610 based on one or more pieces of temperature information and operation state information. For example, the processor 120 may cause at least one of the two or more housings to move so as to change a size of the flexible display 610 to a first size or a second size, based on one or more pieces of temperature information and operation state information. For example, the processor 120 may determine a heat generation state of the electronic device 101 based on one or more pieces of temperature information and operation state information, and in case that expansion or reduction is possible based on the size of the display 610, may cause the size of the flexible display 610 to be changed to the first size or the second size in response to the determined heat generation state. For example, the processor 120 may control an operation state of various components, such as the processor 120, the display module 160, the camera module 180, and the communication module 190, based on one or more pieces of temperature information and operation state information of the electronic device 101.

Figure 10:
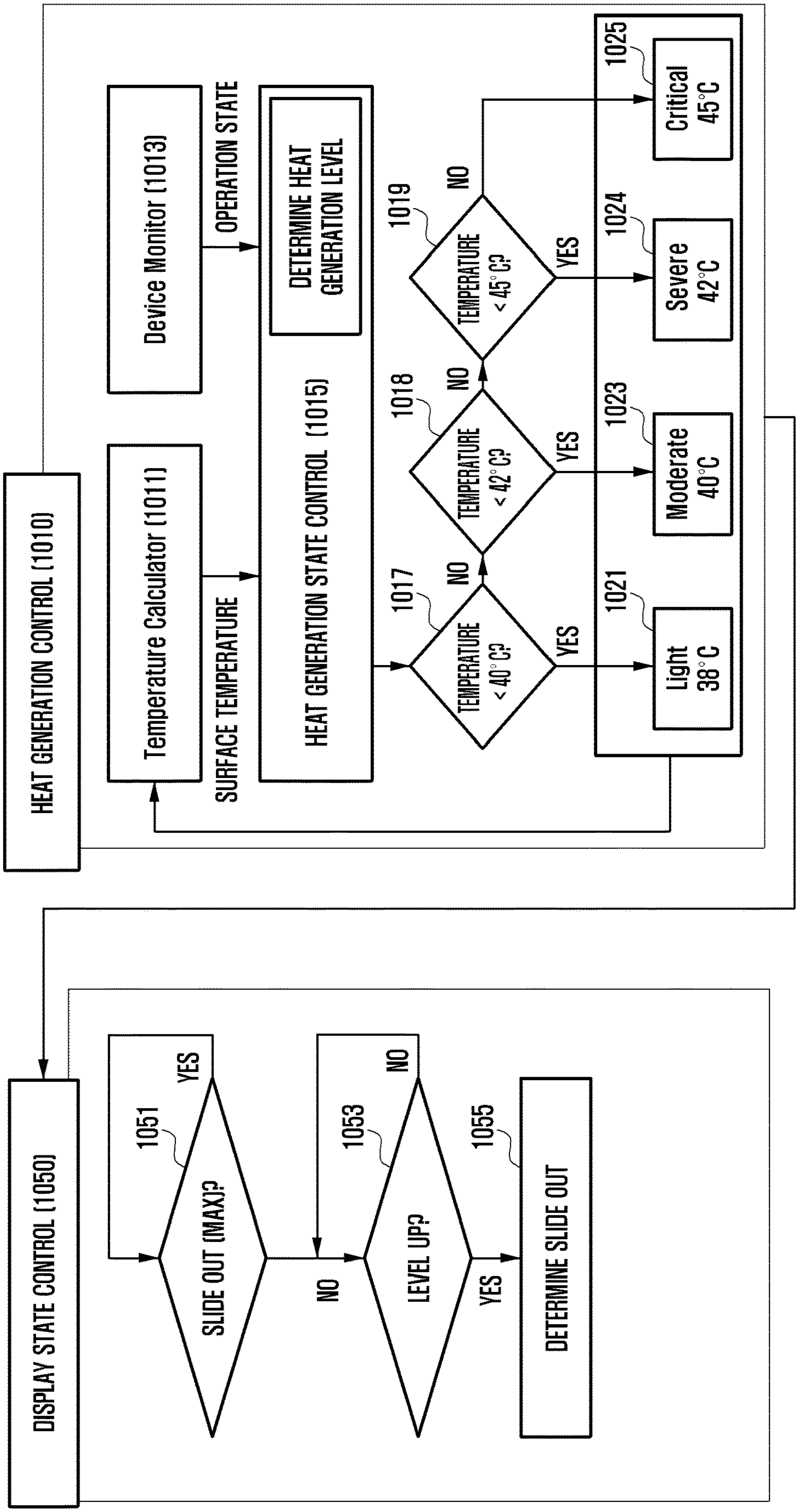
FIG. 10 is a diagram illustrating an example of a configuration for performing heat dissipation control in an electronic device according to various embodiments.

FIG. 10 is a diagram illustrating an example configuration and operations for performing heat dissipation control in an electronic device (e.g., the electronic device 101 in FIG. 1 or FIG. 6) according to various embodiments.

According to an embodiment, the configuration for performing heat dissipation control of the electronic device 101 may include a heat generation control configuration 1010 and a display state control configuration 1050.

According to an embodiment, in the heat generation control configuration 1010, a temperature calculation configuration 1011 may collect one or more pieces of temperature information from the electronic device 101 and calculate a surface temperature of the electronic device 101 based thereon. For example, the temperature calculation configuration 1011 may collect one or more pieces of temperature information according to a surface temperature prediction period (e.g., every 10 seconds for 36 degrees or higher)

According to an embodiment, a temperature sensor (e.g., a thermometer) may be embedded around a heat generation component (e.g., a CPU, an application processor, or communication module) among internal components of the electronic device 101. The temperature calculation configuration 1011 may collect temperature information of the inside of the device from the temperature sensor in real time and the heat generation control configuration 1010 may control the internal component corresponding to the cause of heat generation using the collected temperature information. For example, the heat generation state control configuration 1015 may control an operation of various components, such as the processor 120, the display 160, the power management module 188, the camera module 180, and the communication module 190, to prevent or suppress the surface temperature of the electronic device 101 from rising above a predetermined level, based on the temperature collected by the temperature calculation configuration 1011.

According to an embodiment, a device monitoring configuration 1013 may collect operation state information of the electronic device 101. For example, the operation state of the electronic device 101 may include various operation states, such as whether multi-window is executed, a type of an application currently in use, whether a background is operated, a charging state, a network throughput, and an operation state of various components including the processor 120, the display module 160, the camera module 180, the power management module 188, the battery 189, and the communication module 190, such as a central processing unit, a graphics processor, or a communication processor. For example, the device monitoring configuration 1013 may collect operation state information of the electronic device 101 at each surface temperature prediction period (e.g., every 10 seconds for 36 degrees or higher) or whenever a predetermined event occurs (e.g., a clock of the processor rises above a designated level).

According to an embodiment, the device monitoring configuration 1013 may receive heat generation data from the coil of the wireless charger when the electronic device 101 performs wireless charging. The electronic device 101 may receive heat generation data from the coil of the wireless charger.

According to an embodiment, the device monitoring configuration 1013 may identify an event (e.g., an application) executed in the electronic device 101 and based on a charging voltage state variable according to an event with respect to a charging state (e.g., fast, low, or regular charging), predict a heat generation state of the charger affecting on surface temperature rise of the electronic device 101. For example, in the fast-charging state, a temperature of the charger rises. If the remaining battery capacity is below a designated level, a charging method may be determined as the fast charging, and in this case a prediction period for charger temperature may be reduced or temperature rise may be predicted in advance. The device monitoring configuration 1013 may receive current limiting information for a charger surface heat generation prediction and may perform various heat generation control operations such as high temperature charge blocking, high temperature charge control, low temperature charge control, and low temperature charge blocking depending on the specification of the battery.

According to an embodiment, the heat generation state control configuration 1015 may determine a heat generation state based on one or more pieces of temperature information received from the electronic device 101 and operation state information of the electronic device 101, and perform heat generation control according thereto.

According to an embodiment, the heat generation state control configuration 1015 may determine a heat generation state of the electronic device 101 based on the surface temperature and/or the operation state information of the electronic device 101.

According to an embodiment, the heat generation state of the electronic device 101 may be divided into multiple levels and a heat generation determination configuration may determine one of the multiple heat generation states.

According to an embodiment, the heat generation state control configuration 1015 may determine, among multiple heat generation levels, a case in which a surface or internal temperature of the electronic device 101 is lower than 40 degrees (YES in 1017) as the light heat generation (LIGHT) level (1021), a case in which the surface temperature is equal to or higher than 40 degrees (NO in 1017) and lower than 42 degrees (YES in 1018) as the moderate heat generation (MODERATE) level (1023), a case in which the surface temperature is equal to or higher than 42 degrees (NO in 1018) and lower than 45 degrees (YES in 1019) as the severe heat generation (SEVERE) level (1024), and a case in which the surface temperature is equal to or higher than 45 degrees (NO in 1019) as the critical heat generation (CRITICAL) level (1025).

According to an embodiment, in the determination of the heat generation state of the electronic device 101, the heat generation state control configuration 1015 may consider the operation state information of the electronic device 101 collected by a device monitor 1013, in addition to the surface temperature. For example, the multiple heat generation level indicting a heat generation state of the electronic device 101 may be adjusted based on an operation state of various components, such as the processor 120, the display module 160, the camera module 180, and the communication module 190. For example, in case that the number of current clocks of the processor 120 is more than or equal to a designated level, a temperature condition corresponding to the multiple levels of the electronic device 101 may be reduced by a designated value. For example, the processor 120 may determine the heat generation state of the electronic device 101 based on various operation states in which a surface temperature rise of the electronic device 101 is expected. For example, a temperature condition may be lowered by a designated value based on an operation state for providing a large amount of data by the display module 160 for more than a designated time, such as video playback or game play. For example, a temperature condition may be lowered by a designated value based on an operation state in which photographing is performed by the camera module 180 for more than a designated time, such as video recording. For example, a temperature condition may be lowered by a designated value based on an operation state for transmitting and receiving a large amount of data by the communication module 190 for more than a designated time, such as a video call. For example, in case that the electronic device 101 is wirelessly charging and fast charging is performed, or a game application is performed in a fast charging state, or a game application is performed even in a normal charging or slow charging state, the heat generation state of the electronic device 101 may be determined to be one or more levels higher compared to the surface temperature, or the temperature condition corresponding to multiple levels indicating the heat generation state may be lowered by a designated value. For example, the electronic device 101 may recognize a ping received from a wireless charger (e.g., the wireless charger 805 in FIG. 8) and identify that it is in a wireless charging operation state.

The various example embodiments described above are merely examples and without limitation, some operations may be omitted or changed to other operations. For example, when the electronic device 101 performs wireless charging, an additional temperature determination process may be omitted and a heat radiation operation (e.g., slide-out) may be performed. For example, when the electronic device 101 functions as a wireless charging device (wireless charging transmission or wireless reverse charging) (e.g., Selection of a wireless reverse charging operation menu), a heat radiation operation (e.g., slide-out) may be performed. For example, a heat radiation operation (e.g., slide-out) may be performed during wired charging (e.g., when a wired charging cable connection is detected) in addition to the wireless charging operation of the electronic device 101.

According to an embodiment, the heat generation state control configuration 1015 may perform heat generation control based on the heat generation state of the electronic device 101, feedback a result according thereto, and determined a next control operation. As such, it is possible to reduce changes in performance and/or temperature of the electronic device 101 and ensure maximum performance within power limits.

According to an embodiment, the heat generation control configuration 1015 may perform a minimum possible control operation by avoiding unnecessary control operation during the heat generation control operation. For example, in case of controlling the application processor, the heat generation state control configuration 1015 may prevent or reduce unnecessary clock degradation by variably configuring a minimum clock according to an average operation clock. For example, in case that an average operation clock of the application processor for 10 seconds is equal to or lower than a threshold value, it may be controlled to operate at an actual mapped lowest clock rather than a preconfigured lowest clock.

According to an embodiment, the display state control configuration 1050 may identify whether the flexible display 610 of the electronic device 101 is in a maximum expansion state (a full sliding-out state) (1051). The state of the flexible display 610 may include a reduction state and an expansion state (including partial or full expansion) and may be identified based on, for example, the size of the flexible display 610.

According to an embodiment, the display state control configuration 1050 may identify a heat generation level when the flexible display 610 is not in the full expansion state (NO in 1051), and determine to slide out the flexible display 610 (1055) when the heat generation level is identified to be raised (YES in 1053).

FIG. 11 is a diagram illustrating an example configuration and operations for performing heat dissipation control in an electronic device (e.g., the electronic device 101 in FIG. 1 or FIG. 6) according to various embodiments. Hereinafter, a description of contents corresponding to those described with reference to FIG. 9 or FIG. 10 may not be repeated.

According to an embodiment, the configuration for performing heat dissipation control of the electronic device 101 may include a heat generation control configuration 1130 and a display state control configuration 1110. The configuration for performing heat dissipation control of the electronic device 101 may further include a game state control configuration 1120.

According to an embodiment, the heat generation control configuration 1130 may monitor a resource usage according to various operations (e.g., CPU, GPU, network throughput, charging status, and background operations) of the electronic device 101 through a monitoring module 1150, monitor a temperature through a temperature sensor (e.g., a thermometer) mounted around a heat generation component (e.g., a CPU, a GPU, an application processor, communication module, and a battery), and identify information about a currently used application (e.g., an application in use, whether it is multi-window, an application for connection to an external electronic device, and a camera application) in the electronic device 101.

According to an embodiment, based on the temperature information, the current resource usage information, and the currently used application information of the electronic device 101 collected by the monitoring module 1150, the heat generation control configuration 1130 may identify a state of the electronic device 101 in a main module 1140, determine a heat generation level, and/or whether it is a high load, and cause each designated heat radiation operation to be performed according thereto.

According to an embodiment, a heat generation control operation module 1141 of the main module 1140 may calculate a surface temperature of the electronic device 101 based on current temperature information collected by the monitoring module 1150 and may determine a temperature monitoring period (e.g., a period of 30 seconds when the surface temperature is equal to or lower than 25 degrees, or a period of 10 seconds when the surface temperature is equal to or higher than 35 degrees) of the monitoring module 1150 based on the calculated surface temperature.

According to an embodiment, the heat generation control operation module 1141 may cause operations of various components of the electronic device 101 to be performed through each control module 1170, based on the temperature information of the electronic device 101. For example, safety standard control may be caused to be performed when the surface temperature is equal to or higher than 53 degrees, and accordingly, each control module 1170 may cause an operation of force-stopping and/or execution blocking of, for example, a camera. For example, in case that a temperature of the battery is equal to or higher than 55 degrees, each control module 1170 may cause an operation of force-stopping and/or execution blocking of all applications in an execution state of, for example, an Android framework (AMS) in response to heat dissipation mode level 1 (CooldownMode Level 1). For example, in case that a temperature of the battery is equal to or higher than 85 degrees, each control module 1170 may cause an operation of a forced power-off operation of, for example, an Android framework (PMS) in response to heat dissipation mode level 2 (CooldownMode Level 2).

According to an embodiment, the heat generation control operation module 1141 may perform a heat generation control operation of the electronic device 101 based on the current resource usage information and/or the currently used application information of the electronic device 101 collected by the monitoring module 1150 in addition to the temperature information of the electronic device 101. For example, when the surface temperature is equal to or higher than 45 degrees, based on the current resource usage information and/or the currently used application information of the electronic device 101, depending on whether a load is high (e.g., in case that a combined load of the CPU's top four cores remains 90% or more, or the GPU load remains 95% or more), control information may be provided through each control module 1170 to perform each heat generation control operations 1142 designated for a corresponding module (e.g., the CPU, the GPU, the display, and the power management module) or to perform each designated heavy mode heat generation control operation 1143 in response to a high load.

According to an embodiment, the game state control module 1120 may receive heat generation control information from the main module 1140 in case that an application category corresponds to a game, and perform a heat generation control operation independently from the main module 1140.

According to an embodiment, the display state control configuration 1110 may identify whether the flexible display 610 of the electronic device 101 is in the maximum expansion state (the full sliding-out state), and in case that the flexible display 610 is not in the maximum expansion state, perform display driving control 1160 based on the control information of each control module 1170 received from the main module 1140.

TABLE 1

| | Item | Entrance condition Battery Spec | Voltage limit Buffer voltage (4.4 V) | Current limit (wire) INPUT | Current limit (wire) OUTPUT | Current limit (wireless) INPUT | Current limit (wireless) OUTPUT |
|---|---|---|---|---|---|---|---|
| Battey Spec | High temperature charging blocking | Tbat 50° C. | 4.2 V | — | Block | — | Block |
| | High temperature charging control | Tbat 42° C. | 4.2 V | — | ≤0.36 C (1740 mA) | — | ≤0.24 C (1160 mA) |
| | Low temperature charging control primary | Tbat 18° C. | — | — | ≤0.72 C (3150 mA) | — | ≤0.72 C (3150 mA) |
| | Low temperature charging control secondary | Tbat 15° C. | — | — | ≤0.24 C (1160 mA) | — | ≤0.24 C (1160 mA) |

TABLE 1-continued

| Item | | | | Entrance condition Battery Spec | Voltage limit Buffer voltage (4.4 V) | Current limit (wire) INPUT | Current limit (wire) OUTPUT | Current limit (wireless) INPUT | Current limit (wireless) OUTPUT |
|---|---|---|---|---|---|---|---|---|---|
| | Low temperature charging control tertiary | | | | | | ≤0.1 C (480 mA) | | ≤0.1 C (480 mA) |
| | Low temperature charging blocking | | | Tbat 0° C. | 4.2 V | | Block | | Block |
| | Low temperature burn prevention algorithm | | | LCD OFF, Surface 45° C. (Tbat, Tchg, Tdchg) | — | leoc_1st + 50 mA (778 mA) | | | |
| Heat generation control | Wired ultra-fast charging (DCI) heat generation control | 45 W | LCD ON | Primary: LRP 38° C. | — | 15 W (9 V/1.7 A) | — | | |
| | | | | Secondary: LRP 40° C. | | 10 W (9 V/1.1 A) | — | | |
| | | | LCD OFF | Primary: LRP 39° C. | — | 15 W (9 V/1.7 A) | — | | |
| | | | | Secondary: LRP 41° C. | | 15 W (9 V/1.1 A) | | | |
| | | 25 W | | Primary: LRP 38° C. | — | 15 W (9 V/1.7 A) | — | | |
| | | | | Secondary: LRP 40° C. | | 10 W (9 V/1.1 A) | — | | |
| | | Common | | Tdchg 60° C. | | 10 W (9 V/1.1 A) | — | | |
| | Wired fast charging (AFC) heat generation control | | | LRP 38° C. or Tchg 57° C. | — | ON: 6 W (5 V/1.2 A) OFF: 9 W (9 V/1 A) | — | | |
| | Wireless fast charging (AFC) heat generation control | | | Primary: Twpc 37° C. | — | | | — | 2.7 A |
| | | | | Secondary: Twpc 39° C. | — | | | | 2.2 A |
| | Wireless charging heat generation control | | | Twpc 41° C. | — | | | 5.5 V/0.6 A | — |
| | Wireless power share + wired charging heat generation control | | | — | — | — | 1.2 A | — | — |

Table 1 is a table illustrating an example of a heat dissipation control operation of an electronic device (e.g., the electronic device 101 in FIG. 1 or FIG. 6) according to a heat generation control condition according to an embodiment. According to various embodiments, heat generation may increase depending on an operation state of the electronic device 101. For example, in case that the electronic device 101 is performing wirelessly charging, heat generation may increase due to an influence of heat generated from the charger so that heat dissipation may become more difficult. In addition, heat generation by a motor of a display driving circuit (e.g., the display driving circuit 630 in FIG. 6) of a rollable display and heat generated due to an operation of various components according to an operation state of the electronic device 101, such as gaming or continuous camera photographing, and/or large amounts of data communication, may cause an increase in temperature of the electronic device 101.

The current limitation information according to the heat generation control condition of Table 1 may be stored in, for example, a memory (e.g., the memory 130 in FIG. 1 or FIG. 6).

According to an embodiment, a processor (e.g., the processor 120 in FIG. 1 or FIG. 6) of the electronic device 101 may receive a battery temperature Tbat, a charging IC temperature Tchg, a DC charging IC temperature Tdchg and/or a wireless charging coil temperature Twpc from a thermometer mounted on each component for charger surface heat generation prediction, for example, receive voltage limit information and/or current limit information corresponding thereto from the memory 130, and perform a heat generation control operation according thereto.

According to an embodiment, the processor 120 may perform a high-temperature charging blocking, high-temperature charging control, low-temperature charging control, and low-temperature charging blocking operations according to the voltage limit or current limit information based on the battery temperature Tbat which corresponds to an entrance condition, depending on a battery specification (SPEC).

According to an embodiment, the processor 120 may perform heat generation control operations at various levels including wired ultra-fast charging (DirectCharger) heat generation control, wired fast charging (AdaptiveFastCharging) heat generation control, or wireless fast charge heat generation control for each heat generation control based on a temperature (e.g., the surface temperature LRP, a charging IC temperature Tchg, and/or a DC charging IC temperature Tdchg) corresponding to the entrance condition.

TABLE 2

| classification | Condition | Temperature detailed condition | Operation |
|---|---|---|---|
| Low temperature burn prevention level 1 | Low temperature burn environment condition + surface reaches 48 degrees | LRP is 46 degrees or higher AND BAT is 44 degrees or higher | Scree off + slide out (MAX) |
| Low temperature burn prevention level 2 | Low temperature burn environment condition + surface reaches 50 degrees | LRP is 48 degrees or higher AND BAT is 46 degrees or higher | Stop application + slide out (MAX) |
| Game dimming low temperature burn prevention level 1 | Game dimming + low temperature burn environment condition + surface maintains 46 degrees or higher for 30 minutes or more | LRP is 44 degrees or higher AND BAT is 42 degrees or higher | Stop application + slide out (MAX) |
| Game dimming low temperature burn prevention level 2 | Game dimming + low temperature burn environment condition + surface reaches 48 degrees or higher | LRP is 46 degrees or higher AND BAT is 44 degrees or higher | Stop application + slide out (MAX) |
| International safety standards | Surface is 53 degrees or higher | LRP is 51 degrees or higher AND BAT is 47 degrees or higher | Stop camera + slide out (MAX) |

Table 2 is a table illustrating an example of a heat dissipation control operation according to a heat generation state in an electronic device (e.g., the electronic device 101 in FIG. 1 or FIG. 6) according to an embodiment.

According to an embodiment, the heat generation state of the electronic device 101 may be determined based on the surface temperature or determined in consideration of an environment condition and/or an operation state like an application operation in addition to the surface temperature. For example, low-temperature burn prevention level 1 and 2 may be determined according to low-temperature burn environment conditions and conditions in which the surface temperature reaches 48 degrees or 50 degrees, respectively. For example, low-temperature burn prevention level 1 may be determined according to a condition in which the surface temperature is 46 degree or higher and the battery temperature is 44 degrees or higher and low-temperature burn prevention level 2 may be determined according to a condition in which the surface temperature is 48 degree or higher and the battery temperature is 46 degrees or higher.

According to an embodiment, in low temperature burn prevention level 1, as the heat generation control operation of the electronic device 101, an operation of turning off a display screen, driving a drive circuit (e.g., the display drive circuit 630 in FIG. 6) of a display (e.g., the display module 160 in FIG. 6), and sliding out the display may be caused to be performed.

According to an embodiment, in low temperature burn prevention level 2, as the heat generation control operation of the electronic device 101, an operation of stopping an application in an execution state and sliding out the display may be caused to be performed.

According to an embodiment, for low temperature burn prevention level 1 and 2, when a game application is executed, a condition for determining the heat generation state may be adjusted. For example, in case that a game application is executed, low-temperature burn prevention level 1 may be determined according to a low-temperature burn environment condition and a condition in which the surface temperature remains at 46 degrees or higher for 30 minutes or more and low-temperature burn prevention level 2 may be determined according to a low-temperature burn environment condition and a condition in which the surface temperature is 48 degree or higher. For example, when a game application is executed, low-temperature burn prevention level 1 may be determined according to a condition in which the surface temperature is 44 degree or higher and the battery temperature is 42 degrees or higher and low-temperature burn prevention level 2 may be determined according to a condition in which the surface temperature is 46 degree or higher and the battery temperature is 44 degrees or higher. According to an embodiment, in low temperature burn prevention level 1, as the heat generation control operation of the electronic device 101, an operation of turning off a display screen and sliding out the display may be caused to be performed.

According to an embodiment, when a game application is executed, in low temperature burn prevention level 1 and 2, as the heat generation control operation of the electronic device 101, an operation of stopping an application in an execution state and sliding out the display may be caused to be performed.

According to an embodiment, according to international safety standards, under conditions in which the surface temperature is 53 degrees or higher, or when the surface temperature is 51 degrees or higher and the battery temperature is 47 degrees or higher, as the corresponding heat generation control operation, an operation of stopping a camera application and sliding out the display to maximum may be caused to be performed.

Figure 12:
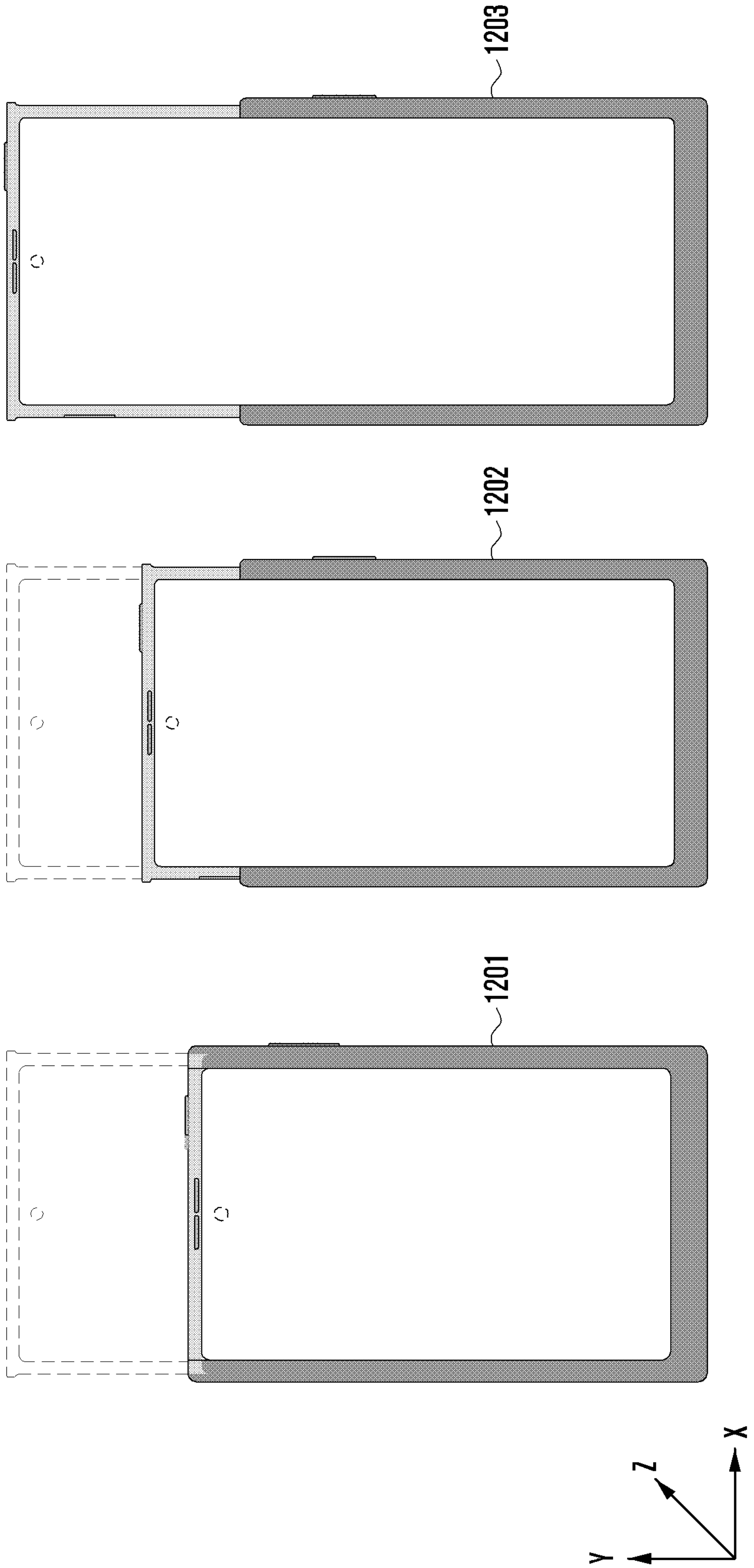
FIG. 12 is a diagram illustrating an example of changing a display state for heat dissipation control in an electronic device according to various embodiments.

FIG. 12 is a diagram illustrating an example of changing a display state for heat dissipation control in an electronic device (e.g., the electronic device 101 in FIG. 1 or FIG. 6) according to various embodiments.

The electronic device 101 according to an embodiment may include a first housing (e.g., the first housing 310 in FIGS. 3A to 3D), a second housing (e.g., the second housing 320 in FIGS. 3A to 3D) disposed to slide in a designated direction from the first housing, and a first display area (e.g., a display area in a closed state (or reduction state)), wherein a flexible display (e.g., the flexible display 330 in FIGS. 3A to 3D) which includes the first display area and a second display area (e.g., a display area in an open state (or expansion state)) extending from the first display area may be expanded according to a state change due to sliding movement of the second housing.

According to an embodiment, the display 330 of the electronic device 101 may be expanded in in one stage or multiple stages.

Referring to FIG. 12, the display 330 of the electronic device 101 may be expanded to multiple sizes in two stages, for example, from a reduction state 1201 to a first expansion state 1202 and a second expanded state 1203. The display 330 of the electronic device 101 may have an aspect ratio of, for example, 4.5:3 in the reduction state 1201, 16:9 in the first expansion state 1202, and 21:9 in the second expansion state 1203. Hereinafter, embodiments will be described with reference to the expansion or reduction operation of the display 330 of the electronic device 101 in FIG. 12.

Figure 13:
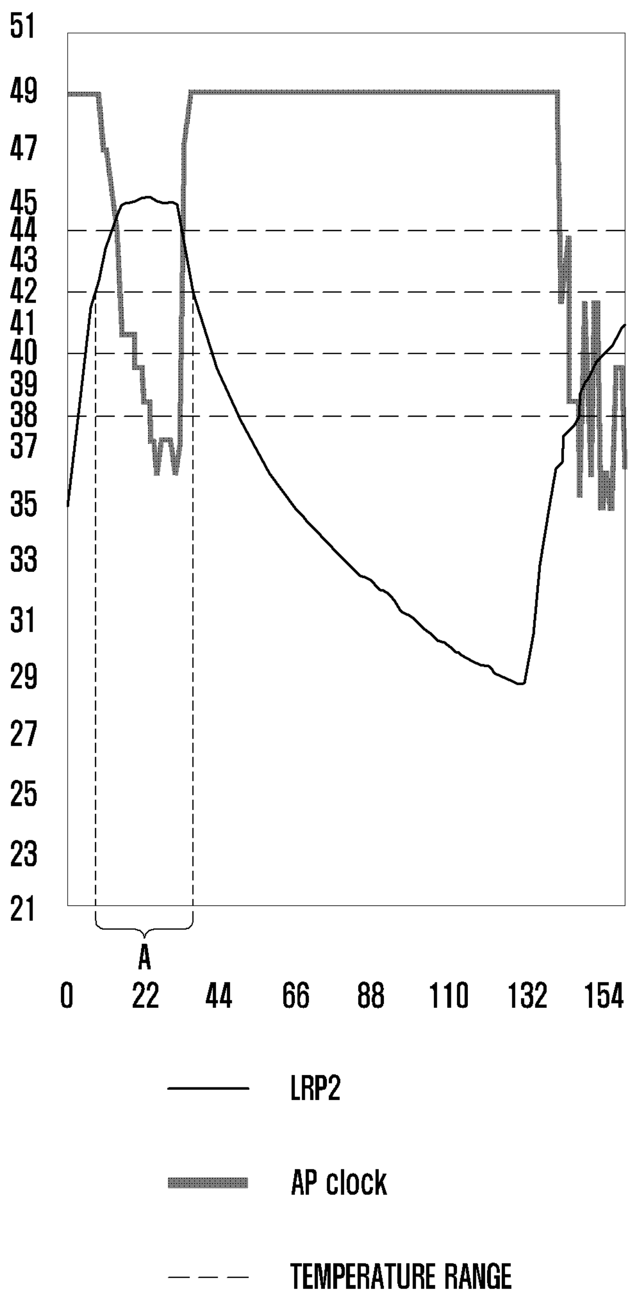
FIG. 13 is a graph illustrating an example of a heat dissipation control operation according to temperature change in an electronic device according to various embodiments.

FIG. 13 is a graph illustrating an example of a heat dissipation control operation according to temperature change in an electronic device according to various embodiments.

According to an embodiment, the heat generation state of the electronic device 101 may be divided into multiple levels and a heat radiation operation performed in response to each level of the heat generation state may be configured in advance. For example, depending on the temperature range, the multiple heat generation levels may include an initial heat generation (LIGHT) (e.g., 38 degrees to less than 40 degrees), and an intermediate heat generation (MODERATE) (e.g., 40 degrees to less than 42 degrees), a severe heat generation (SEVERE) (e.g., 42 degrees to less than 44 degrees), and a critical heat generation (CRITICAL) (e.g., 44 degrees or more). For example, based on that the current temperature of the electronic device 101 is included in one of multiple heat generation levels, a heat radiation operation designated in response to the corresponding level may be performed.

According to an embodiment, the electronic device 101 may cause, for example, the display 330 to be expanded (slid out) in a strong heat generation state section A.

According to an embodiment, the electronic device 101 may perform the heat generation control operation by lowering, for example, a clock of an application processor in the strong heat generation state section A.

According to an embodiment, in case that heat radiation is performed according to the heat dissipation control operation so that a temperature of the strong heat generation state section A of the electronic device 101 becomes lower than the section, the display 330 may be caused to be reduced (slid in).

According to an embodiment, in case that heat radiation is performed according to the heat dissipation control operation so that a temperature of the strong heat generation state section A of the electronic device 101 becomes lower than the section, the clock of the application processor is raised again to increase system performance.

According to an embodiment, the electronic device 101 may cause the display 330 to be in a first expansion (e.g., the first expansion 1202 in FIG. 12) in an intermediate heat generation state section (a temperature section of 40 degrees or higher and less than 42 degrees) before the strong heat generation state section A and to be in a second expansion (e.g., the second expansion 1203 in FIG. 12) in the strong heat generation state section A so as to be step-wisely expanded.

According to an embodiment, when the strong heat generation state section A of the electronic device 101 is resolved through the heat dissipation control operation and the temperature is lowered to the intermediate heat generation state section, the display 330 may be reduced from the second expansion state 1203 to the first expansion state 1202 and when the temperature is further lowered to an initial heat generation state thereafter, the display is reduced from the first expansion state 1202 to the reduction state 1201, so as to be step-wisely reduced.

According to an embodiment, when the electronic device 101 performs fast charging, when a temperature (e.g., an internal temperature) reaches, for example, 41 degrees, it corresponds to the intermediate heat generation state and may be implemented to perform a sliding out operation to control heat dissipation. For example, the electronic device 101 may control a speed of a motor of a display drive circuit (e.g., the display drive circuit 630 in FIG. 6) not to cause additional heat generation due to internal temperature rise.

According to an embodiment, a display control operation may be determined according to the surface temperature LRP2. For example, when the surface temperature rises from 25 degrees to 45 degrees, it corresponds to a critical heat generation level and the display 330 may directly perform a sliding out operation to the second expansion state 1203. For example, when the surface temperature drops from the critical heat generation level to the initial heat generation level, the display 330 may perform a sliding in operation to the reduction state 1201 again.

According to an embodiment, in case that the heat generation level changes frequently, repetition of the sliding in or sliding out operation may increase heat generation by the motor drive of the display drive circuit 630 and thus, a predetermined period of time (INTERVAL TIME (e.g., 10 seconds)) may be configured between heat generation stages or when the display 330 slides in after sliding out.

Figure 14:
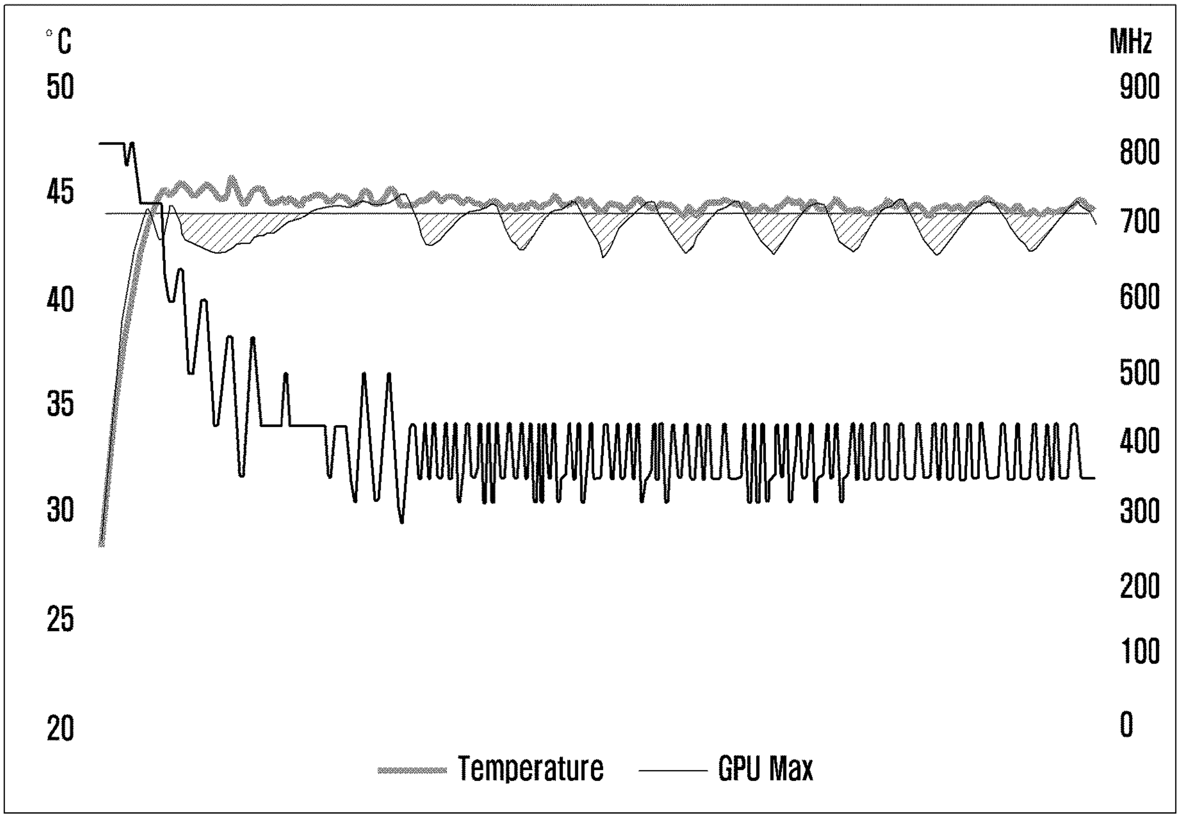
FIG. 14 is a graph illustrating an example of a heat dissipation control operation according to temperature change in an electronic device according to various embodiments.
Figure 16:
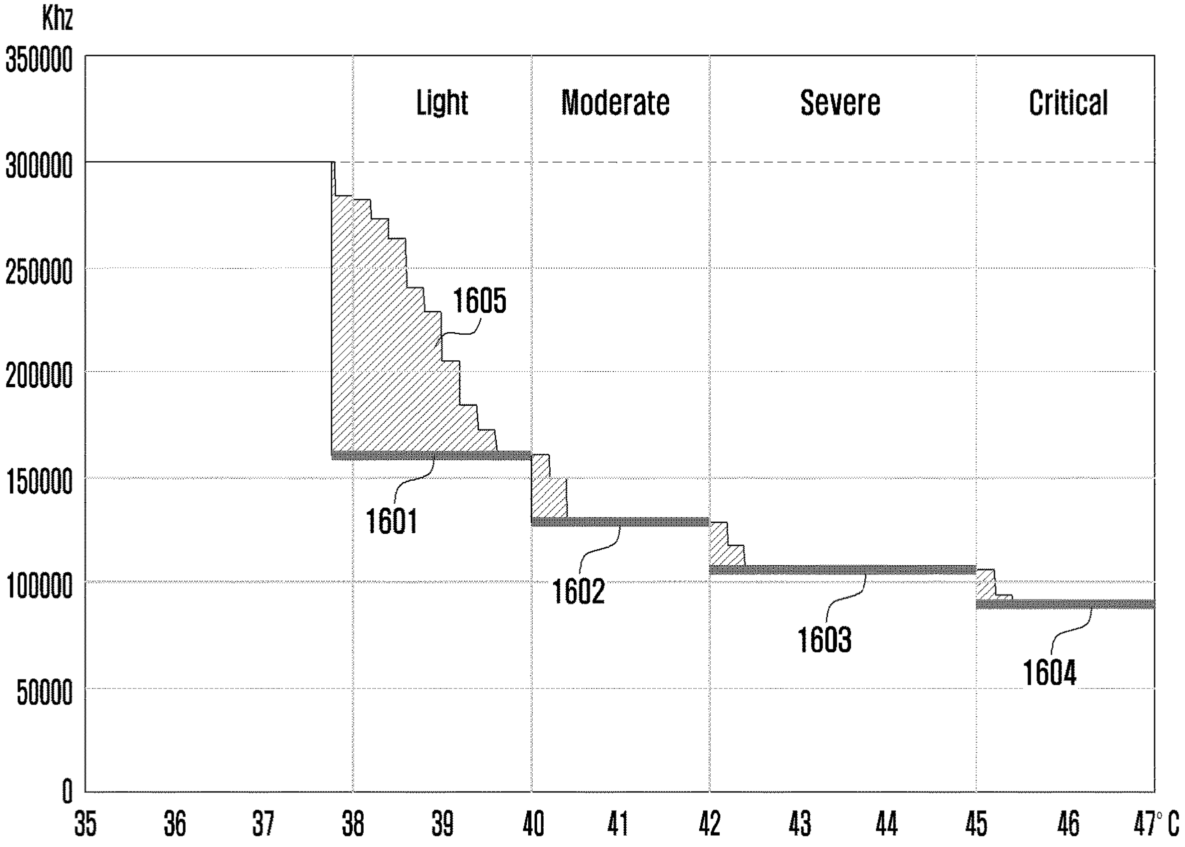
FIG. 16 is a graph illustrating an example of a heat dissipation control operation according to temperature change in an electronic device according to various embodiments.

FIGS. 14, 15, and 16 graphs and a table illustrating examples of heat dissipation control operation performance according to temperature change and/or operation state change in an electronic device (e.g., the electronic device 101 in FIG. 1 or FIG. 6) according to various embodiments.

According to an embodiment, a processor (e.g., the processor 120 in FIG. 1 or FIG. 6) of the electronic device 101 may perform a heat dissipation control operation based on temperature information and/or operation state information identified from various components (e.g., the processor 120, the memory 130, and the camera module 180, the power management module 188, the battery 189, and the communication module 190 in FIG. 1) of the electronic device 101.

According to an embodiment, the processor 120 may calculate a current temperature (e.g., an internal temperature or surface temperature) of an electronic device 101 based on the temperature information identified from various components of the electronic device 101.

Referring to FIG. 14, when the temperature rises according to an operation of the graphics processor unit (GPU), the processor 120 may lower the maximum clock but maintain the maximum clock equal to or greater than the temperature standard of the graphics processor unit, for example, not significantly exceeding the 44-degree line. FIG. 14 is an example, a heat generation point and a heat generation control point may be configured using temperature information of a thermometer (e.g., a thermistor) mounted on each of other components of the electronic device 101 and information that predicts individual current consumption and/or heat generation temperature for each component may be used to analyze user patterns and perform operation control and/or heat generation control of the corresponding component. For example, a thermal management unit (TMU) of a main processor (e.g., a CPU or AP) or a thermistor mounted on a battery or thermistors mounted inside various chips may be used to control heat generation of each component.

According to an embodiment, in case of controlling heat generation of respective components using temperatures acquired from the graphics processor unit, the main processor, the battery, or the thermistor inside a chip, a target chip temperature may be acquired by lowering a chip clock, or a table limiting a predetermined resource according to a predetermined temperature level or situation is stored in advance and based on the table, a clock or other resources may be limited to a designated level when a designated temperature or situation occurs. According to the method, the chip may be protected by limiting heat generation inside the chip.

According to an embodiment, based on the temperature information and/or the operation state information received from various components, the processor 120 may calculate control information to reach the target temperature while maintaining possible performance and apply the control information to perform a heat dissipation control operation for various components, and feedback a control result to calculate next control information.

Referring to FIG. 15, for the heat dissipation control operation of the processor 120, a manipulated variable (MV) may be calculated by proportioning, integrating, and differentiating an error between an output value 1503 and a setpoint. A next input value may be acquired by adding the manipulated variable to a current input value.

According to an embodiment, referring to 1505 in FIG. 15, the manipulated value (MV) may be calculated as the sum of the proportional term (P), integral term (I), and differential term (D).

According to an embodiment, based on the manipulated value calculation described above, a maximum clock (next Maxlock) 1507 to be applied next may be calculated from a currently applied maximum clock (Maxlock) 1501.

According to an embodiment, the processor 120 may perform a heat dissipation control operation with respect to various components based on the heat generation state of the electronic device 101.

According to an embodiment, in response to the heat generation state of the electronic device 101, the processor 120 may expand or reduce the display module 160 and/or control an operation of various components (e.g., the processor 120, the memory 130, the camera module 180, the power management module 188, the battery 189, and the communication module 190).

Referring to FIG. 16, for example, the heat dissipation control operation may include an operation of raising or lowering a maximum clock of a central processing unit or graphics processor of the processor 120, and/or increasing or decreasing a frame per second (FPS).

According to an embodiment, the processor 120 may step-wisely lower a minimum value of the maximum clock depending on the heat generation state. For example, according to the heat generation state, the processor 120 may step-wisely lower a minimum value 1601 of the maximum clock in the initial heat generation level to a minimum value 1602 of the maximum clock in the intermediate heat generation level, to a minimum value 1603 of the maximum clock in the strong heat generation level, and a minimum value 1604 of the maximum clock in the critical heat generation level. Accordingly, for example, the maximum clock 1605 may be used in the initial heat generation level and a higher clock may be used in each heat generation level, compared to existing control, so the performance of the processor 120 may be improved.

FIGS. 17, 18, 19, 20 and 21 are diagrams illustrating an example of a heat dissipation control operation according to temperature change in an electronic device (e.g., the electronic device 101 in FIG. 1 or FIG. 6) according to various embodiments.

Figure 17:
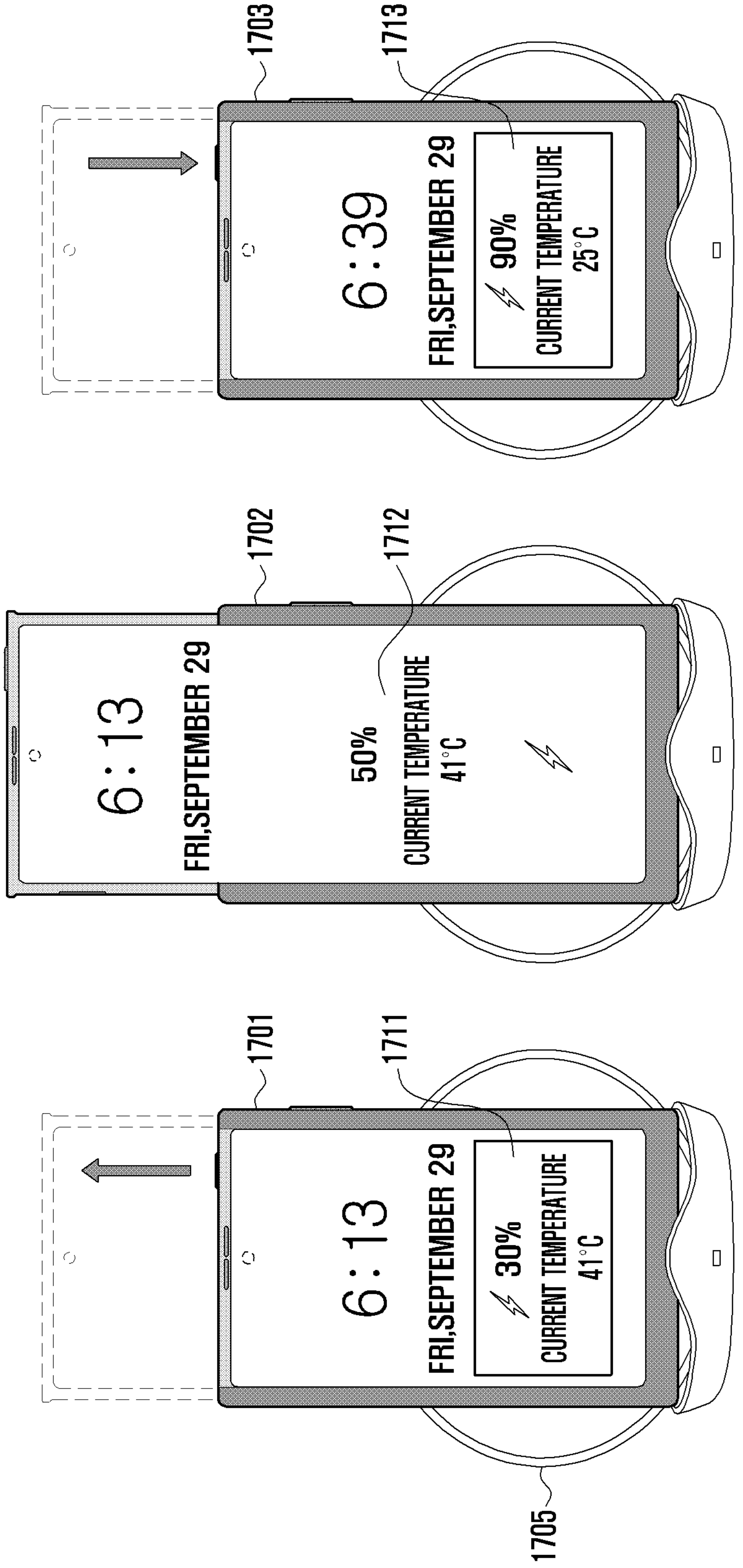
FIGS. 17, 18, 19 and 20 are diagrams illustrating an example of a heat dissipation control operation according to temperature change in an electronic device according to various embodiments.

Referring to FIG. 17, it is possible to monitor various components for heat dissipation control of a processor (e.g., the processor 120 in FIG. 1 or FIG. 6) to receive temperature information and/or operation state information and calculate a current temperature or a prediction temperature. For example, the processor 120 may identify whether wireless charging is activated and identify a charging state (e.g., fast, regular, and slow charging) and receive battery information. For example, the processor 120 may identify expanding state information (e.g., the sliding-in state or sliding-out state, and in case that the sliding-out state includes multiple levels, a current sliding-out state) of a flexible display (e.g., the flexible display 610 in FIG. 6) of the electronic device 101.

According to an embodiment, the processor 120 may display state information including a current temperature and battery information 1711 of the electronic device 101 performing wireless charging in the sliding-in state (closed state) 1701 while mounted on the wireless charger 1705 on an AOD screen or a home screen of the display 610.

According to an embodiment, the processor 120 may perform heat dissipation control operation according to, for example, entering a specific heat generation level (e.g., the intermediate heat generation level or the strong heat generation level) due to an increase in temperature caused by performing wireless charging.

According to an embodiment the processor 120 may display state information including a current temperature and battery information 1712 of the electronic device 101 converted into the sliding-out state (open state) 1702 due to the heat dissipation control operation on an AOD screen or the home screen of the display 610. In this case, the processor 120 may adjust a method or speed of wireless charging as the heat dissipation control operation.

According to an embodiment, the processor 120 may adjust brightness of the AOD screen and/or a display screen (e.g., a wallpaper) of the display 610 of the electronic device 101 as the heat dissipation control operation.

According to an embodiment the processor 120 may cause the sliding-out state (open state) 1702 to be converted back into the slide-in state (closed state) 1703 when the temperature drops according to the performing of the heat radiation operation and display state information including a current temperature and battery information 1713 of the electronic device 101 on the AOD screen or the home screen of the display 610.

Figure 18:
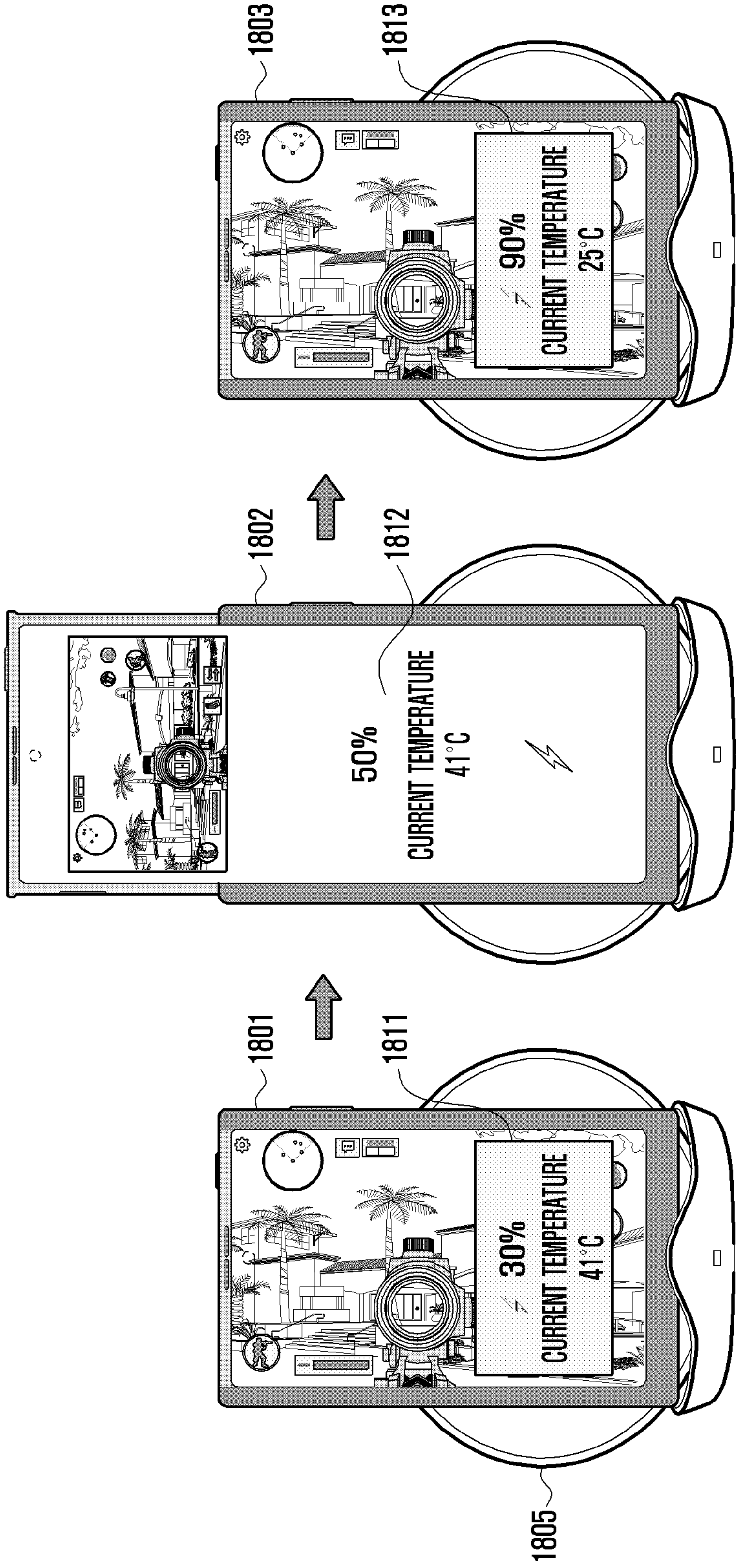

Referring to FIG. 18, it is possible to monitor various components for heat dissipation control of the processor 120 to receive temperature information and/or operation state information and calculate a current temperature or a prediction temperature. For example, the processor 120 may identify whether wireless charging is activated and identify a charging state (e.g., fast, regular, and slow charging) and receive battery information. For example, the processor 120 may identify expanding state information (e.g., the sliding-in state or sliding-out state, and in case that the sliding-out state includes multiple levels, a current sliding-out state) of a flexible display (e.g., the flexible display 610 in FIG. 6) of the electronic device 101. The processor 120 may display state information including a current temperature and battery information 1811 of the electronic device 101 performing wireless charging in the sliding-in state (closed state) 1801 while mounted on the wireless charger 1805 on the home screen of the display 610. For example, the processor 120 may identify that a game is executed in full screen on the home screen.

According to an embodiment, the processor 120 may perform a heat dissipation control operation according to, for example, entering a specific heat generation level (e.g., the intermediate heat generation level or the strong heat generation level) due to an increase in temperature caused by wireless charging and performing a game in the sliding-in state (closed state) 1801.

According to an embodiment the processor 120 may display state information including a current temperature and battery information 1812 of the electronic device 101 converted into the sliding-out state (open state) 1802 due to the heat dissipation control operation on the home screen of the display 610. In this case, the processor 120 may adjust a method or speed of wireless charging as the heat dissipation control operation.

According to an embodiment, the processor 120 may control the heat generation of the display 610 by changing a screen configuration method so that, for example, a game screen that is executed automatically is displayed on a partial screen rather than a full screen so as to perform the heat dissipation control operation.

According to an embodiment the processor 120 may cause the sliding-out state (open state) 1802 to be converted back into the slide-in state (closed state) 1803 when the temperature drops according to the performing of the heat dissipation control operation and display state information including a current temperature and battery information 1813 of the electronic device 101 on the home screen of the display 610.

Figure 19:
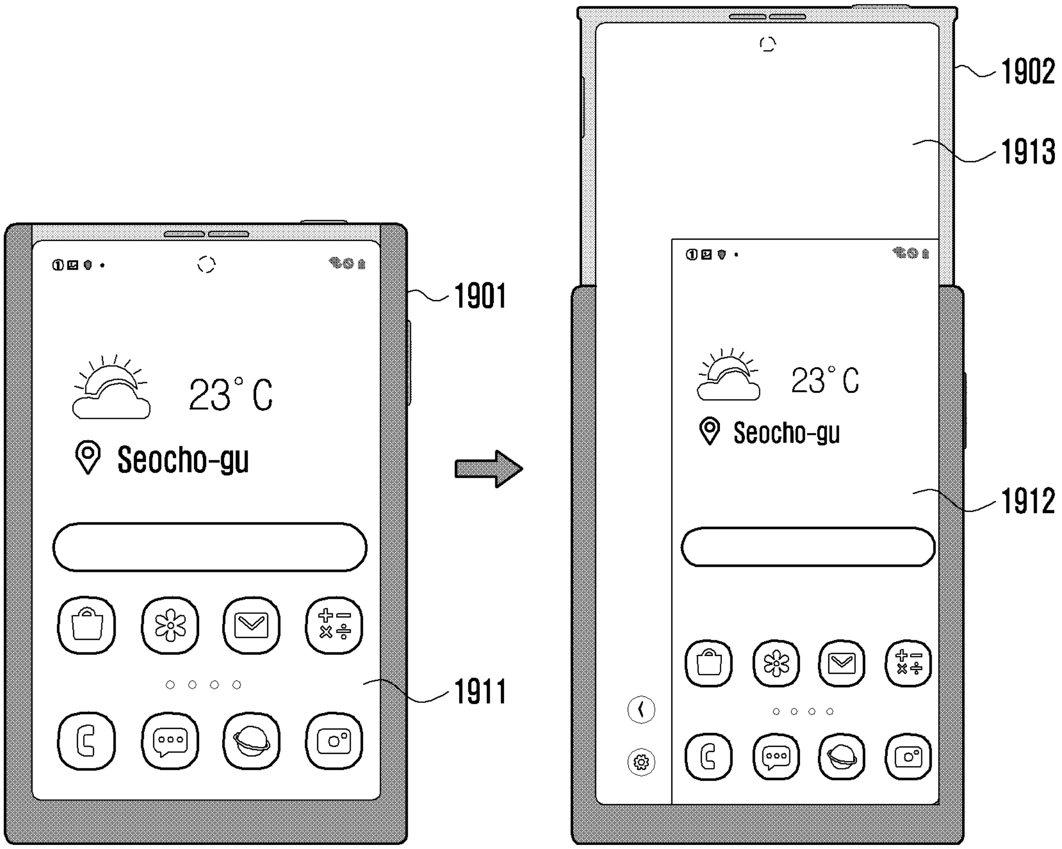

Referring to FIG. 19, the processor 120 may perform the heat dissipation control operation when in the sliding-in state (closed state) 1901, in which the home screen is displayed in the entire area 1911 of the display 610, the temperature rises and, for example, entrance to a certain heat generation level (e.g., the initial heat generation level, intermediate heat generation level, strong heat generation level) occurs.

According to an embodiment the processor 120 may change a screen layout of the display 610 of the electronic device 101 converted into the sliding-out state (open state) 1902 as the heat dissipation control operation. For example, the processor 120 may convert the display 610 of the electronic device 101 into an one-handed use mode. Accordingly, the home screen 1912 of the display 610 may be displayed on a partial screen 1912 rather than an entire expanded screen, and display of other screens 1913 may be blocked.

According to an embodiment, the processor 120 may control the heat generation of the display 610 by changing a screen configuration method so that, for example, the home screen in the expanded display is displayed on a partial screen rather than a full screen so as to additionally perform the heat dissipation control operation.

Figure 20:
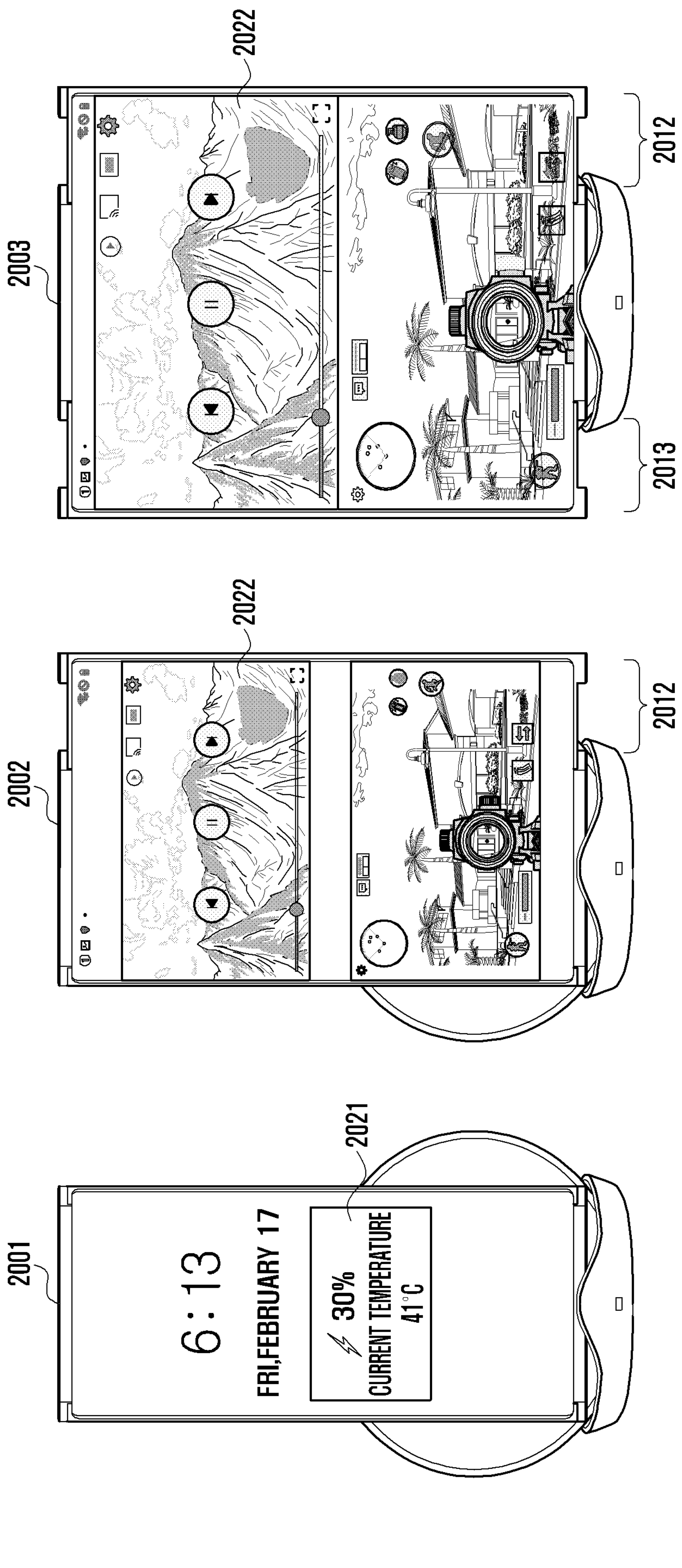

Referring to FIG. 20, the electronic device 101 may include a display 530 expandable in both left and right directions as shown in FIG. 5C, for example.

The electronic device 101 according to an embodiment may display 2021 a current temperature and a charging state in a reduction state 2001 of the display 530.

In the electronic device 101 according to an embodiment, heat dissipation may occur primarily from a surface of the display 530 and a corresponding counter surface. Therefore, the expansion of the expandable display 530 may improve the heat dissipation performance.

According to an embodiment, due to the characteristics of the form factor expandable in both the left and right, the surface where the final heat is dissipated into the air is the display surface and the surface in the opposite direction and heat dissipation performance may be improved proportionally as the display 530 is expanded.

According to an embodiment, the electronic device 101 expandable in both left and right directions may step-wisely expand (slide out) 2012 primarily 2012 in one direction according to the heat generation level, and expand (slide out) 2013 secondarily 2003 in the other direction as the heat generation level increases to secure appropriate heat dissipation performance depending on the heat generation level.

FIGS. 21, 22, 23, 24 and 25 are diagrams illustrating an example of a heat dissipation control notification according to temperature change in an electronic device (e.g., the electronic device 101 in FIG. 1 or FIG. 6) according to various embodiments.

Figure 21:
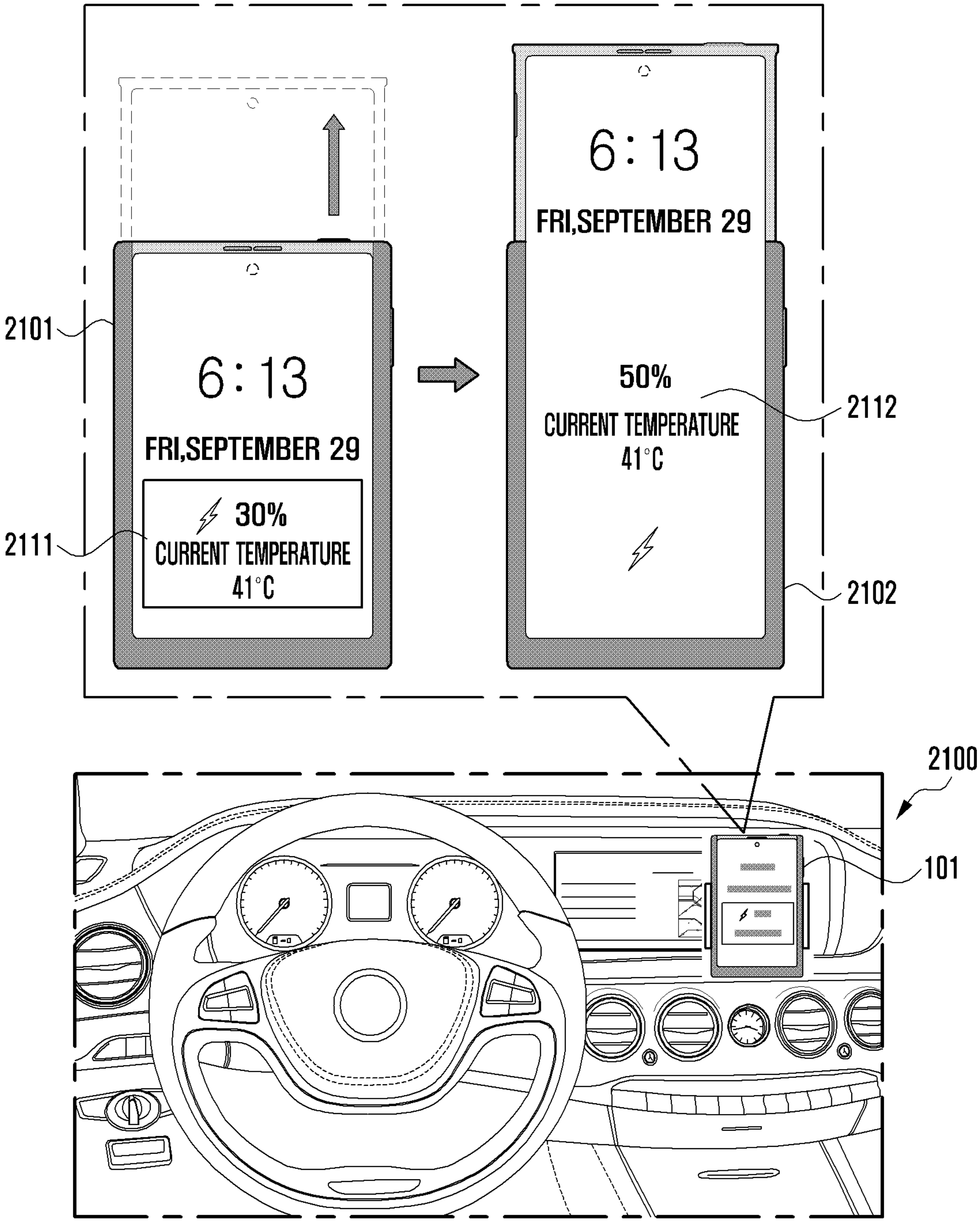
FIGS. 21, 22, 23, 24 and 25 are diagrams illustrating an example of a heat dissipation control operation notification according to temperature change in an electronic device according to various embodiments.

Referring to FIG. 21, the electronic device 101 may perform wireless charging while mounted on, for example, a dashboard 2100 of a vehicle in the sliding-in state (closed state) 2101.

According to an embodiment, the processor 120 may display a current temperature and a charging state 2111 of a display (e.g., the display 610 in FIG. 6) of the electronic device 101 as, for example, text and/or an image.

According to an embodiment, heat dissipation control operation may be performed, for example, the display 610 may expand (slide out) according to, for example, entering a specific heat generation level (e.g., the intermediate heat generation level or the strong heat generation level) due to an increase in temperature of the electronic device 101.

According to an embodiment, in the expansion state 2102 of the display 610, the processor 120 may display a current temperature and a charging state 2112 of a display 610 as, for example, text and/or an image.

Figure 22:
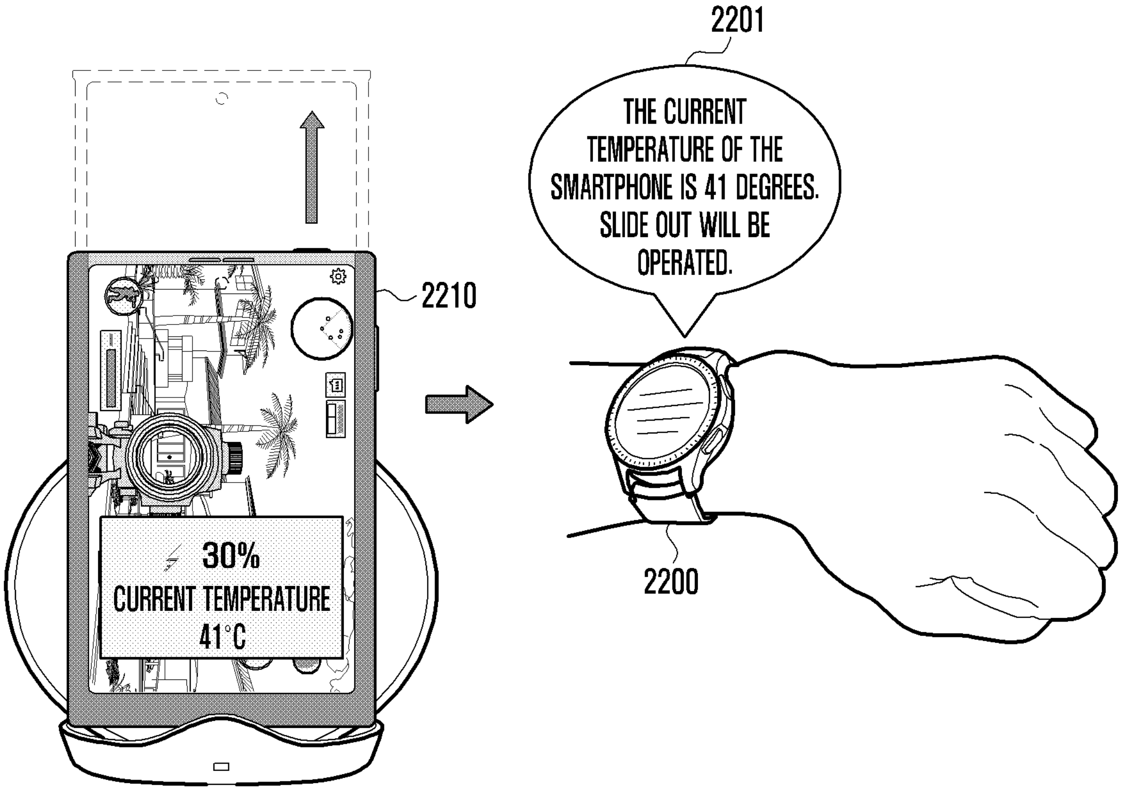

Referring to FIG. 22, the electronic device 101 may be in a wireless charging state 2210 and display a current temperature and a charging state as an image (shape or color) and/or an icon through AOD.

According to an embodiment, depending on heat generation of the electronic device 101, the display 610 may be slid out to perform the heat dissipation control operation. Here, in case that there is an external electronic device 2200 (e.g., a wearable device) connected to the electronic device 101, a notification 2201 of a current temperature and the sliding out operation of the electronic device 101 may be provided to the external electronic device 2200.

Figure 23:
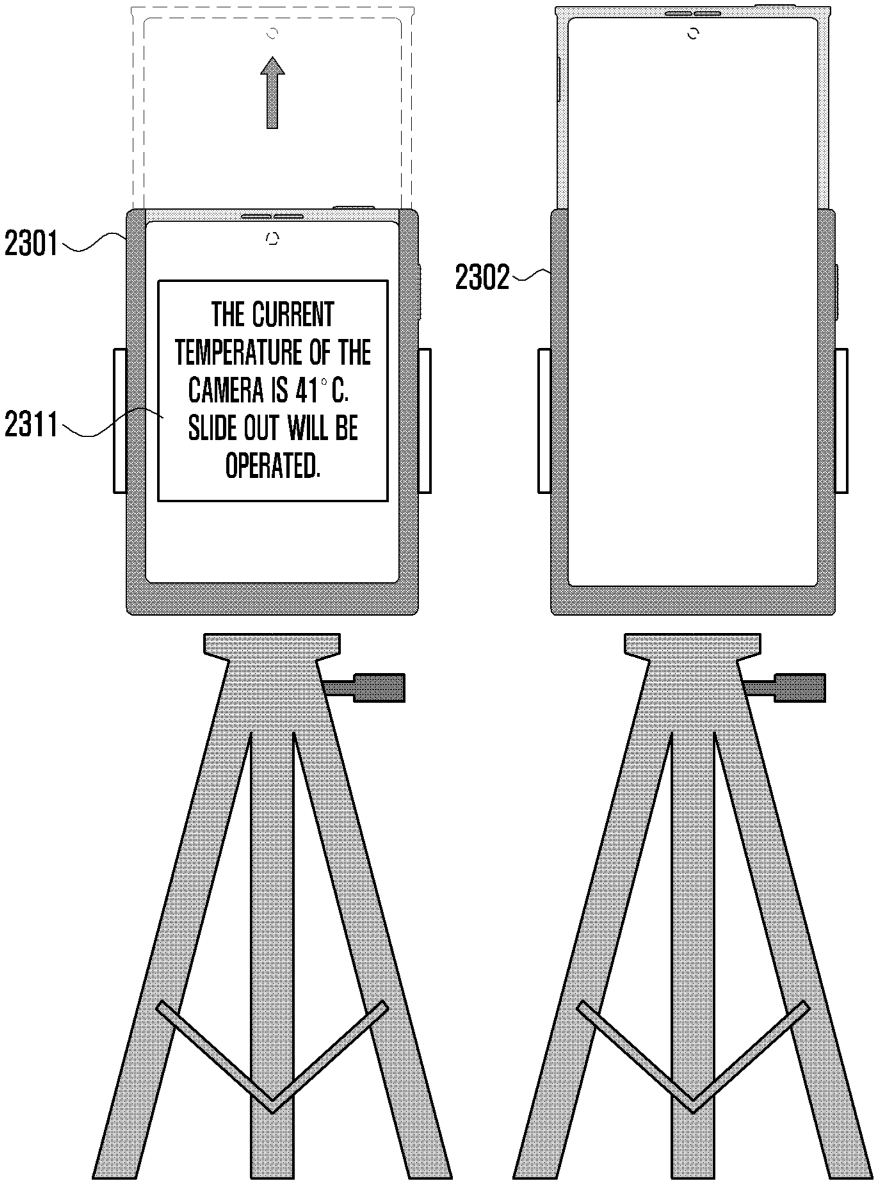

Referring to FIG. 23, in case that, for example, the electronic device 101 performs photographing using a camera while mounted on a tripod in the reduction state 2301 and a temperature rises so that the heat dissipation control operation is performed by changing to the expansion state 2302 through an expansion operation of the display 610, a notification 2311 of a current temperature and the sliding out operation may be displayed on the display 610 as, for example, text.

Figure 24:
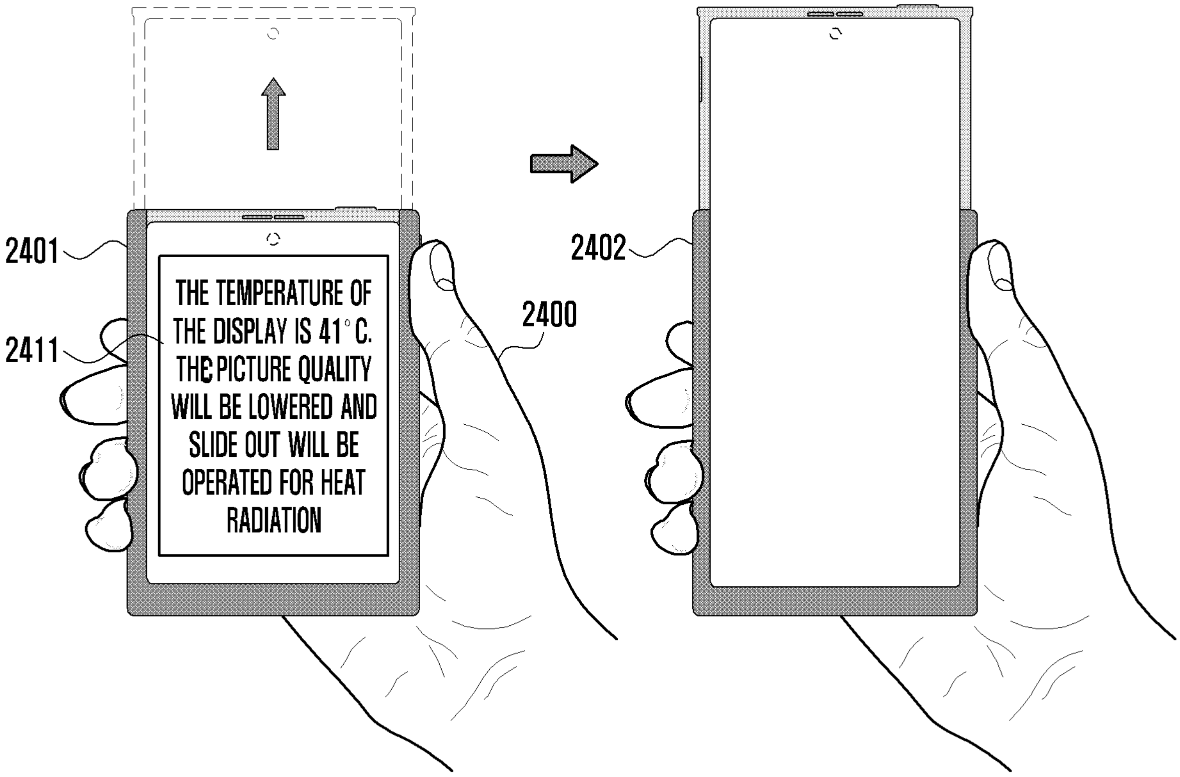

Referring to FIG. 24, in case that the electronic device 101 uses a communication module, for example, WiFi through the display 610 in the reduction state 2401 and a temperature of the display 610 rises so that the heat dissipation control operation is performed by changing to the expansion state 2402 through an expansion operation of the display 610, a notification 2411 of a current temperature, a sliding-out operation, and/or other heat dissipation control operations (e.g., lowering a picture quality) may be provided through the display 610 using, for example, text.

Figure 25:
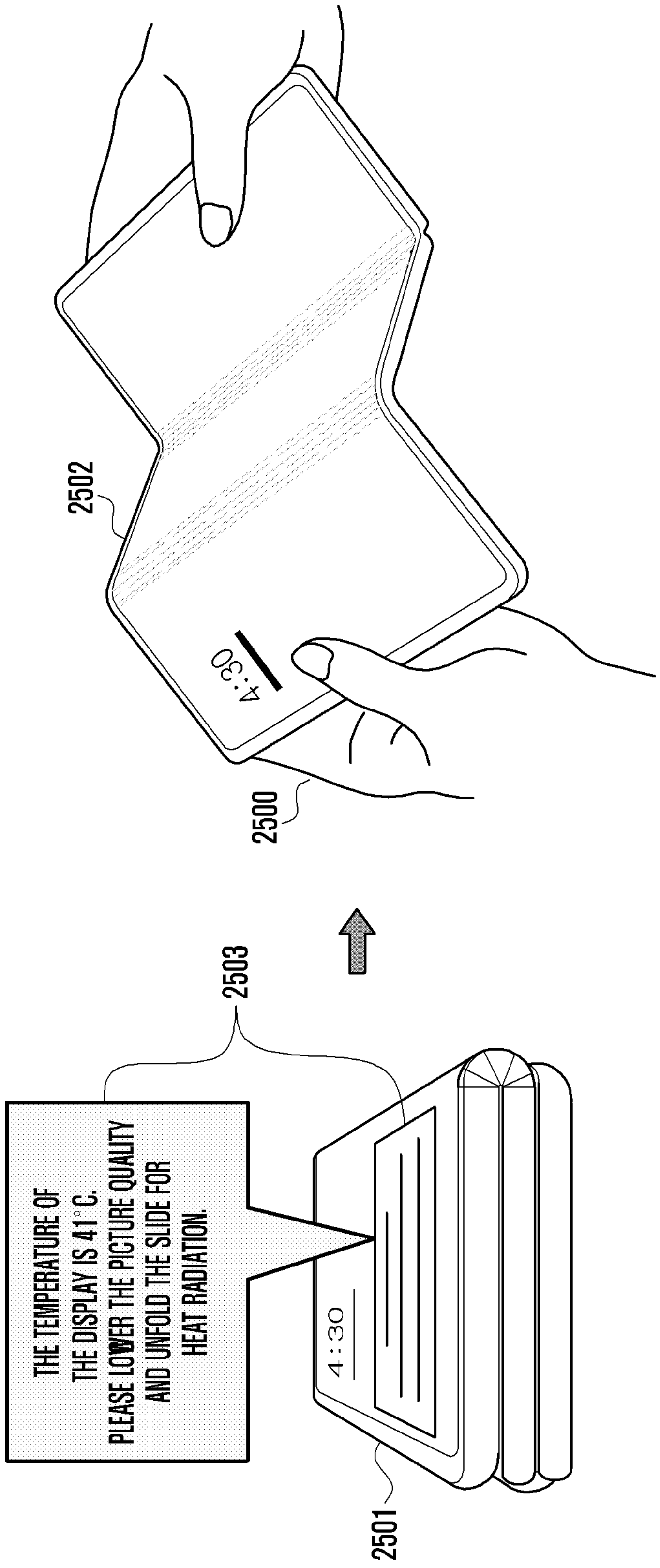

Referring to FIG. 25, the electronic device 101 which is realized as a foldable electronic device 2501 may provide, when a temperature rises according to an operation state, a notification 2503 through, for example, text, an image, and/or an icon so as to cause a user 2500 to perform a folding out operation for heat dissipation control in order to ensure that the electronic device 2501 is in a folding out state 2502. For example, the notification 2503 may include a notification for a current display temperature and a sliding out operation and/or a notification for other heat radiation operations (e.g., lowering a picture quality).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
two or more housings;
a flexible display mounted to one or more housings among the two or more housings and configured to be expanded and/or reduced according to a sliding operation of one or more housings among the two or more housings;
one or more sensors configured to acquire temperature information from the electronic device;
memory comprising one or more storage mediums and storing instructions;
at least one processor, comprising processing circuitry, operatively connected to the one or more sensors and the flexible display; and
wherein the instructions, when executed by the at least one processor individually and/or collectively, cause the electronic device to:
identify operation state information and temperature information of the electronic device;
identify expansion state information of the flexible display; and
change a size of the flexible display in stages by controlling the electronic device to slide the one or more housings, based on a change in the operation state information and the temperature information.

2. The electronic device of claim 1, wherein the instructions, when executed by the at least one processor individually and/or collectively, cause the electronic device to determine one heat generation level among multiple heat generation levels based on the operation state information and the temperature information.

3. The electronic device of claim 2, wherein the instructions, when executed by the at least one processor individually and/or collectively, cause the electronic device to perform a designated heat dissipation control operation with respect to the determined heat generation level.

4. The electronic device of claim 3, wherein the instructions, when executed by the at least one processor individually and/or collectively, cause the electronic device to determine a next heat dissipation control operation based on a result according to the designated heat dissipation control operation with respect to the determined heat generation level.

5. The electronic device of claim 2, wherein the instructions, when executed by the at least one processor individually and/or collectively, cause the electronic device to:
identify temperature information or operation state information of the electronic device based on the designated heat dissipation control operation with respect to the determined heat generation level; and
re-determine another heat generation level among the multiple heat generation levels.

6. The electronic device of claim 5, wherein the instructions, when executed by the at least one processor individually and/or collectively, cause the electronic device to change the size of the flexible display based on the another heat generation level.

7. The electronic device of claim 1, wherein the instructions, when executed by the at least one processor individually and/or collectively, cause the electronic device to:
acquire multiple temperature information from multiple components of the electronic device; and
calculate temperature information of the electronic device based on the multiple temperature information of the multiple components.

8. The electronic device of claim 1, wherein the instructions, when executed by the at least one processor individually and/or collectively, cause the electronic device to provide a notification comprising a size change of the flexible display through the flexible display.

9. The electronic device of claim 1, wherein the operation state information of the electronic device comprises operation state information of at least one processor.

10. A method of operating an electronic device comprising two or more housings, a flexible display mounted to one or more housings among the two or more housings and configured to be expanded or reduced according to a sliding operation of one or more housings among the two or more housings, the method comprising:
identifying operation state information and temperature information of the electronic device;
identifying expansion state information of the flexible display; and
changing a size of the flexible display in stages by sliding the one or more housings, based on a change in the operation state information and the temperature information.

11. The method of claim 10, further comprising determining one heat generation level among multiple heat generation levels based on the operation state information and the temperature information.

12. The method of claim 11, further comprising performing a designated heat dissipation control operation with respect to the determined heat generation level.

13. The method of claim 12, further comprising determining a next heat dissipation control operation based on a result according to the designated heat dissipation control operation with respect to the determined heat generation level.

14. The method of claim 11, further comprising:
identifying temperature information or operation state information of the electronic device according to the designated heat dissipation control operation with respect to the determined heat generation level; and
re-determining another heat generation level among the multiple heat generation levels.

15. The method of claim 14, further comprising re-changing the size of the flexible display to a first size or a second size, based on the another heat generation level.

16. The method of claim 10, further comprising:

acquiring multiple temperature information from multiple components of the electronic device; and calculating temperature information of the electronic device based on the multiple temperature information of the multiple components.

17. The method of claim 10, further comprising providing a notification comprising a size change of the flexible display through the flexible display.

18. The method of claim 10, wherein the operation state information of the electronic device comprises operation state information of the at least one processor.

* * * * *